(12) United States Patent
Mook et al.

(10) Patent No.: US 10,830,174 B1
(45) Date of Patent: Nov. 10, 2020

(54) MONOLITHIC HEAT-EXCHANGER BODIES

(71) Applicant: General Electric Company, Schenectady, NY (US)

(72) Inventors: Joshua Tyler Mook, Cincinnati, OH (US); Kevin Michael VandeVoorde, Cincinnati, OH (US); Aigbedion Akwara, Cincinnati, OH (US); Michael Robert Notarnicola, Cincinnati, OH (US); Jason Joseph Bellardi, Fairfield, OH (US); Mohammed El Hacin Sennoun, West Chester, OH (US); Mohamed Osama, Garching (DE); Zachary William Nagel, Liberty Township, OH (US); Victor Luis Marrero Ortiz, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/878,773

(22) Filed: May 20, 2020

Related U.S. Application Data

(60) Provisional application No. 62/850,701, filed on May 21, 2019, provisional application No. 62/850,692, (Continued)

(51) Int. Cl.
*F02G 1/055* (2006.01)
*F28F 7/02* (2006.01)
(Continued)

(52) U.S. Cl.
CPC .............. *F02G 1/055* (2013.01); *F02G 1/04* (2013.01); *F28D 9/04* (2013.01); *F28F 7/02* (2013.01);
(Continued)

(58) Field of Classification Search
CPC .. F02G 1/055; F02G 2254/10; F02G 2254/11; F02G 2254/18; F02G 1/00;
(Continued)

(56) References Cited

U.S. PATENT DOCUMENTS 3,015,475 A * 1/1962 Meijer .................... F02G 1/055
165/166
3,296,808 A    1/1967 Malik
(Continued)

FOREIGN PATENT DOCUMENTS

DE    3629443 A1 *  7/1987 ............... F02G 5/02
EP    1091089 A3    12/2003
JP    05264181 A  * 10/1993 ............... F28D 9/04

OTHER PUBLICATIONS

Adamski, Ventilation Systems with Longitudinal Counterflow Spiral Recuperators, Department of Heat Engineering, AIVC.org, Technical University, Bialystok, Poland, 6 Pages. https://www.aivc.org/sites/default/files/members_area/medias/pdf/Conf/2004/2004015_Adamski.pdf.
(Continued)

*Primary Examiner* — Mark A Laurenzi
*Assistant Examiner* — Xiaoting Hu
(74) *Attorney, Agent, or Firm* — Dority & Manning, P.A.

(57) ABSTRACT

A monolithic heat exchanger body includes a plurality of heating walls and a plurality of combustion fins. The plurality of heating walls are configured and arranged in an array of spirals or spiral arcs relative to a longitudinal axis. Adjacent portions of the plurality of heating walls respectively define a corresponding plurality of heating fluid pathways therebetween. The plurality of combustion fins are circumferentially spaced about a perimeter of an inlet plenum. The inlet plenum includes or fluidly communicates with a combustion chamber. The plurality of heating fluid pathways fluidly communicate with the inlet plenum. The
(Continued)

plurality of combustion fins occupy a radially or concentrically inward portion of the monolithic heat exchanger body. The plurality of heating fluid pathways have a heat transfer relationship with a heat sink disposed about a radially or concentrically outward portion of the monolithic heat exchanger body. A plurality of conduction breaks disposed radially or concentrically outward relative to the plurality of combustion fins at least partially inhibit heat conduction from the plurality of combustion fins to the plurality of heating walls.

20 Claims, 24 Drawing Sheets

Related U.S. Application Data filed on May 21, 2019, provisional application No. 62/850,678, filed on May 21, 2019, provisional application No. 62/850,623, filed on May 21, 2019, provisional application No. 62/850,599, filed on May 21, 2019.

(51) Int. Cl.

| | | |
|---|---|---|
| *F28F 13/14* | (2006.01) | |
| *F28D 9/04* | (2006.01) | |
| *F28F 13/00* | (2006.01) | |
| *F02G 1/04* | (2006.01) | |
| *F02G 1/043* | (2006.01) | |
| *F28D 21/00* | (2006.01) | |

(52) U.S. Cl.
CPC ............ *F28F 13/003* (2013.01); *F28F 13/14* (2013.01); *F02G 1/0435* (2013.01); *F02G 2254/10* (2013.01); *F28D 2021/0026* (2013.01); *F28F 2210/10* (2013.01); *F28F 2250/04* (2013.01)

(58) Field of Classification Search
CPC ... F02G 1/02; F02G 1/04; F02G 1/043; F02G 1/0435; F02G 1/044; F02G 1/0445; F02G 1/047; F02G 2254/00; F02G 2255/20; F02G 2258/20; F02G 2258/90; F02G 2275/30; F28F 2250/04; F28F 7/02; F28F 13/003; F28F 13/14; F28F 2210/10; F28F 2013/005; F28F 2013/008; F28F 2255/18; F28F 2270/00; F28F 2270/02; F28D 9/04; F28D 7/04; F28D 7/02; F28D 7/022; F28D 7/024; F28D 7/026; F28D 7/028; F28D 1/0472; F28D 1/0473; F28D 2021/0026
See application file for complete search history.

(56) References Cited

U.S. PATENT DOCUMENTS

| | | | |
|---|---|---|---|
| 3,552,120 | A | 1/1971 | Beale |
| 3,777,718 | A | 12/1973 | Pattas |
| 3,782,457 | A | 1/1974 | Troy |
| 4,026,114 | A | 5/1977 | Belaire |
| 4,030,297 | A | 6/1977 | Kantz et al. |
| 4,077,216 | A | 3/1978 | Cooke-Yarborough |
| 4,102,632 | A | 7/1978 | Hastings |
| 4,183,214 | A | 1/1980 | Beale et al. |
| 4,199,945 | A | 4/1980 | Finkelstein |
| 4,387,568 | A | 6/1983 | Dineen |
| 4,545,738 | A | 10/1985 | Young |
| 4,611,655 | A * | 9/1986 | Molignoni ............... F02G 1/04 122/183 |
| 4,644,851 | A | 2/1987 | Young |
| 4,717,405 | A | 1/1988 | Budliger |
| 4,723,411 | A | 2/1988 | Darooka et al. |
| 4,883,117 | A | 11/1989 | Dobbs et al. |
| 5,005,349 | A | 4/1991 | Momose et al. |
| 5,172,784 | A | 12/1992 | Varela, Jr. |
| 5,294,410 | A | 3/1994 | White |
| 5,675,974 | A | 10/1997 | Heikrodt et al. |
| 6,283,712 | B1 | 9/2001 | Dziech et al. |
| 6,293,101 | B1 | 9/2001 | Conrad |
| 6,390,185 | B1 | 5/2002 | Proeschel |
| 6,656,409 | B1 | 12/2003 | Keicher et al. |
| 7,134,279 | B2 | 11/2006 | White et al. |
| 7,171,811 | B1 | 2/2007 | Berchowitz et al. |
| 8,359,744 | B2 | 1/2013 | Hislop et al. |
| 8,720,198 | B2 | 5/2014 | Wood |
| 8,721,981 | B2 | 5/2014 | Freund et al. |
| 8,820,068 | B2 | 9/2014 | Dadd |
| 9,689,344 | B1 | 6/2017 | Gedeon |
| 9,992,917 | B2 | 6/2018 | Yanke et al. |
| 2003/0163990 | A1 * | 9/2003 | Maceda ................. F28F 3/04 60/517 |
| 2003/0230440 | A1 | 12/2003 | Kamen et al. |
| 2004/0079087 | A1 | 4/2004 | Chandran et al. |
| 2005/0250062 | A1 | 11/2005 | Kornbluth et al. |
| 2009/0025388 | A1 | 1/2009 | Silver et al. |
| 2011/0226284 | A1 | 9/2011 | Taylor et al. |
| 2011/0302902 | A1 | 12/2011 | Kelly et al. |
| 2012/0260668 | A1 | 10/2012 | Rogers et al. |
| 2015/0023778 | A1 | 1/2015 | Berg et al. |
| 2015/0041454 | A1 | 2/2015 | Foret |
| 2017/0010046 | A1 * | 1/2017 | Hofbauer ................ F28F 1/04 |
| 2017/0030651 | A1 * | 2/2017 | Rock, Jr. ................ F28D 7/022 |
| 2017/0059163 | A1 | 3/2017 | Ott et al. |
| 2017/0122258 | A1 | 5/2017 | Bellomi et al. |
| 2017/0133244 | A1 * | 5/2017 | Knyazik ................. F28F 3/12 |
| 2017/0234543 | A1 | 8/2017 | Plante et al. |
| 2017/0276358 | A1 | 9/2017 | Berry et al. |
| 2018/0231254 | A1 | 8/2018 | Maurer et al. |
| 2018/0274780 | A1 | 9/2018 | Kim et al. |
| 2018/0281064 | A1 | 10/2018 | Takahashi et al. |
| 2018/0283319 | A1 | 10/2018 | Yates et al. |
| 2019/0063842 | A1 * | 2/2019 | Lopes .................... F28D 7/022 |

OTHER PUBLICATIONS

Adamski, Heat Transfer Correlations and NTU Number for the Longitudinal Flow Spiral Recuperators, Applied Thermal Engineering, ScienceDirect, vol. 29, Issues 2-3, Feb. 2009, pp. 591-596. (Abstract Only) https://www.sciencedirect.com/science/article/pii/S1359431108001634.

Adamski, Ventilation System with Spiral Recuperator, Energy and Buildings, ScienceDirect, vol. 42, Issue 5, May 2010, pp. 674-677. (Abstract Only) https://www.sciencedirect.com/science/article/pii/S0378778809002898.

American Stirling Company, Regenerators, 10 Pages. https://www.stirlingengine.com/regenerators/.

Antoine et al., The ACTE Spiral Recuperator for Gas Turbine Engines, GT2002-30405, ASME Turbo Expo 2002: Power for Land, Sea, and Air, Conference International Gas Turbine Institute Jun. 3-6, 2002, vol. 1, pp. 1025-1031. (Abstract Only) http://proceedings.asmedigitalcollection.asme.org/proceeding.aspx?articleid=1574940.

Bin-Nun et al., Low Cost and High Performance Screen Laminate Regenerator Matrix, ScienceDirect, FLIR Systems, MA, vol. 44, Issues 6-8, Jun.-Aug. 2004, pp. 439-444. https://www.sciencedirect.com/science/article/abs/pii/S0011227504000700.

Bright Hub Engineering, Oil Piston Cooling, Oct. 19, 2009, 6 Pages. http://www.brighthubengineering.com/marine-engines-machinery/52783-how-are-marine-pistons-cooled-with-oil/.

Cai et al., An optimal design approach for the annular involute-profile cross wavy primary surface recuperator in microturbine and an application case study, Energy, Science Direct, vol. 153, Issue 15, Jun. 2018, pp. 80-89. (Abstract Only) https://www.sciencedirect.com/science/article/abs/pii/S0360544218306066.

(56) References Cited

OTHER PUBLICATIONS

Conner, 3D Printed Stirling Engine, Solar Heat Engines, Simulate, Analyze, Design, Build, and Test Solar-Powered Engines, Oct. 29, 2012, 12 Pages http://www.solarheatengines.com/2012/10/29/3d-printed-stirling-engine/.

Conner, A Regenerator for the 3D Printed PE 2 Stirling Engine, Solar Heat Engines, Simulate, Analyze, Design, Build, and Test Solar-Powered Engines, Dec. 18, 2012, 9 Pages. http://www.solarheatengines.com/2012/12/18/a-regenerator-for-the-3d-printed-pe-2-stirling-engine/.

Cordova et al., High Effectiveness, Low Pressure Drop Recuperator for High Speed and Power Oil-Free Turbogenerator, GT2015-43718, ASME Turbo Expo 2015 Turbine Technical Conference and Exposition Jun. 15-19, 2015, vol. 8 Microturbines, Turbochargers and Small Turbomachines; Steam Turbines, Canada, 10 pages. (Abstract Only) https://proceedings.asmedigitalcollection.asme.org/proceeding.aspx?articleid=2428685.

Deetlefs, Design, Simulation, Manufacture and Testing of a Five-Piston Stirling Engine, Thesis, Department of Mechatronic Engineering Stellenbosch University, Scholar Sun, South Africa, Dec. 2014, 138 Pages. https://scholar.sun.ac.za/bitstream/handle/10019.1/95922/deetlefs_design_2014.pdf?sequence=3&isAllowed=y.

Defense Visual Information Distributed Service (DVIDS), Mod II Automotive Stirling Engine, NASA C-1986-3704, Washington, DC, 2 Pages. https://www.dvidshub.net/image/853635/mod-ii-automotive-stirling-engine.

Defense Visual Information Distributed Service (DVIDS), Mod II Automotive Stirling Engine, NASA C-1986-3705, Washington, DC, 2 Pages. https://www.dvidshub.net/image/750295/mod-ii-automotive-stirling-engine.

Defense Visual Information Distributed Service (DVIDS), Mod II Automotive Stirling Engine, NASA C-1986-3706, Washington, DC, 2 pages. https://www.dvidshub.net/image/844058/mod-ii-automotive-stirling-engine.

Defense Visual Information Distributed Service (DVIDS), Mod II Automotive Stirling Engine, NASA C-1986-3707, Washington, DC, 2 pages. https://www.dvidshub.net/image/835929/mod-ii-automotive-stirling-engine.

Defense Visual Information Distributed Service (DVIDS), Mod II Automotive Stirling Engine, NASA C-1986-3708, Washington, DC, 2 pages. https://www.dvidshub.net/image/836353/mod-ii-automotive-stirling-engine.

Defense Visual Information Distributed Service (DVIDS), Mod II Automotive Stirling Engine, NASA C-1986-3709, Washington, DC, 2 pages https://www.dvidshub.net/image/831862/mod-ii-automotive-stirling-engine.

Defense Visual Information Distributed Service (DVIDS), Mod II Automotive Stirling Engine, NASA C-1986-3710, Washington, DC, 2 pages https://www.dvidshub.net/image/758633/mod-ii-automotive-stirling-engine.

Defense Visual Information Distributed Service (DVIDS), Mod II Automotive Stirling Engine, NASA C-1986-3711, Washington, DC, 2 pages https://www.dvidshub.net/image/755174/mod-ii-automotive-stirling-engine.

Defense Visual Information Distributed Service (DVIDS), Mod II Automotive Stirling Engine, NASA C-1986-3712, Washington, DC, 2 pages https://www.dvidshub.net/image/832968/mod-ii-automotive-stirling-engine.

Defense Visual Information Distributed Service (DVIDS), Mod II Automotive Stirling Engine, NASA C-1986-3713, Washington, DC, 2 pages https://www.dvidshub.net/image/838183/mod-ii-automotive-stirling-engine.

Defense Visual Information Distributed Service (DVIDS), Mod II Automotive Stirling Engine, NASA C-1986-3714, Washington, DC, 2 pages https://www.dvidshub.net/image/752721/mod-ii-automotive-stirling-engine.

Defense Visual Information Distributed Service (DVIDS), Mod II Automotive Stirling Engine, NASA C-1986-3715, Washington, DC, 2 pages https://www.dvidshub.net/image/853040/mod-ii-automotive-stirling-engine.

Defense Visual Information Distributed Service (DVIDS), Mod II Automotive Stirling Engine, NASA C-1986-3716, Washington, DC, 2 pages https://www.dvidshub.net/image/754701/mod-ii-automotive-stirling-engine.

Defense Visual Information Distributed Service (DVIDS), Mod II Automotive Stirling Engine, NASA C-1986-3717, Washington, DC, 2 pages https://www.dvidshub.net/image/838670/mod-ii-automotive-stirling-engine.

Defense Visual Information Distributed Service (DVIDS), Mod II Automotive Stirling Engine, NASA C-1986-3718, Washington, DC, 2 pages https://www.dvidshub.net/image/841231/mod-ii-automotive-stirling-engine.

Defense Visual Information Distributed Service (DVIDS), Mod II Automotive Stirling Engine, NASA C-1986-3719, Washington, DC, 2 pages https://www.dvidshub.net/image/856096/mod-ii-automotive-stirling-engine.

Defense Visual Information Distributed Service (DVIDS), Mod II Automotive Stirling Engine, NASA C-1986-3720, Washington, DC, 2 pages https://www.dvidshub.net/image/842778/mod-ii-automotive-stirling-engine.

Defense Visual Information Distributed Service (DVIDS), Mod II Automotive Stirling Engine, NASA C-1986-3721, Washington, DC, 2 pages https://www.dvidshub.net/image/836739/mod-ii-automotive-stirling-engine.

Defense Visual Information Distributed Service (DVIDS), Mod II Automotive Stirling Engine, NASA C-1986-3722, Washington, DC, 2 pages https://www.dvidshub.net/image/829783/mod-ii-automotive-stirling-engine.

Defense Visual Information Distributed Service (DVIDS), Mod II Automotive Stirling Engine, NASA C-1986-3724, Washington, DC, 2 pages https://www.dvidshub.net/image/841262/mod-ii-automotive-stirling-engine.

Defense Visual Information Distributed Service (DVIDS), Mod II Automotive Stirling Engine, NASA C-1986-3725, Washington, DC, 2 pages https://www.dvidshub.net/image/759360/mod-ii-automotive-stirling-engine.

Defense Visual Information Distributed Service (DVIDS), Mod II Automotive Stirling Engine, NASA C-1986-3726, Washington, DC, 2 pages https://www.dvidshub.net/image/840688/mod-ii-automotive-stirling-engine.

Defense Visual Information Distributed Service (DVIDS), Mod II Automotive Stirling Engine, NASA C-1986-3727, Washington, DC, 2 pages https://www.dvidshub.net/image/859381/mod-ii-automotive-stirling-engine.

Defense Visual Information Distributed Service (DVIDS), Mod II Automotive Stirling Engine, NASA C-1986-3729, Washington, DC, 2 pages https://www.dvidshub.net/image/834290/mod-ii-automotive-stirling-engine.

Defense Visual Information Distributed Service (DVIDS), Mod II Automotive Stirling Engine, NASA C-1986-3731, Washington, DC, 2 pages https://www.dvidshub.net/image/860486/mod-ii-automotive-stirling-engine.

Defense Visual Information Distributed Service (DVIDS), Mod II Automotive Stirling Engine, NASA C-1986-3732, Washington, DC, 2 pages https://www.dvidshub.net/image/749381/mod-ii-automotive-stirling-engine.

Devitt, Restriction and Compensation of Gas Bearings—Bently Bearings by Newway, Aston, PA, 5 Pages. https://bentlybearings.com/restriction-and-compensation/.

Direct Industry, Micro-Turbine Hear Recuperator/ For Exhaust Gas. For Gas Turbines/ Stainless Steel (Web Link Only) http://www.directindustry.com/prod/acte/product-158841-1644809.html.

Driscoll et al., Role of Swirl in Flame Stabilization, AIAA-2011-108, 49th AIAA Aerospace Sciences Meeting including the New Horizons Forum and Aerospace Exposition, Orlando Florida, Jan. 4-7, 2011, 11 Pages.

Dudareva et al., Thermal Protection of Internal Combustion Engines Pistols, Science Direct, Procedia Engineering, vol. 206, 2017, pp. 1382-1387. https://www.sciencedirect.com/science/article/pii/S1877705817353341.

(56) References Cited

OTHER PUBLICATIONS

Electropaedia, Battery and Energy Technologies, Energy Conversion and Heat Engines, Woodbank Communications Ltd., Chester, United Kingdom, 2005, 11 Pages. https://www.mpoweruk.com/heat_engines.htm.
Elizondo-Luna, Investigation of Porous Metals as Improved Efficiency Regenerators, The University of Sheffield, Doctor of Philosophy Thesis, Mar. 2016, 261 Pages. http://etheses.whiterose.ac.uk/13111/1/Thesis%20Elizondo-Luna.pdf.
Enerlyt Stirling Engine, Enerlyt, Glowing-Isothermal-Mechanical-Stirling-Arranged-Motor, Enerlyt Technik GmbH, Potsdam, 2012, 13 Pages. http://www.enerlyt.de/english/pdf/en_motorbeschreibung_040413.pdf.
Engine Basics, Ball Type, Rochester Image, 1 Page. http://www.enginebasics.com/Engine%20Basics%20Root%20Folder/Images/Fuel%20Injector3.jpg.
Ernst et al., Automotive Stirling Engine Development Program, NASA-CR-174972, DOE/NASA/0032-26, MTI-85ASE476SA8, Semiannual Technical Progress Report for Period Jan. 1-Jun. 30, 1985, Lewis Research Center, Published Feb. 1986, 114 Pages. https://ntrs.nasa.gov/archive/nasa/casi.ntrs.nasa.gov/19870010704.pdf.
Ernst et al., Automotive Stirling Engine Development Program, NASA-CR-175045, DOE/NASA-0032-27, MTI-86ASE507SA9, NASA, Automotive Stirling Engine Developmental Program, Semiannual Technical Progress Report for Jul. 1-Dec. 1985, Lewis Research Center, Published in May 1986, 66 Pages. https://ntrs.nasa.gov/archive/nasa/casi.ntrs.nasa.gov/19860021107.pdf.
Fargo et al., Setting the Bar on Efficient Electrical Power Generation, ADI Thermal Power Corporation, 11 Pages. http://www.adisolarthermal.com/stirling/Technology.html.
Farrell, et al., Automotive Stirling Engine Development Program, NASA-CR-180839, DOE/NASA-0032-30, MTI-87ASE555SA11, NASA, Semiannual Technical Progress Report for Period Jul. 1-Dec. 31, 1986, Lewis Research Center, Published Feb. 1988, 66 Pages. https://ntrs.nasa.gov/archive/nasa/casi.ntrs.nasa.gov/19900002338.pdf.
Fluent, 22.8.2 The Pressure-Swirl Atomizer Model, Fluent 6.3 User's Guide, 6 pages. https://www.sharenet.ca/Software/Fluent6/html/ug/node825.htm.
Folsom et al., Combustion Modification—An Economic Alternative for Boiler NOx Control, GER-4192, GE Power Systems, Apr. 2001, 24 Pages. https://www.ge.com/content/dam/gepower-pgdp/global/en_US/documents/technical/ger/ger-4192-combustion-mod-economic-alternative-boiler-nox-control.pdf.
Fouzi, Chapter 6: Piston and Piston Rings, DJA3032 Internal Combustion Engine, Politeknik Malaysia, 201, 5 Pages. https://www.slideshare.net/mechanical86/dja3032-chapter-6.
Free-Piston Engine Range Extender Technology, Sir Joseph Swan Centre for Energy Research, 2016. (Video) https://www.youtube.com/watch?v=u4b0_6byuFU.
Fung et al., External Characteristics of Unsteady Spray Atomization from a Nasal Spray Device, Journal of Pharmaceutical Sciences, ScienceDirect, vol. 102, Issue 3, Mar. 2013, pp. 1024-1035. (Abstract Only) https://www.sciencedirect.com/science/article/pii/S002235491531193X.
Garcia-Santamaria et al., A German Inverse Woodpile Structure with a Large Photonic Band Gap, Advanced Materials Communication, Wiley InterScience, 2007, Adv. Mater. 0000, 00, pp. 1-5. http://colloids.matse.illinois.edu/articles/garcia_advmat_2007.pdf.
General Electric—GE Power, Breaking the Power Plant Efficiency Record, 2016, 4 Pages. https://www.ge.com/power/about/insights/articles/2016/04/power-plant-efficiency -record.
Georgescu, Rotary Engine, 2007. (Video Only) https://www.youtube.com/watch?v=ckuQugFH68o.
Gibson, et al., Cellular Solids Structure and Properties, Cambridge University Press, $2^{nd}$ Edition, 1997. (Web Link Only) https://doi.org/10.1017/CBO9781139878326.
Giphy, Engine Piston GIF, 1 Page. https://giphy.com/gifs/engine-hybrid-piston-10YyqVUCHx2HC.
Green Car Congress, New Toroidal Internal Combustion Engine Promises 20:1 Power-to-Weight-Ratio Energy, Technologies, Issues and Polices for Sustainable Mobility, Apr. 2006, 2 Pgs. https://www.greencarcongress.com/2006/04/new_toroidal_in.html.
HiETA Technologies Ltd, HiETA Celebrates Growth with New Website, Video and Brochure, United Kingdom, Sep. 5, 2018, 5 Pages. https://www.hieta.biz/hieta-celebrates-growth-with-new-website-video-and-brochure/.
Hoegel et al., Theoretical Investigation of the Performance of an Alpha Stirling Engine for Low Temperature Applications, Conference: ISEC $15^{th}$ International Stirling Engine Conference, ResearchGate, New Zealand, Jan. 2012, 10 Pages. https://www.researchgate.net/publication/256706755_Theoretical_investigation_of_the_performance_of_an_Alpha_Stirling_engine_for_low_temperature_applications.
Honeywell Aerospace, Ultra Long-Life, Flight Qualified Technology for High Speed Imaging and Sensing Infra-Red Detectors, Stirling Cycle Ciyocoolers, Auxiliary Power and Thermal, Honeywell Aerospace, 3 Pages. https://aerospace.honeywell.com/en/products/auxiliary-power-and-thermal/stirling-cycle-cryocoolers.
Howden, Reciprocating Compressor C series—animation, Jun. 2017. (Video Only) https://www.youtube.com/watch?v=owNOdUBL37U&feature=youtu.be.
http://www.hybrid-engine-hope.com/media/pagini/95_0071d630dba777d16e9a770de27060e6.gif (Web Link Only).
Huang, Toroidal Engine Ver:2.0, 2017. (Video Only) https://www.youtube.com/watch?v=n5L0Zc61c8Y&feature=youtu.be.
Integrated Publishing, Throttle Body Injection System, Construction Training Manuals, Construction Mechanic Basic, 2 Pages. http://constructionmanuals.tpub.com/14264/css/Throttle-Body-Injection-System-145.htm.
Ishikawa et al., Development of High Efficiency Gas Turbine Combined Cycle Power Plant, Power Systems Headquarters, Mitsubishi Heavy Industries, Ltd., Technical Review, vol. 45, No. 1, Mar. 2008, pp. 15-17. http://courses.me.metu.edu.tr/courses/me476/downloads/476s08ProjectPt4GtTemp.pdf.
Kannan et al., Exploration of Combustion Efficiency Using Preformed Vortex Patterns: A Study on IC Engine, Lambert Academy Publishing, Dec. 19, 2016. (Abstract; Paperback Purchase Only) https://www.amazon.com/Exploration-Combustion-Efficiency-Preformed-Patterns/dp/3330023627.
Kitazaki et al., Development of Zero Emission Generating System Stirling Engine, Yanmar Technical Review, Jan. 27, 2017, 7 Pages. https://www.yanmar.com/ph/technology/technical_review/2017/0127_5.html.
Kulkarni et al., Liquid Sheet Breakup in Gas-Centered Swirl Coaxial Atomizers, Journal of Fluids Engineering, ResearchGate, vol. 132, No. 1, Jan. 2010, 9 Pages. https://www.researchgate.net/publication/245357304_Liquid_Sheet_Breakup_in_Gas-Centered_Swirl_Coaxial_Atomizers.
Linne et al., Ballistic Imaging of the Liquid Core for a Steady Jet in Crossflow, OSA Publishing, Applied Optics, vol. 44, Issue 31, 2005, p. 6627-6634. (Abstract Only) http://proxy.osapublishing.org/ao/ViewMedia.cfm?url=ao-44-31-6627&seq=0&guid=173840e8-e788-546e-369a-b27a62f3465a&html=true.
Martini, Stirling Engine Design Manual, NASA-CR-168088, Second Edition, Jan. 1983, 410 Pages. https://ntrs.nasa.gov/archive/nasa/casi.ntrs.nasa.gov/19830022057.pdf.
Mcdonald, Recuperator Considerations for Future Higher Efficiency Microtuthines, Applied Thermal Engineering, ScienceDirect, vol. 23, Issue 12, Aug. 2003, pp. 1463-1487. (Abstract Only) https://www.sciencedirect.com/science/article/pii/S1359431103000838.
Microgen Engine Corporation. Technology. (Web Link Only) https://www.microgen-engine.com/technology/technology/.
Microturbines and Micro Gas Turbines, An Introduction and Technical Guide, UK, 11 Pages. http://www.gasturbineworld.co.uk/microturbineguide.html.
Min et al., High temperature heat exchanger studies for applications to gas turbines, Heat and Mass Transfer, SpringerLink, 2009, vol. 46, p. 175. (Abstract Only) https://link.springer.com/article/10.1007/s00231-009-0560-3.

(56) References Cited

OTHER PUBLICATIONS

Module Two: Air Flow and Fluid Dynamics, Fluid Mechanics: Properties and Behaviors of Fluids in Motion, 15 Pages. https://media.lanecc.edu/users/driscolln/RT112/Air_Flow_Fluidics/Air_Flow_Fluidics7.html.

Morring, Jr., Flight Tests for Vortex Rocket Combustion, Vortex Rocket Combustion is Vetted, Aviation Week & Space Technology, Nov. 5, 2012, 4 Pages. http://aviationweek.com/awin/flight-tests-vortex-rocket-combustion.

Murphy, IAV Sees Huge Potential With 3D-Printed Pistons, Wards Auto, Apr. 12, 2018, 6 Pages. https://www.wardsauto.com/engines/iav-sees-huge-potential-3d-printed-pistons.

Nguyen et al., Effect of solid heat conduction on heat transfer performance of a spiral heat exchanger, Applied Thermal Engineering, ScienceDirect, vol. 76, Feb. 5, 2015, pp. 500-409. (Abstract Only) https://www.sciencedirect.com/science/article/pii/S1359431114010199.

Ni et al., Improved Simple Analytical Model and Experimental Study of a 100 W B-Type Stirling Engine, Applied Energy, vol. 169, 2016, pp. 768-787. https://www.researchgate.net/publication/296632477_Improved_Simple_Analytical_Model_and_experimental_study_of_a_100W_b-type_Stirling_engine/figures?lo=.

Nightingale et al., Automotive Stirling Engine Development Program, NASA-CR-174873, DOE/NASA/0032-25, MTI-85ASE445SA7, NASA, Topical Semiannual Technical Progress Report for Period Jul. 1- Dec. 31, 1984, Lewis Research Center, Published Nov. 1985, 88 Pages. https://ntrs.nasa.gov/archive/nasa/casi.ntrs.nasa.gov/19870020790.pdf.

Nightingale, Automotive Stirling Engine, Mod II Design Report, NASA CR-175106, DOE/NASA/0032-28, MTI86ASE58SRI, New York, 1986, 54 Pages. https://ntrs.nasa.gov/archive/nasa/casi.ntrs.nasa.gov/19880002196.pdf.

O'Dell, SuperTruck Program Scores Big, Head into Second 5-Year Phase, Trucking.com, 2016, 7 pages. https://www.trucks.com/2016/10/31/supertruck-program-5-year-phase/.

Ohio University, Chapter 2a Alpha Stirling Engines, Stirling Engine Configurations, Mar. 30, 2013, 5 Pages. https://www.ohio.edu/mechanical/stirling/engines/engines.html.

Owczarek, On the Design of Lubricant Free Piston Compressors, Nonlinear Solid Mechanics, Faculty of Engineering Technology, Thesis, University of Twente, Enschede, Sep. 17, 2010. (Abstract Only) https://research.utwente.nl/en/publications/on-the-design-of-lubricant-free-piston-compressors.

Owkes et al., Turbulent Liquid Jet in Cross-Flow Atomization in YouTube Video, Published May 11, 2013. (Video Link Only) https://www.youtube.com/watch?v=Uciwt79T4ck.

Panesar et al., Strategies for Functionally Graded Lattice Structures Derived Using Topology Optimisation for Additive Manufacturing, ScienceDirect, Additive Manufacturing, vol. 19, Jan. 2018, pp. 81-94. https://doi.org/10.1016/j.addma.2017.11.008.

Park et al., Thermal/Fluid Characteristics of Isotropic Plain-Weave Screen Laminates as Heat Exchange Surfaces, AIAA 2002-0208, 2002, pp. 1-9 https://wolfweb.unr.edu/~rawirtz/Papers/AIAA2002-0208.pdf.

Penswick et al., Duplex Stirling Machines, Sunpower Incorporated 19th Annual Intersociety Energy Conversion Engineering Conference, QP051082-A, vol. 3, No. CONF-840804, United States, 1984, 7 Pages. https://www.ohio.edu/mechanial/stirling/engines/Duplex-Stirling-Machines.pdf.

Pneumatic Round Body Cylinder—SRG_SRG Series, Parker, Richland MI, 3 Pages. https://ph.parker.com/us/en/pneumatic-round-body-cylinder-srg-srgm-series.

Prabhakaran et al., Effect of temperature on Atomization in Gas Centered Coaxial Injection Systems, Bombay: Indian Institute of Technology, 2009, 8 pages. https://pdfs.semanticscholar.org/6fb6/98e68d2111ef54ad72d40a9fa106f8b63991.pdf.

Proeschel, Proe 90™ Recuperator for Microturbine Applications, ASME Proceedings, GT2002-30406, Vehicular and Small Turbomachines, ASME Turbo Expo 2002: Power for Land, Sea, and Air Jun. 3-6, 2002, Amsterdam, The Netherlands, vol. 1, pp. 1033-1044. (Abstract Only) http://proceedings.asmedigitalcollection.asme.org/proceeding.aspx?articleID=1574944.

Qiu et al., Advanced Stirling Power Generation System for CHP Application, ARPA, Temple University, Philadelphia, 5 Pages. https://arpa-e.energy.gov/sites/default/files/Temple_GENSETS_Kickoff.pdf.

Ranieri et al., Efficiency Reduction in Stirling Engines Resulting from Sinusoidal Motions, Energies, vol. 11, No. 11: 2887, 2018, 14 Pages. https://doi.org/10.3390/en11112887.

Renewable Energy, Double-Acting Stirling Engine, Stirling Engine, 1 Page. (Abstract Only) https://sites.google.com/a/emich.edu/cae546846t5/history/types/double--acting-stiring-engine.

Rodriguez Perez, Cellular Nanocomposites: A New Type of Light Weight Advanced Materials with Improved Properties, CellMat Technologies S.L. Transfer Center and Applied Technologies, Valladolid, 35 Pages. http://crono.bu.es/innovationh2020/pdf/cellmat.pdf.

Schonek, How big are power line losses?, Energy Management/Energy Efficiency, Schneider Electric, Mar. 25, 2013, 2 Pages. https://blog.scheider-electric.com/energy-management-energy-efficiency/2013/03/25/how-big-are-power-line-losses/.

Schwartz, The Natural Gas Heat Pump and Air Conditioner, 2014 Building Technologies Office Peer Review, ThermoLift, Inc., U.S. Department of Energy, Energy Efficiency & Renewable Energy, DE-FOA-0000823, 27 pages (Refer to p. 7) https://www.energy.gov/sites/prod/files/2014/11/f19/BTO%202014%20Peer%20Review%20Presentation%20-%20ThermoLift%204.14.pdf.

Shepard, Bubble Size Effect on Effervescent Atomization, ResearchGate, University of Minnesota Dissertation Thesis, Jun. 2011, 164 Pages. https://www.researchgate.net/publication/295855028_Bubble_Size_Effect_on_Effervescent_Atomization.

Shih et al., Thermal Design and Model Analysis of the Swiss-roll Recuperator for an Innovative Micro Gas Turbine, Applied Thermal Engineering, ScienceDirect, vol. 29, Issues 8-9, Jun. 2009, pp. 1493-1499. (Abstract Only) https://www.sciencedirect.com/science/article/pii/S1359431108002895.

Shimizu, Next Prius Will Have Engine Thermal Efficiency of 40%, XTECH, Solar Plant Business, Nikkei Business Publications, May 22, 2015, 2 Pages. https://tech.nikkeibp.co.jp/dm/english/NEWS_EN/20150522/419560/.

Stirling Engines, Regenerators, What They Are and How They Work, American Stirling Company, 7 Pages. https://www.stirlingengine.com/regenerators/.

Stirling Engines, Solar Cell Central, 3 Pages. http://solarcellcentral.com/stirling_page.html.

Technology, Microgen Engine Corporation, 2016, 4 Pages https://www.microgen-engine.com/technology/technology/.

TECPRO, Spray Engineering Info, Australia, 7 Pages. https://www.tecpro.com.au/technical-info/spray-engineering/.

ThermoLift, Technology—Background, The Thermodynamic Process Behind ThermoLift, ThermoLift, Inc., 3 Pages. http://www.tm-lift.com/background/.

Thimsen, Stirling Engine Assessment, 1007317, Electronic Power Research Institute (EPRI), Palo Alto, California, 2002, 170 Pages. https://www.engr.colostate.edu/~marchese/mech337-10/epri.pdf.

Thomassen, Free Floating Piston Film (mpeg).mpg, Mar. 5, 2010. (Video Only) https://www.youtube.com/watch?v=bHFUi0F0PgA.

Toptica Photonics, 2-Photon Polymerization, FemtoFiber Technology for Two-Photon Polymerization, 2 Pages. https://www.toptica.com/applications/ultrafast-studies/2-photon-ploymerization/.

Toyota Motor Corporation, Inline 4 Cylinder 2.5L Injection Gasoline Engine/New Transaxle, Global Website, Dec. 6, 2016, 2 Pages. https://global.toyota/en/download/14447877/.

Treece et al., Microturbine Recuperator Manufacturing and Operating Experience, GT2002-30404, ASME Proceedings, Vehicular and Small Tuthomachines, ASME Turbo Expo 2002: Power for Land, Sea, and Air Jun. 3-6, 2002, Amsterdam, The Netherlands, vol. 1, pp. 1017-1023. (Abstract Only) http://proceedings.asmedigitalcollection.asme.org/proceeding.aspx?articleID=1574937.

Tri Clamp, Tri Clamp Information and Sizing Guide, TriClamp Co., 3 Pages. https://triclamp.co/pages/tri-clamp-information-and-sizing-guide.

(56) References Cited

OTHER PUBLICATIONS

Tuncer et al., Structure-Property Relationship in Titanium Foams, Anadolu University, Turkey, Feb. 2011, 35 Pages. https://ocw.mit.edu/courses/materials-science-and-engineering/3-054-cellular-solids-structure-properties-and-applications-spring-2015/lecture-cotes/MIT3_054S15_L13_Cellular.pdf.

Urieli, Chapter 5B—Regenerator Simple Analysis, Stirling Cycle Machine Analysis, Ohio Edu,.Jan. 17, 2010, 5 Pages. https://www.ohio.edu/mechanical/stirling/simple/regen_simple.html.

Vodhanel, Characterization of Performance of a 3D Printed Stirling Engine Through Analysis and Test, Cleveland State University Engaged Scholarship@CSU, ETD Archive, 2016, 91 Pages. https://engagedscholarship.csuohio.edu/cgi/viewcontent.cgi?referer=https://www.google.com/&httpsredir=1&article=1944&context=etdarchive.

Wikipedia, Heat Engine, 8 Pages. https://en.wikipedia.org/wiki/Heat_engine.

Wikipedia, Regenerative Heat Exchanger, 3 Pages. https://en.wikipedia.org/wiki/Regenerative_heat_exchanger.

Wikipedia, Spray Nozzle, 11 Pages. https://en.wikipedia.org/wiki/Spray_nozzle.

Wikipedia, Stirling Engine, 2019, 24 Pages. https://en.wikipedia.org/wiki/Stirling_engine.

Wirtz et al., High Performance Woven Mesh Heat Exchangers, Mechanical Engineering Department, University of Nevada, Reno, 2002, 8 Pages. https://apps.dtic.mil/dtic/tr/fulltext/u2/a408219.pdf.

Wirtz et al., Thermal/Fluid Characteristics of 3-D Woven Mesh Structures as Heat Exchanger Surfaces, IEEE Transactions on Components and Packaging Technologies, vol. 26, No. 1, Mar. 2003, pp. 40-47. https://pdfs.semanticscholar.org/d1a3/b4ce0baa639cf349d25d1506c3fa6118dc3e.pdf.

Wu et al., Model-based Analysis and Simulation of Regenerative Heat Wheel, ScienceDirect, Energy and Buildings, vol. 38, No. 5, May 2006, pp. 502-514. http://citeseerx.ist.psu.edu/viewdoc/download?doi=10.1.1.616.3103&rep=rep1&type=pdf.

Xiao et al., Recuperators for micro gas turbines: a review, Applied Energy, ScienceDirect, vol. 197, Jul. 1, 2017, pp. 83-99. (Abstract Only) https://sciencedirect.com/science/article/pi/S01306261917303367.

Xie et al., Investigation on the Performances of the Gas Driven Vuilleumier Heat Pump, International Refrigeration and Air Conditioning Conference, Purdue University, School of Mechanical Engineering, 2008, 7 Pages. https://docs.lib.purdue.edu/cgi/viewcontent.cgi?referer=https://www.google.com/&httpsredir=1&article=1935&context=iracc.

United States Non Final Office Action Corresponding to U.S. Appl. No. 16/878,760 dated Jul. 22, 2020.

United States Non Final Office Action Corresponding to U.S. Appl. No. 16/878,787 dated Jul. 21, 2020.

United States Non Final Office Action Corresponding to U.S. Appl. No. 16/878,797 dated Jul. 15, 2020.

\* cited by examiner

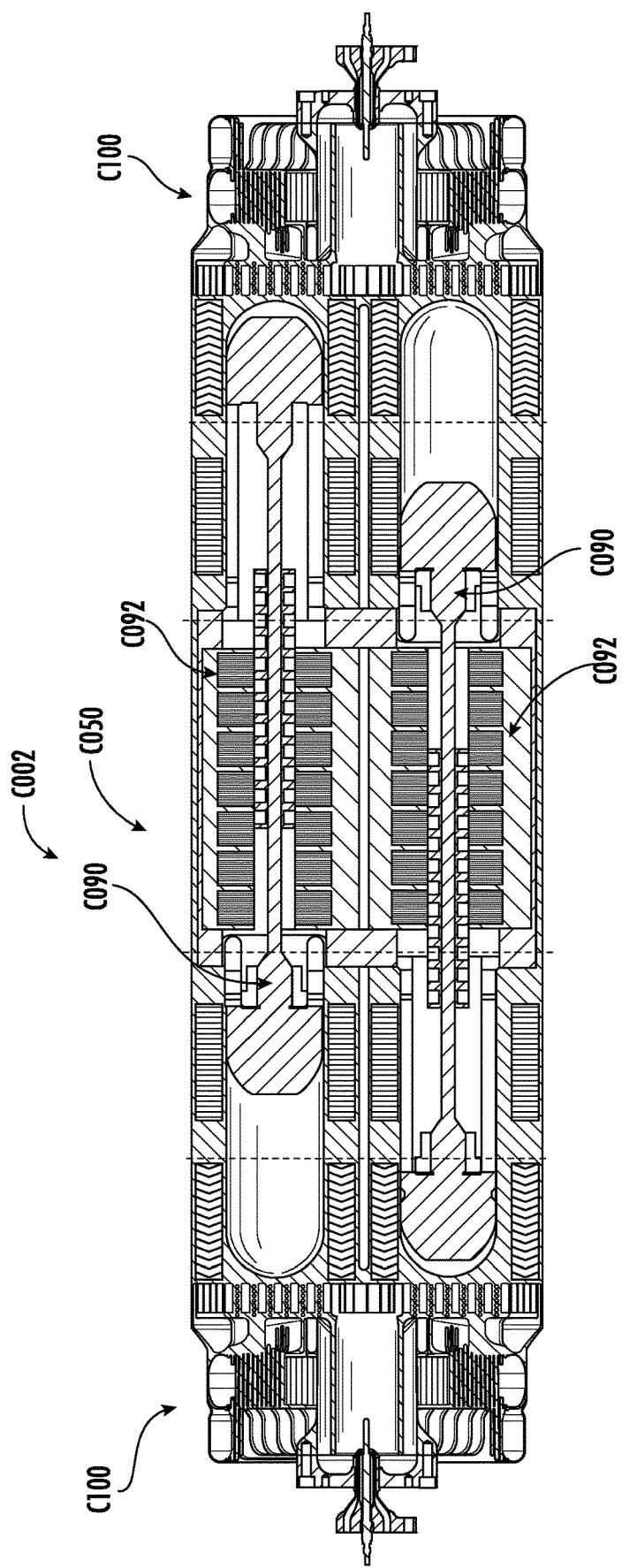
FIG. 4.1.1

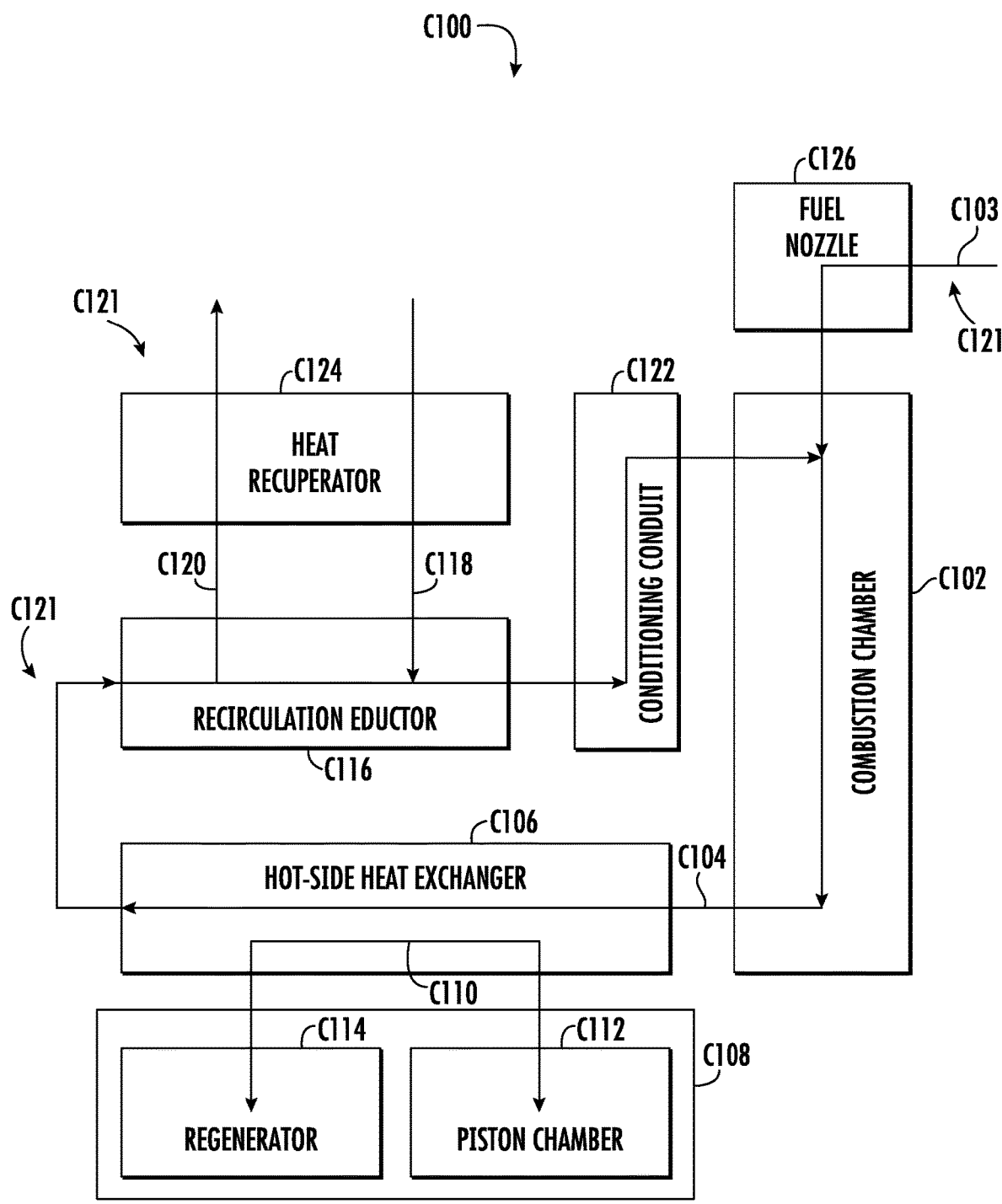
FIG. 4.1.2A

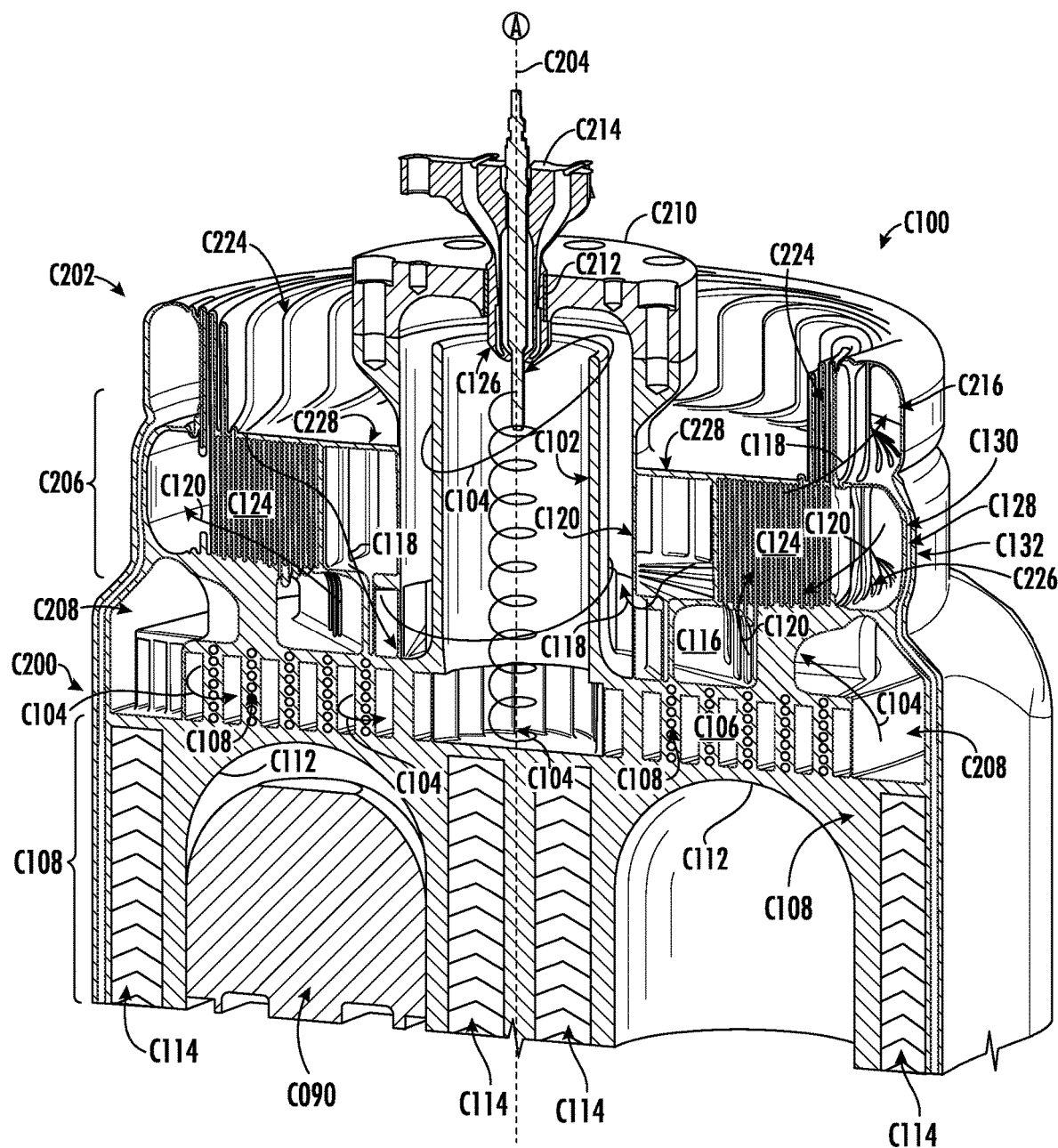
FIG. 4.1.3B

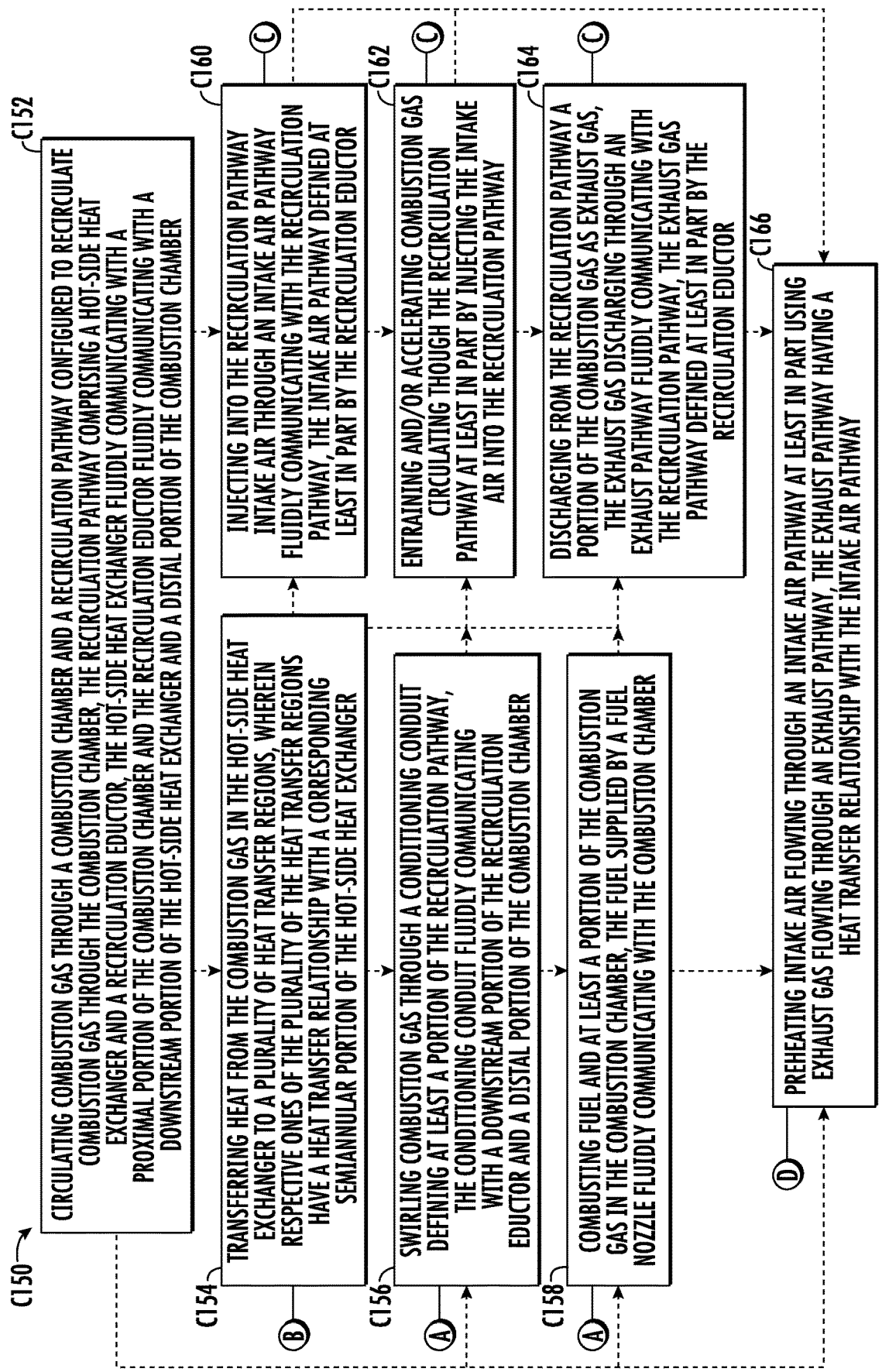
FIG. 4.1.5

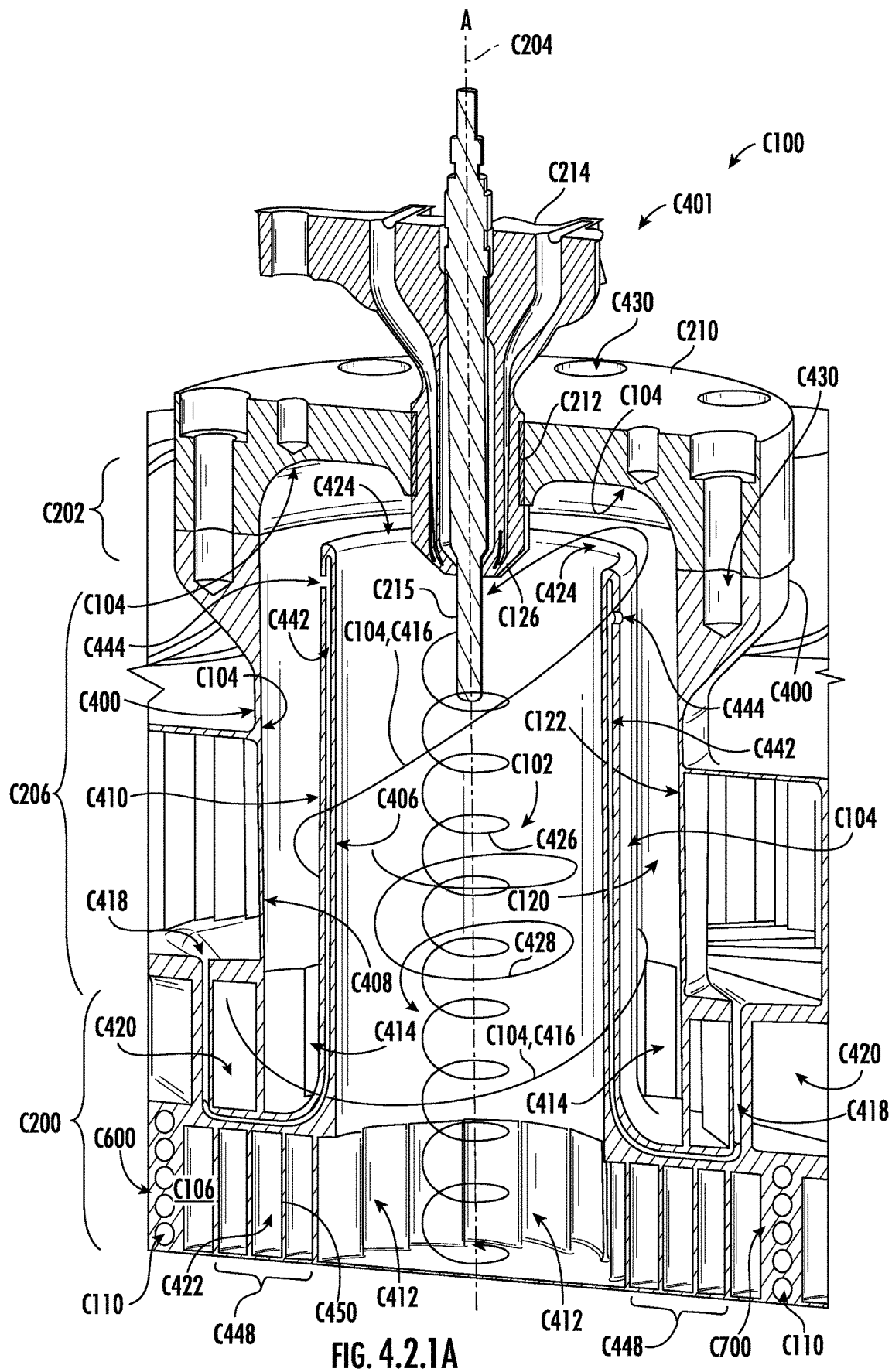
FIG. 4.2.1A

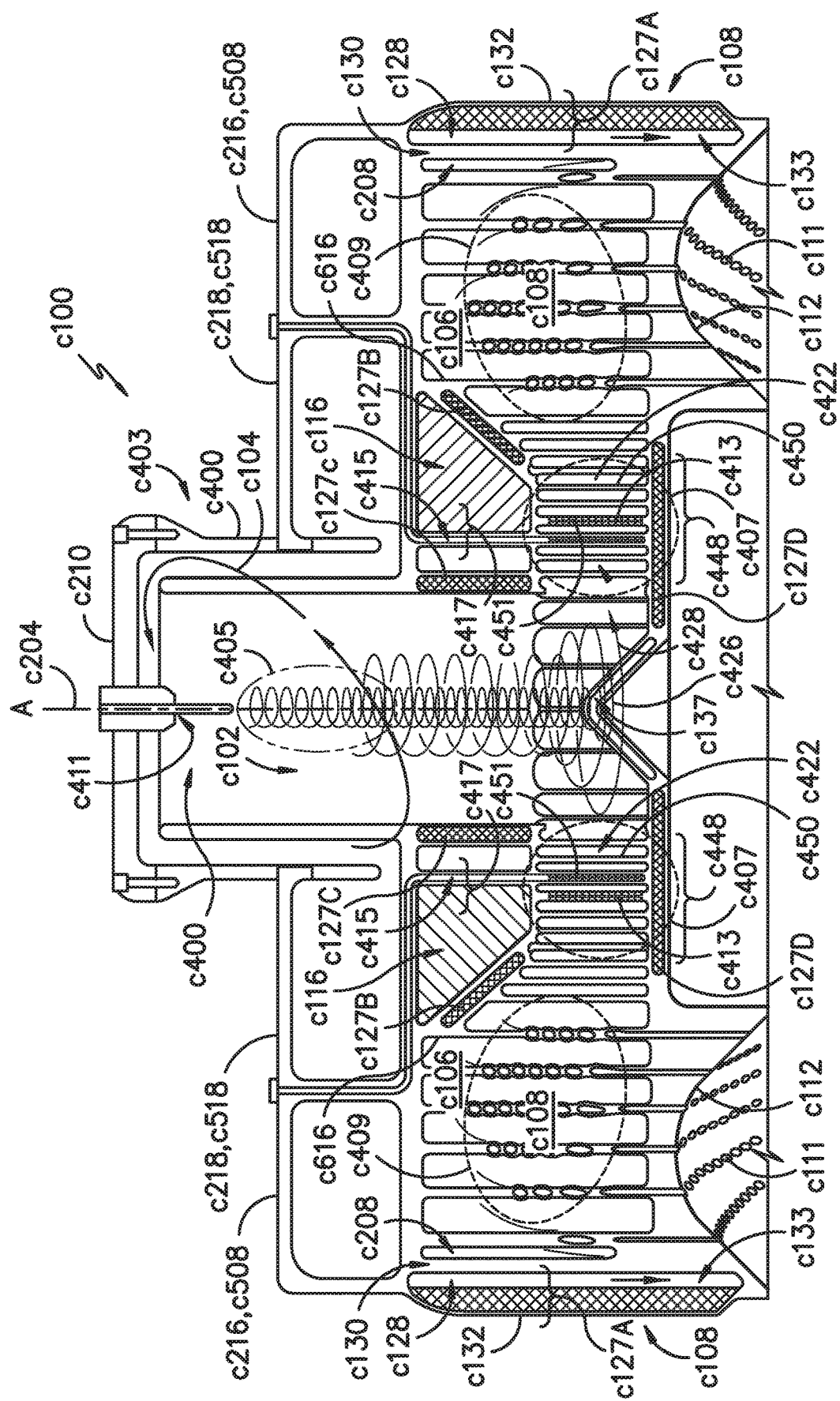
FIG. 4.2.2A

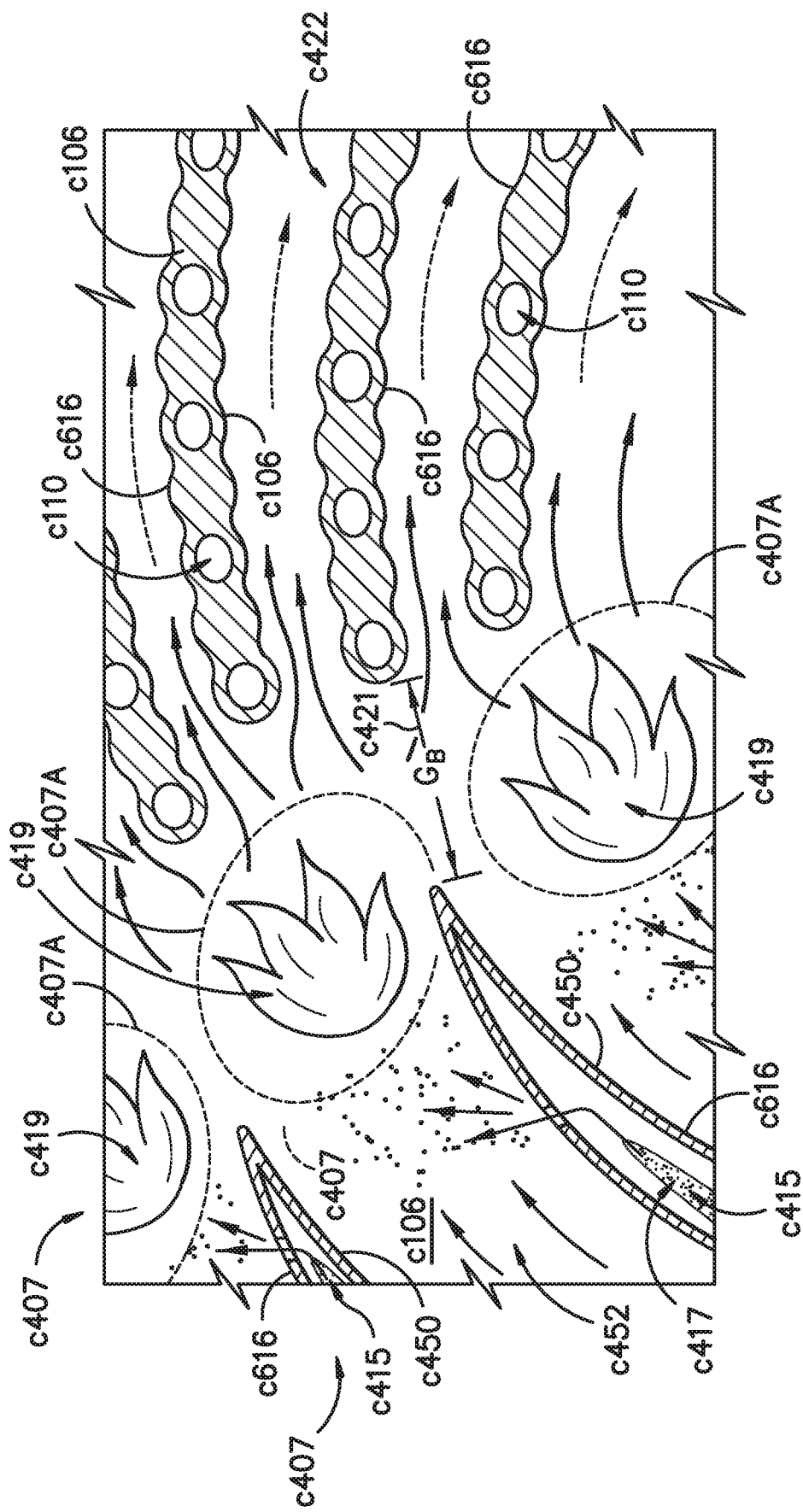
FIG. 4.2.2B

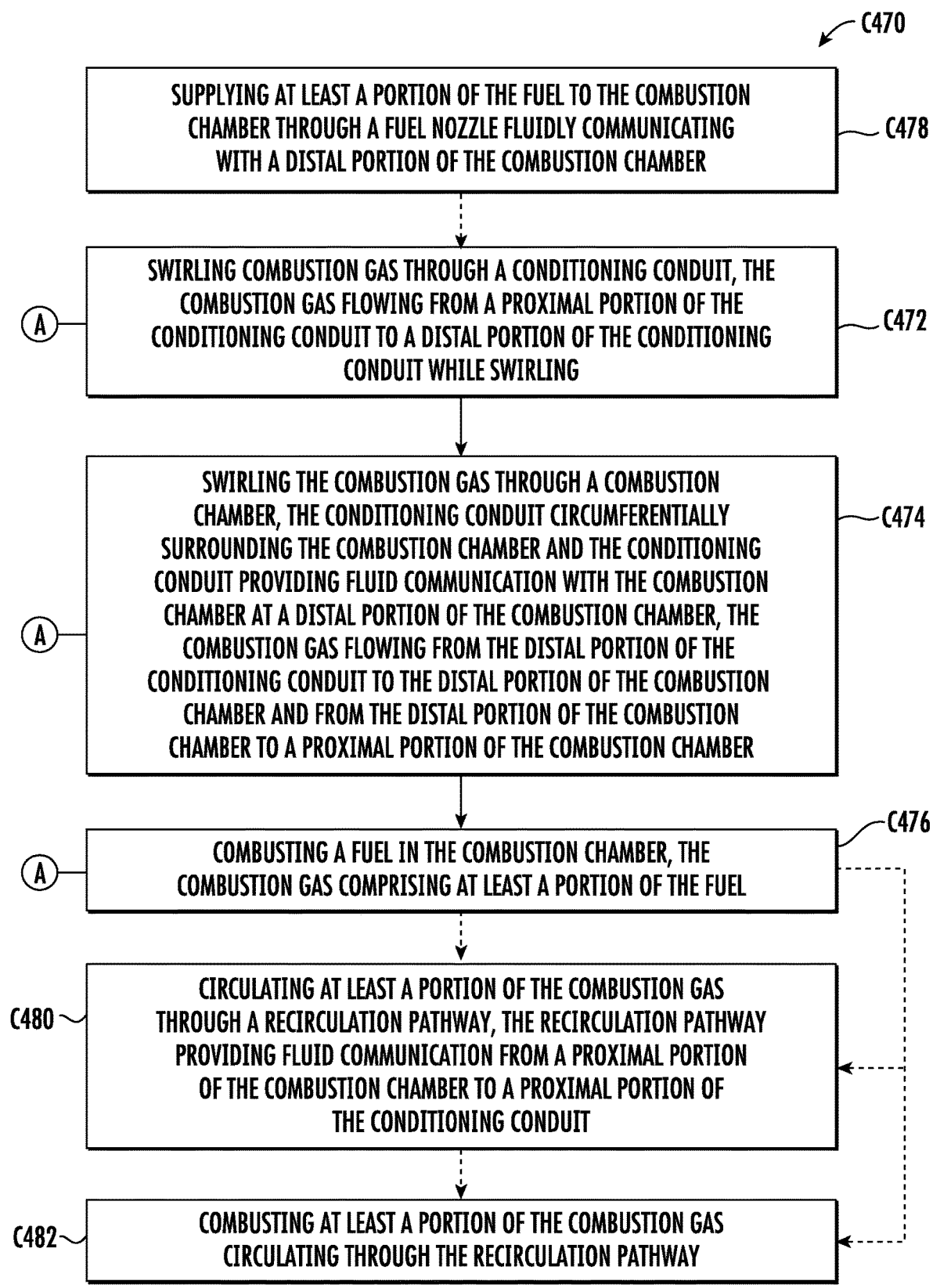
FIG. 4.2.5A

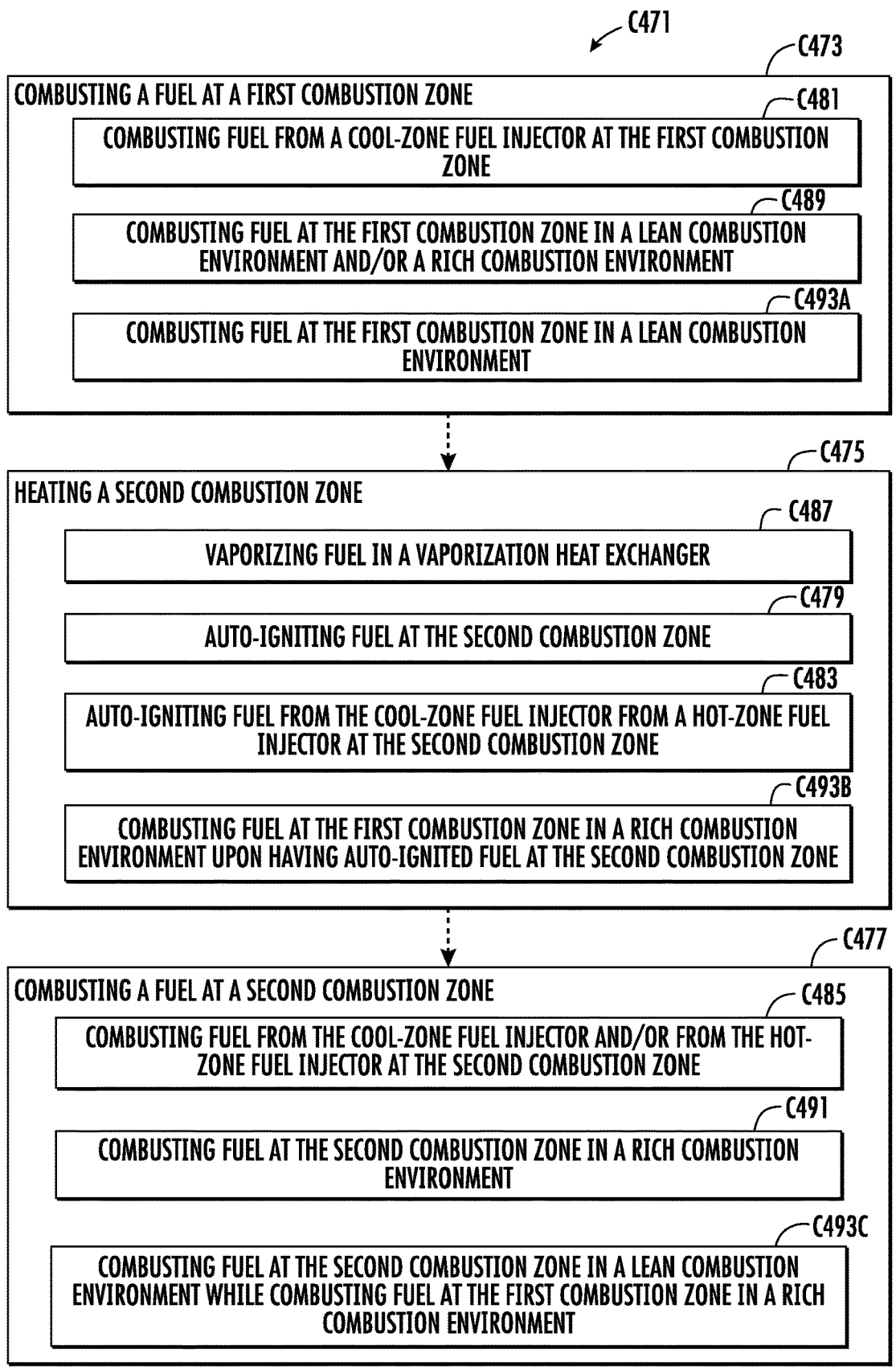
FIG. 4.2.5B

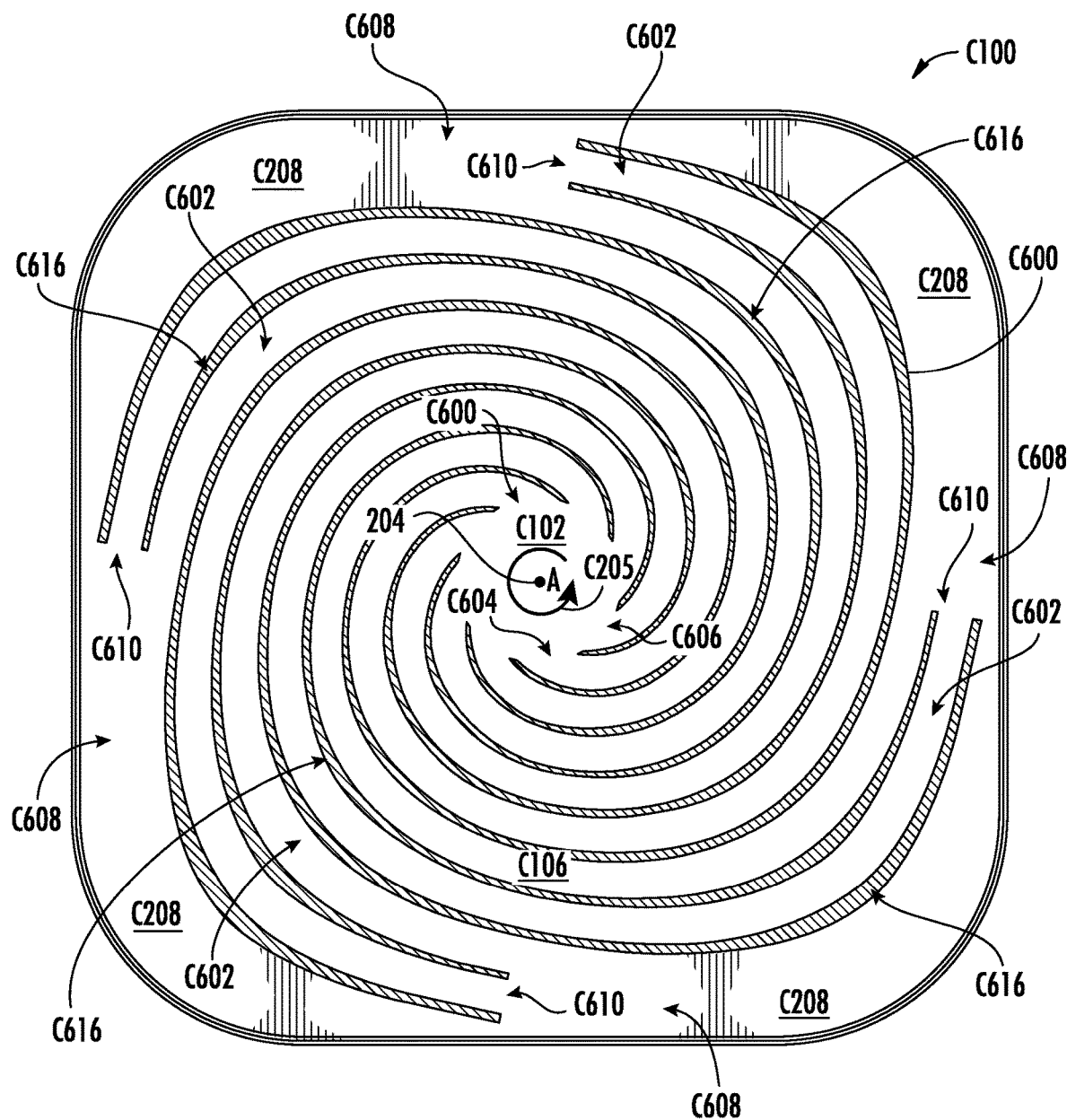
FIG. 4.4.1A

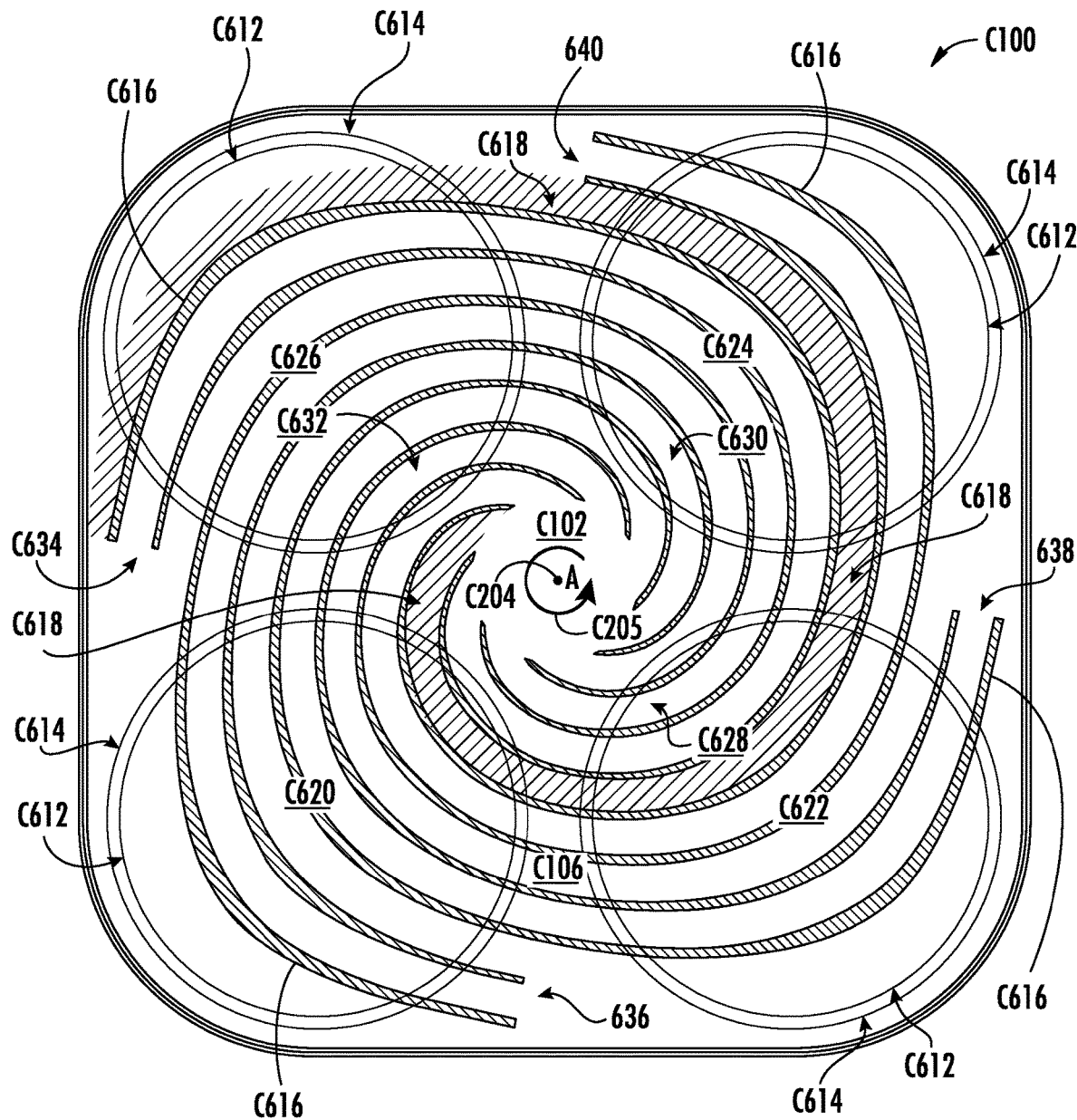
FIG. 4.4.1B

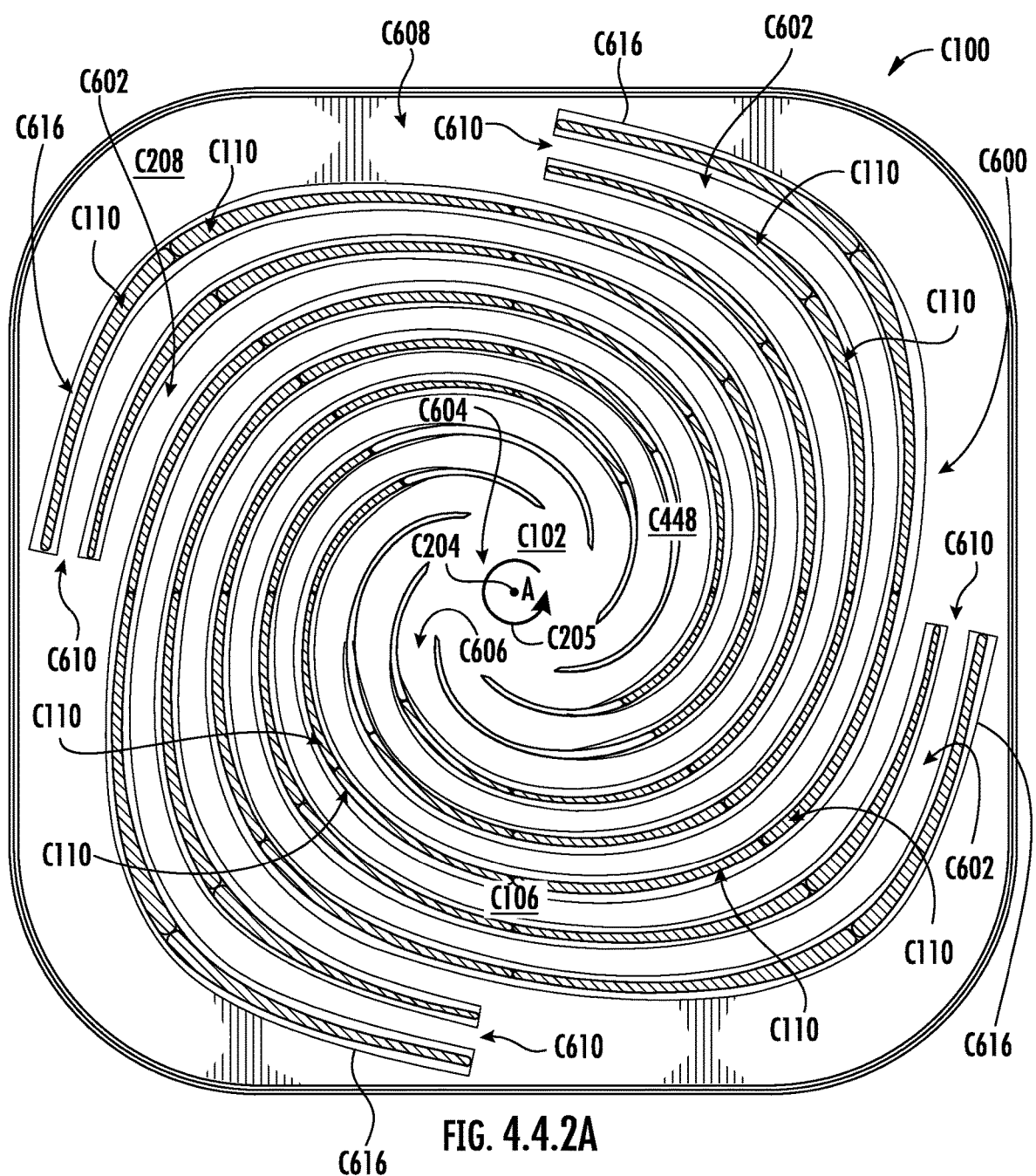
FIG. 4.4.2A

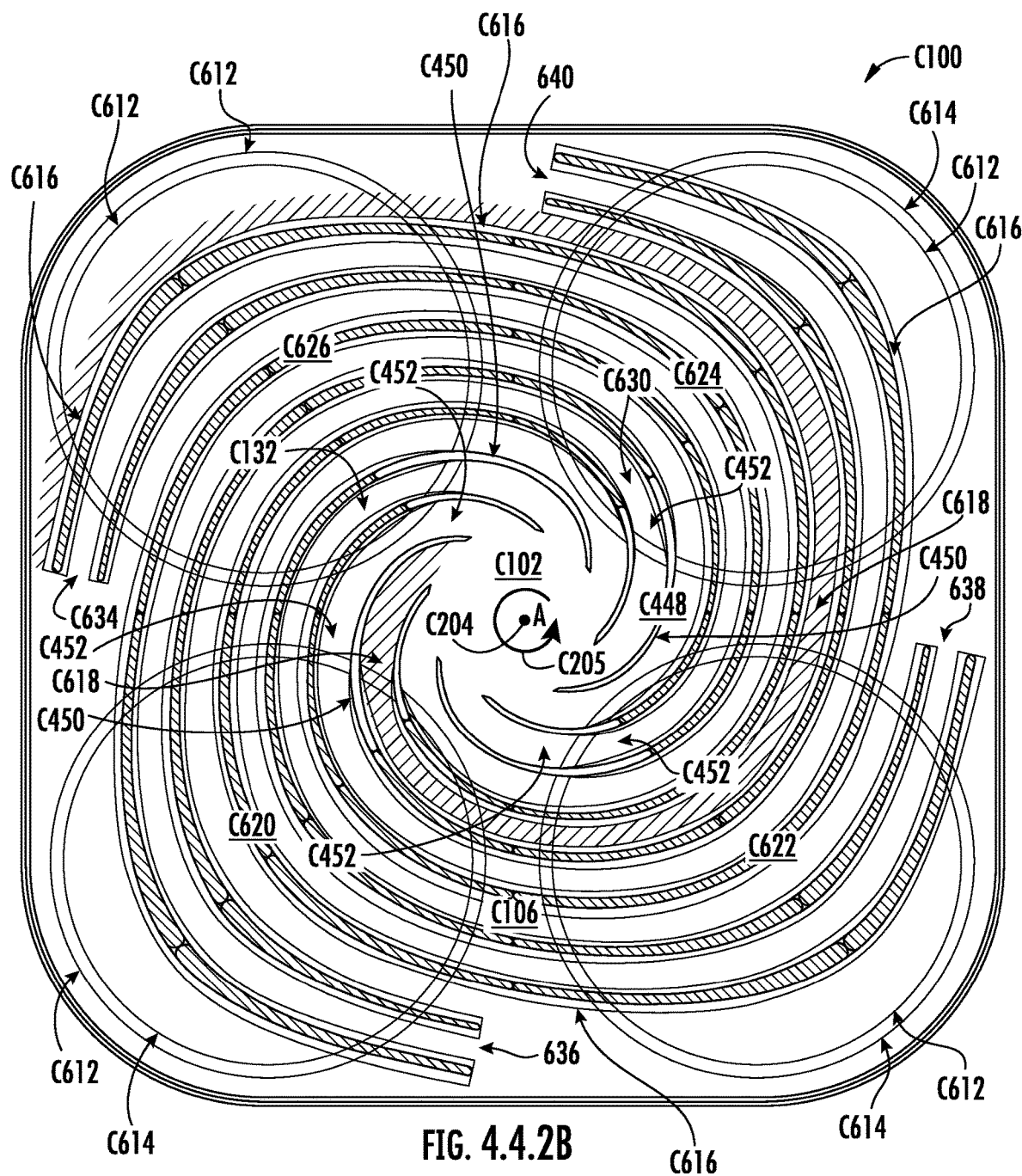
FIG. 4.4.2B

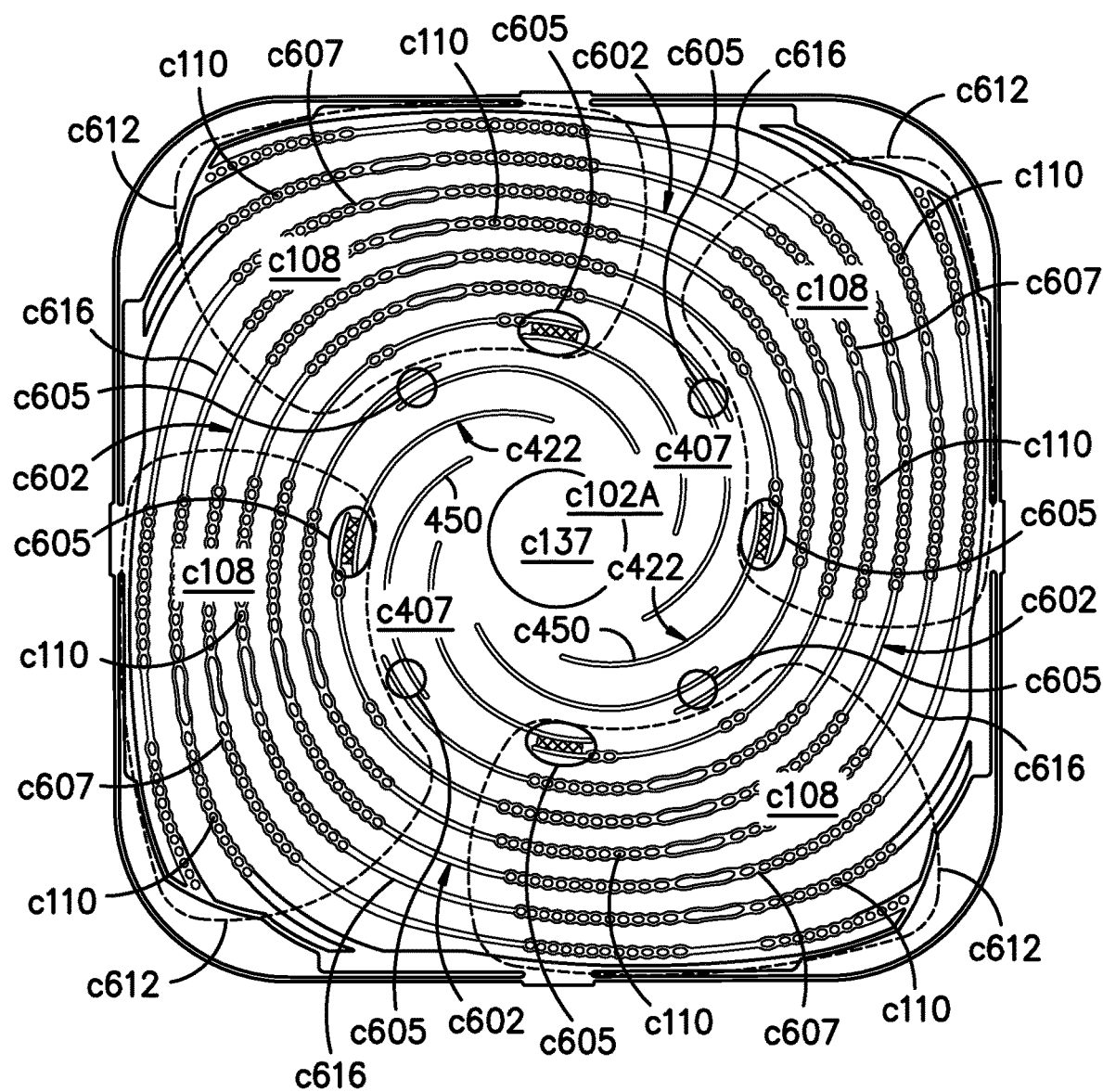
FIG. 4.4.3A

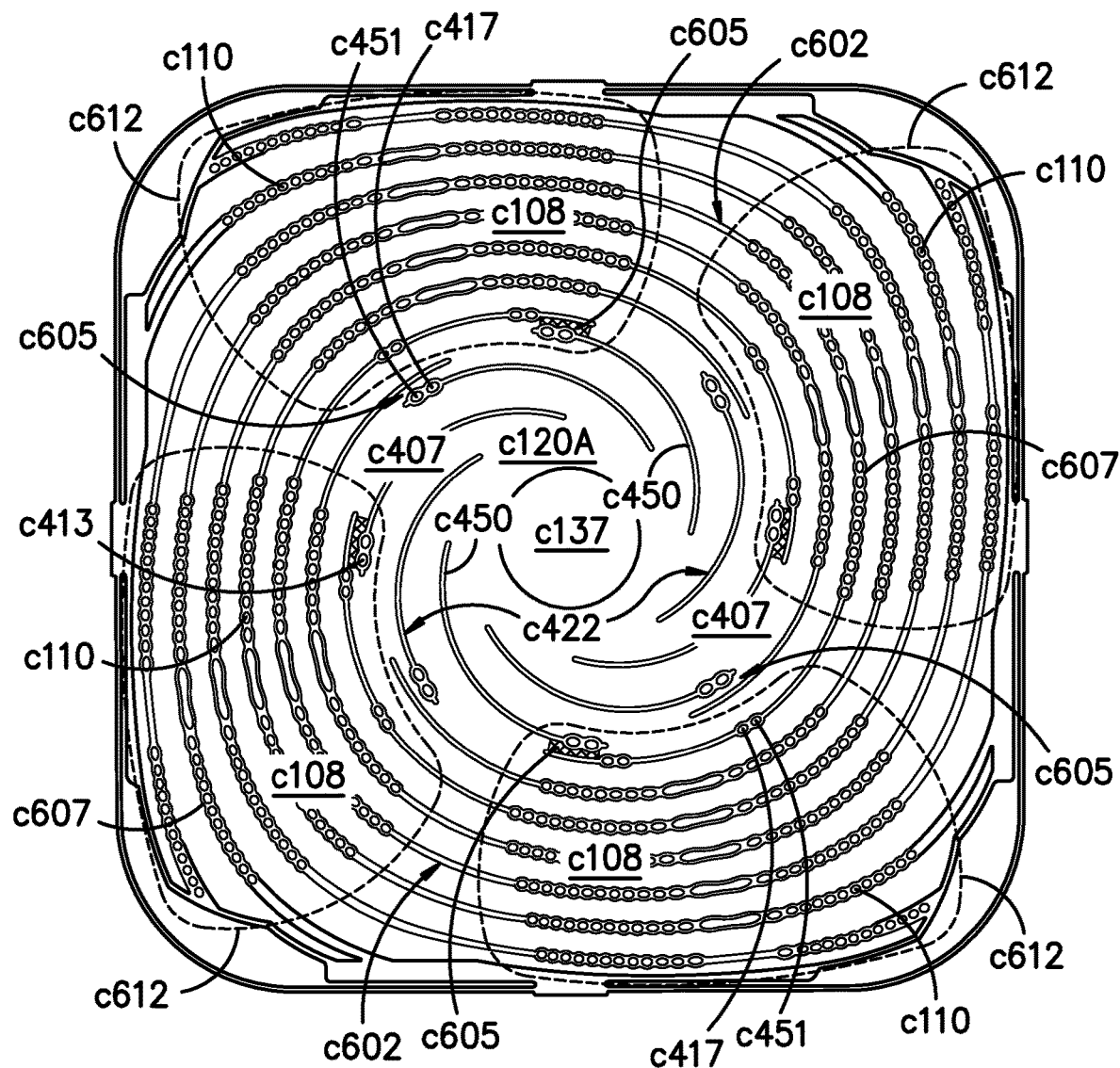
FIG. 4.4.3B

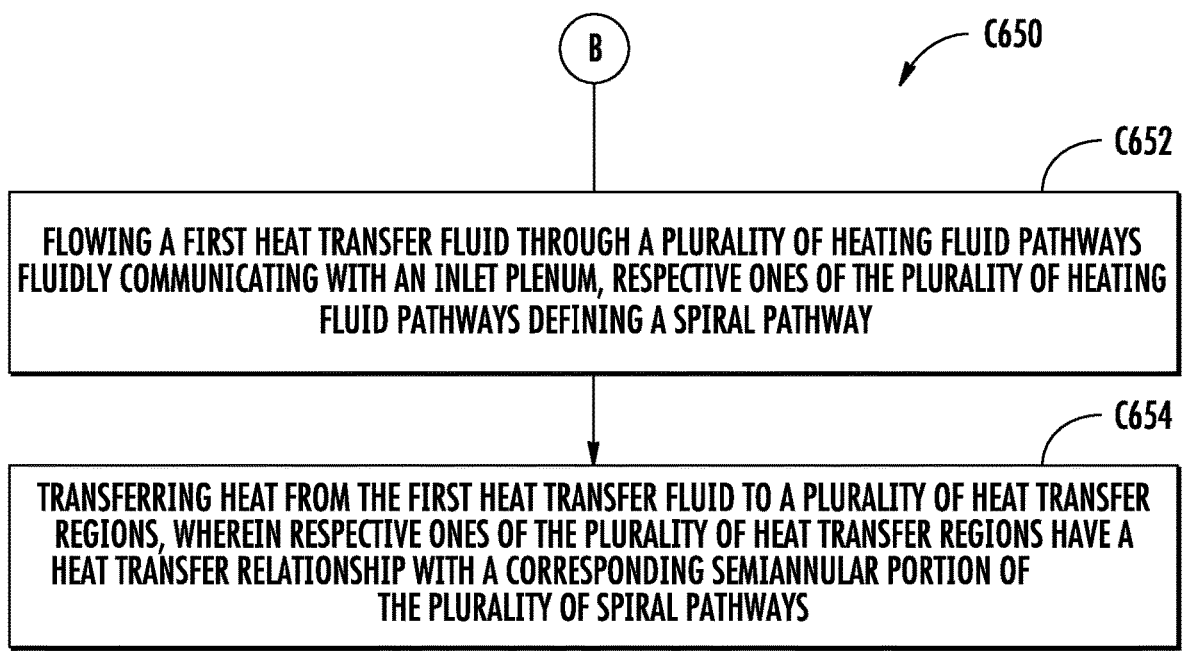
FIG. 4.4.4

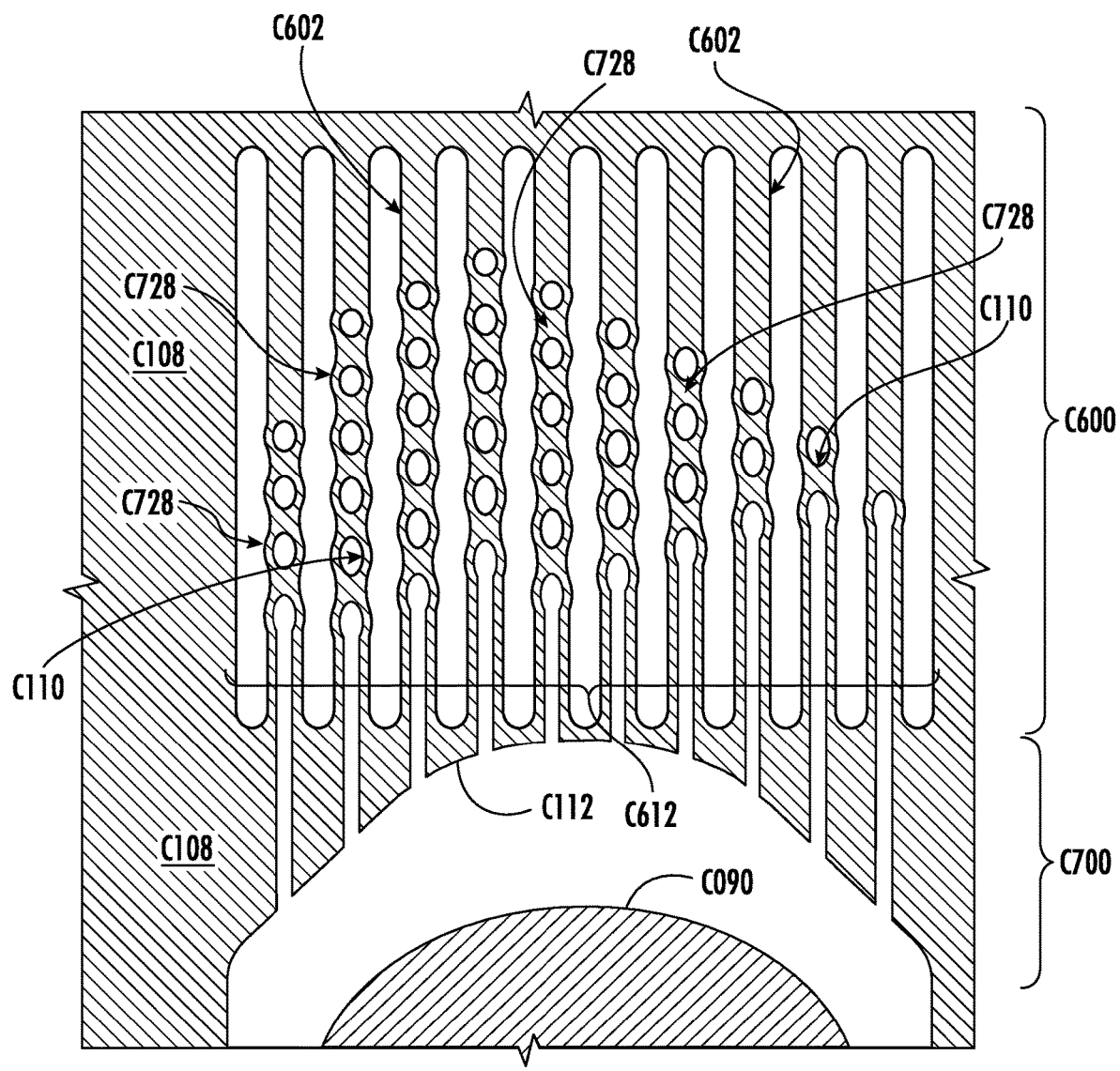
FIG. 4.5.2

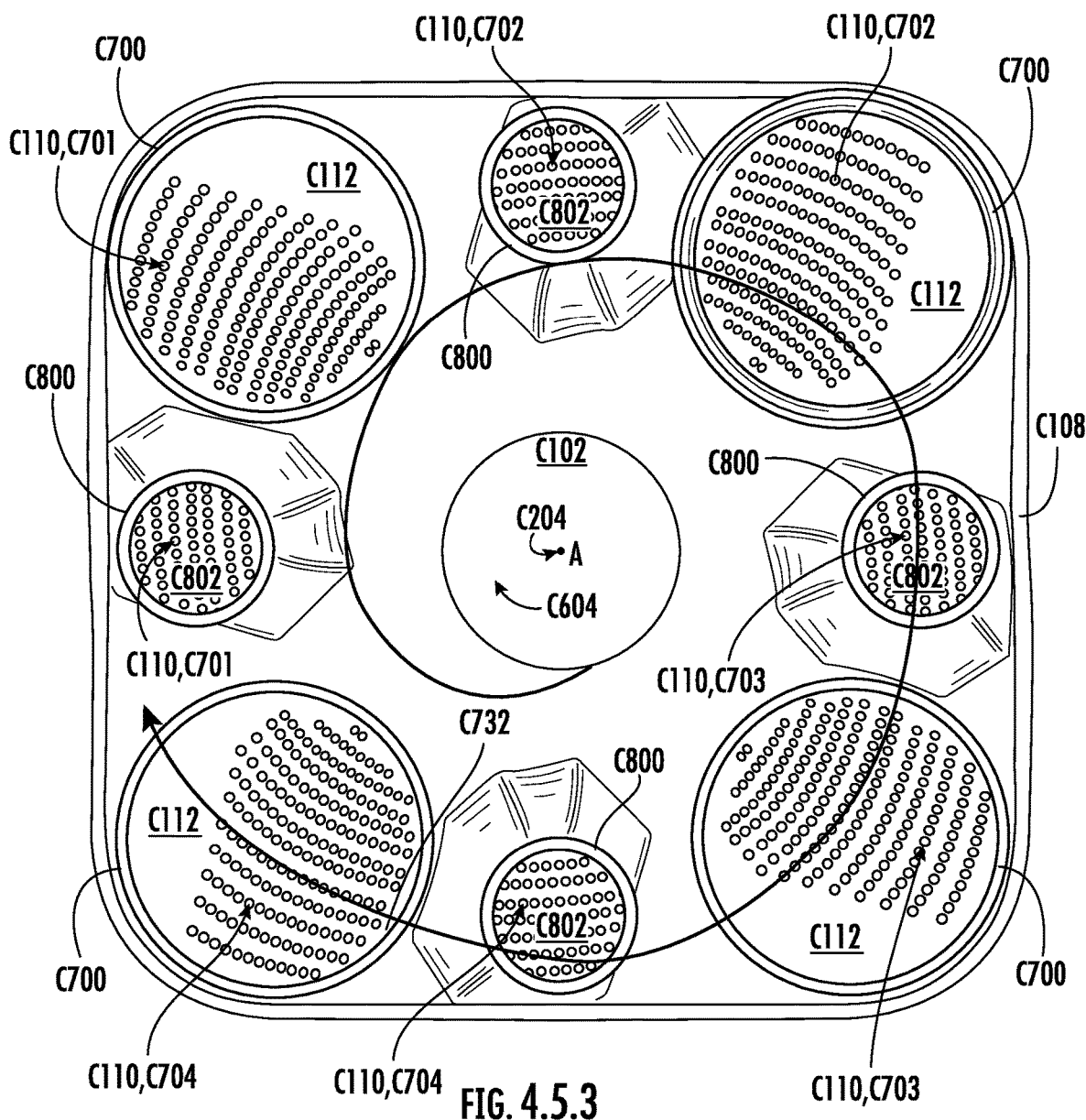
FIG. 4.5.3

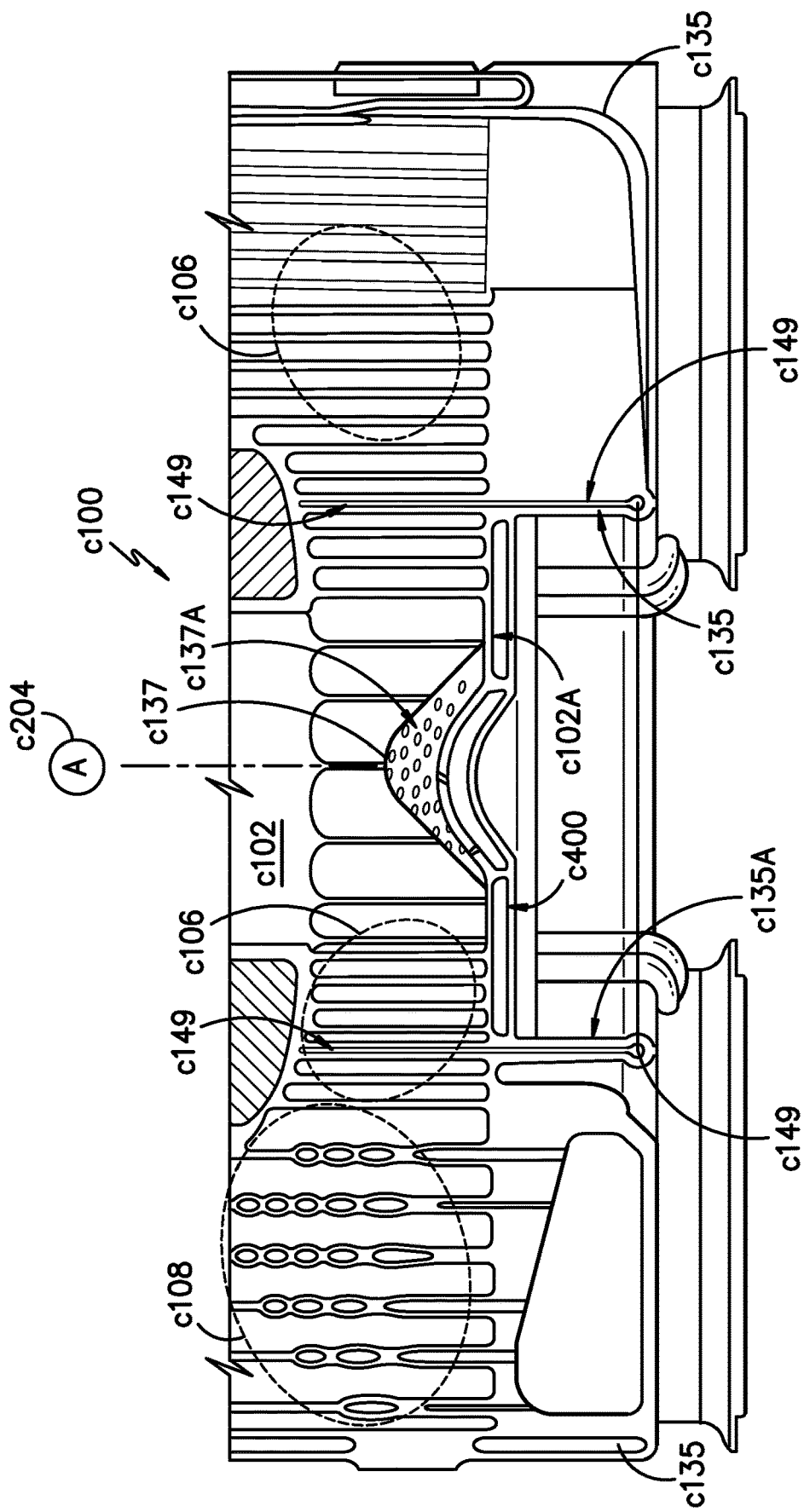
FIG. 4.5.5A

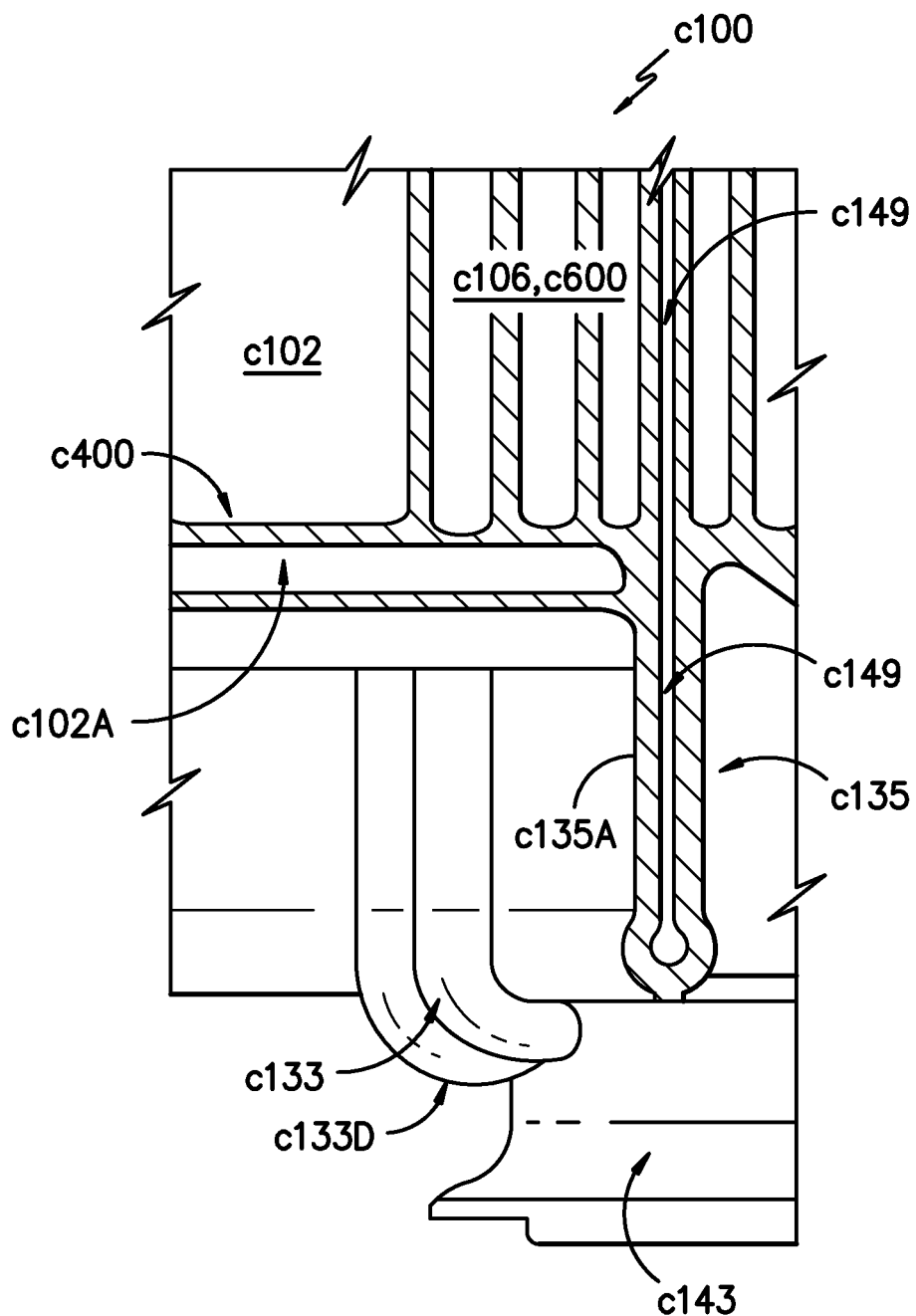
FIG. 4.5.5B

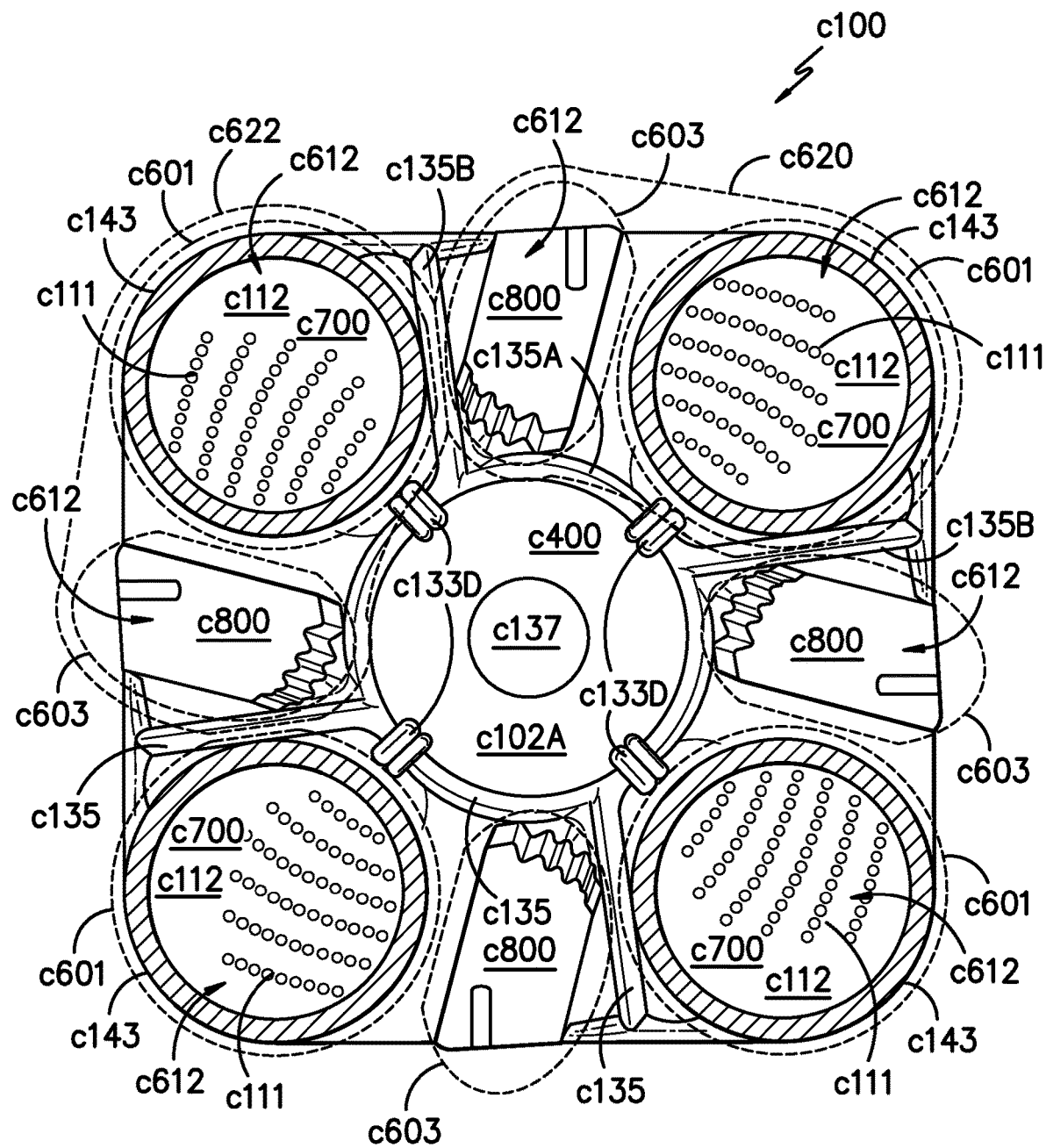
FIG. 4.5.5C

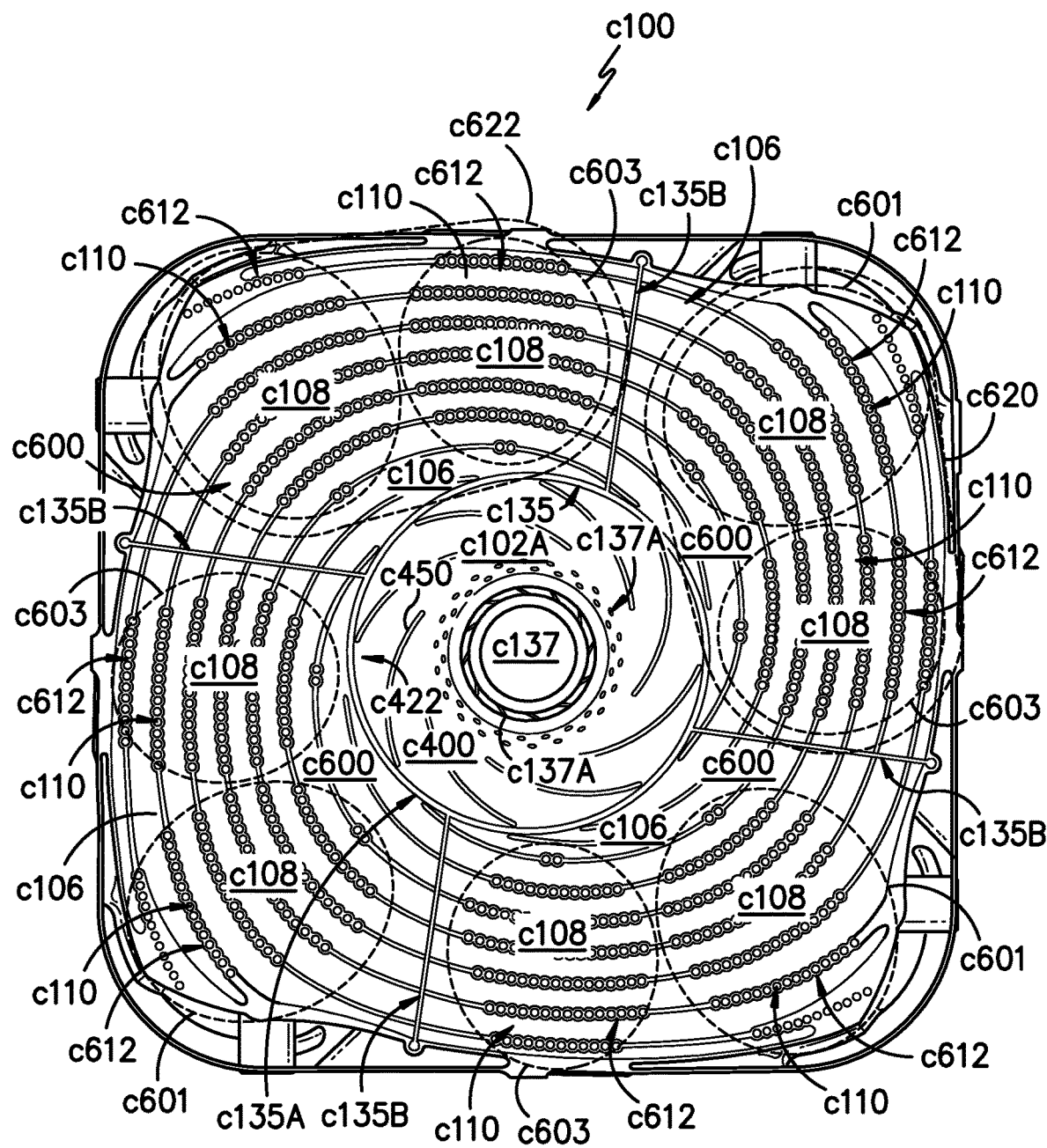
FIG. 4.5.5D

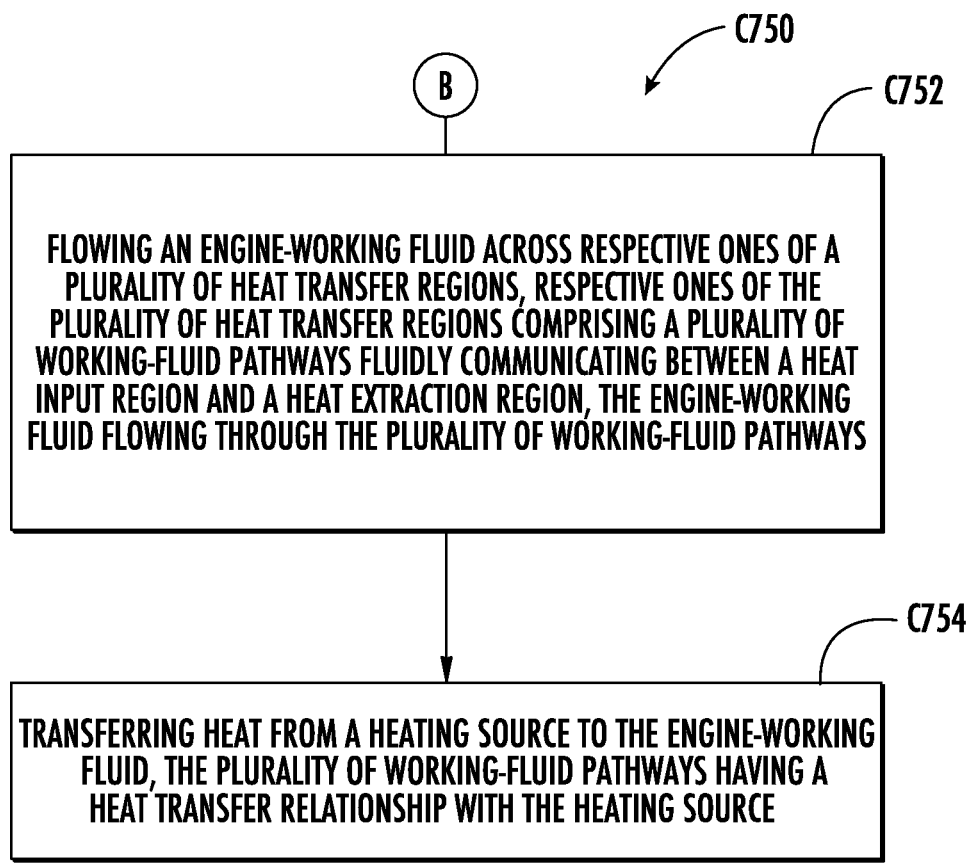
FIG. 4.5.6

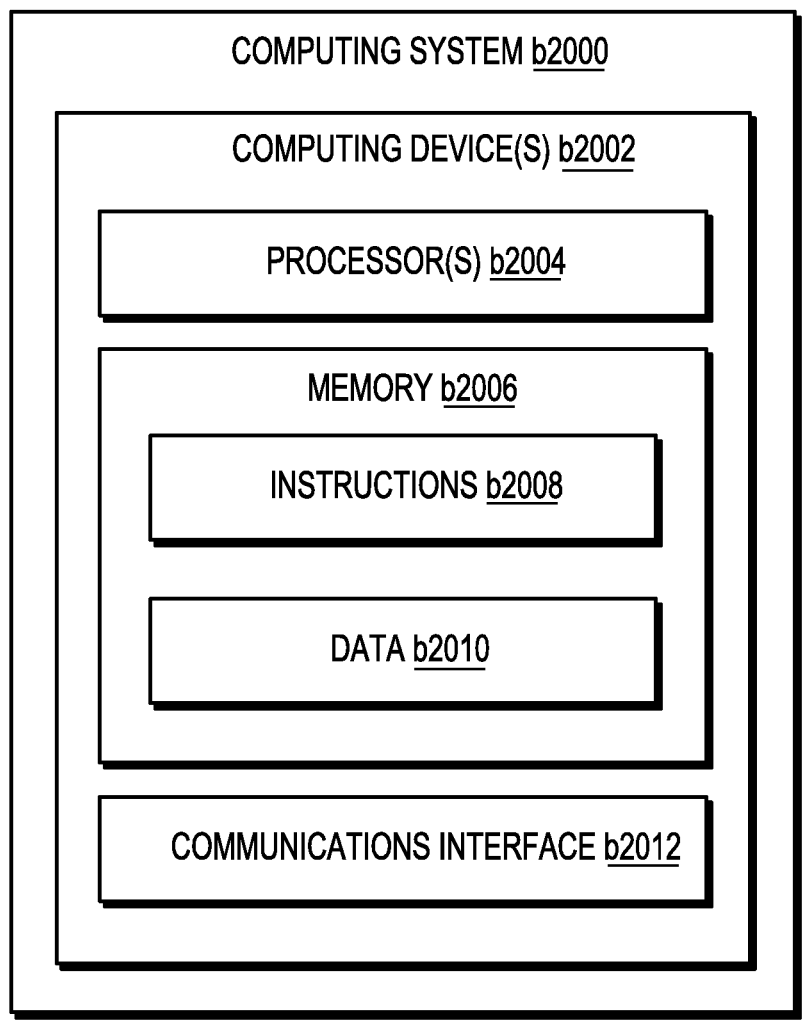
FIG. 5.1.28

MONOLITHIC HEAT-EXCHANGER BODIES

CROSS-REFERENCE TO RELATED APPLICATIONS

The present application claims priority to each of the following U.S. Provisional Applications, the contents of which are incorporated herein by reference in their entirety for all purposes as if set forth verbatim: App. No. 62/850,599, filed May 21, 2019; App. No. 62/850,623, filed May 21, 2019; App. No. 62/850,678, filed May 21, 2019; App. No. 62/850,692, filed May 21, 2019; and App. No. 62/850,701, filed May 21, 2019. The present application also incorporates by reference International Patent Application Number PCT/US2020/033674 filed on May 20, 2020 in its entirety for all purposes.

FIELD

The present subject matter relates generally to energy conversion systems, power generation systems, and energy distribution systems. The present subject matter additionally relates to heat exchangers and heat exchanger systems. The present subject matter further relates to piston engine assemblies, such as closed-cycle engine systems. The present subject matter still further relates to systems and methods for control or operation of one or more systems of the present subject matter herein.

BACKGROUND

Power generation and distribution systems are challenged to provide improved power generation efficiency and/or lowered emissions. Furthermore, power generation and distribution systems are challenged to provide improved power output with lower transmission losses. Certain power generation and distribution systems are further challenged to improve sizing, portability, or power density generally while improving power generation efficiency, power output, and emissions.

Certain engine system arrangements, such as closed cycle engines, may offer some improved efficiency over other engine system arrangements. However, closed cycle engine arrangements, such as Stirling engines, are challenged to provide relatively larger power output or power density, or improved efficiency, relative to other engine arrangements. Closed cycle engines may suffer due to inefficient combustion, inefficient heat exchangers, inefficient mass transfer, heat losses to the environment, non-ideal behavior of the working fluid(s), imperfect seals, friction, pumping losses, and/or other inefficiencies and imperfections. As such, there is a need for improved closed cycle engines and system arrangements that may provide improved power output, improved power density, or further improved efficiency. Additionally, there is a need for an improved closed cycle engine that may be provided to improve power generation and power distribution systems.

Additionally, or alternatively, there is a general need for improved heat transfer devices, such as for heat engines, or as may be applied to power generation systems, distribution systems, propulsion systems, vehicle systems, or industrial or residential facilities.

Furthermore, there is a need for improved control system and methods for operating power generation systems as may include subsystems that collectively may provide improved power generation efficiency or reduced emissions.

BRIEF DESCRIPTION

Aspects and advantages will be set forth in part in the following description, or may be apparent from the description, or may be learned through practicing the presently disclosed subject matter.

In one aspect, the present disclosure embraces monolithic heat exchanger bodies. An exemplary monolithic heat exchanger body may include a plurality of heating walls and a plurality of combustion fins. The plurality of heating walls may be configured and arranged in an array of spirals or spiral arcs relative to a longitudinal axis. Adjacent portions of the plurality of heating walls may respectively define a corresponding plurality of heating fluid pathways therebetween. The plurality of combustion fins may be circumferentially spaced about a perimeter of an inlet plenum. The inlet plenum may include or fluidly communicate with a combustion chamber. The plurality of heating fluid pathways may fluidly communicate with the inlet plenum. The plurality of combustion fins may occupy a radially or concentrically inward portion of the monolithic heat exchanger body. The plurality of heating fluid pathways may have a heat transfer relationship with a heat sink disposed about a radially or concentrically outward portion of the monolithic heat exchanger body. A plurality of conduction breaks may be disposed radially or concentrically outward relative to the plurality of combustion fins at least partially inhibit heat conduction from the plurality of combustion fins to the plurality of heating walls.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure including the best mode, directed to one of ordinary skill in the art, is set forth in the specification, which makes reference to the appended figures, in which:

FIG. 4.1.1 schematically depicts a cross-sectional view of an exemplary closed-cycle engine, which may be a regenerative heat engine and/or a Stirling engine;

FIG. 4.1.2A schematically depicts an exemplary heater bodies, which, for example, may be included in the closed-cycle engine shown in FIG. 4.1.1;

FIG. 4.1.3B schematically depicts a cross-sectional perspective view of an exemplary heater body, which, for example, may be included in the closed-cycle engine shown in FIG. 4.1.1;

FIG. 4.1.5 shows a flowchart depicting an exemplary method of heating a closed-cycle engine, such as a regenerative heat engine;

FIG. 4.2.1A shows a cross-sectional perspective view of an exemplary combustor body portion of a heater body that may be included in the heater body shown in FIG. 4.1.3B;

FIG. 4.2.2A schematically depicts a cross-sectional view of an perspective exemplary heater body that includes multi-stage combustion;

FIG. 4.2.2B schematically depicts a cross-sectional top-view of an exemplary combustion zone occupying a radially-inward portion of a hot-side heat exchanger;

FIG. 4.2.5A shows a flowchart depicting an exemplary method of combusting a fuel;

FIG. 4.2.5B shows a flowchart depicting another exemplary method of combusting a fuel;

FIG. 4.4.1A shows a top cross-sectional view of an exemplary heat exchanger body portion of a heater body;

FIG. 4.4.1B shows a top cross-sectional view of the exemplary heat exchanger body of FIG. 4.4.1A, with a plurality of heat transfer regions indicated;

FIG. 4.4.2A shows a top cross-sectional view of an exemplary heat exchanger body portion of a heater body, such as the heater body shown in FIG. 4.1.3B;

FIG. 4.4.2B shows a top cross-sectional view of the exemplary heat exchanger body of FIG. 4.4.2A, with a plurality of heat transfer regions indicated;

FIGS. 4.4.3A and 4.4.3B show top cross-sectional views of additional exemplary embodiments of a heat exchanger body;

FIG. 4.4.4 shows a flowchart depicting an exemplary method of heating a plurality of heat transfer regions;

FIG. 4.5.2 schematically depicts a cross-sectional view of another exemplary working-fluid body that may be included in a heater body, such as the heater body shown in FIG. 4.1.3B;

FIG. 4.5.3 schematically depicts a bottom cross-sectional view of an exemplary working-fluid body;

FIGS. 4.5.5A-4.5.5D schematically depict further aspects of an exemplary heater body;

FIG. 4.5.6 shows a flowchart depicting an exemplary method of heating an engine-working fluid; and FIG. 5.1.28 provides an example computing system in accordance with an example embodiment of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure and not limitation. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. In another instance, ranges, ratios, or limits associated herein may be altered to provide further embodiments, and all such embodiments are within the scope of the present disclosure. Unless otherwise specified, in various embodiments in which a unit is provided relative to a ratio, range, or limit, units may be altered, and/or subsequently, ranges, ratios, or limits associated thereto are within the scope of the present disclosure. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The heat transfer relationships described herein may include thermal communication by conduction and/or convection. A heat transfer relationship may include a thermally conductive relationship that provides heat transfer through conduction (e.g., heat diffusion) between solid bodies and/or between a solid body and a fluid. Additionally, or in the alternative, a heat transfer relationship may include a thermally convective relationship that provides heat transfer through convection (e.g., heat transfer by bulk fluid flow) between a fluid and a solid body. It will be appreciated that convection generally includes a combination of a conduction (e.g., heat diffusion) and advection (e.g., heat transfer by bulk fluid flow). As used herein, reference to a thermally conductive relationship may include conduction and/or convection; whereas reference to a thermally convective relationship includes at least some convection.

A thermally conductive relationship may include thermal communication by conduction between a first solid body and a second solid body, between a first fluid and a first solid body, between the first solid body and a second fluid, and/or between the second solid body and a second fluid. For example, such conduction may provide heat transfer from a first fluid to a first solid body and/or from the first solid body to a second fluid. Additionally, or in the alternative, such conduction may provide heat transfer from a first fluid to a first solid body and/or through a first solid body (e.g., from one surface to another) and/or from the first solid body to a second solid body and/or through a second solid body (e.g., from one surface to another) and/or from the second solid body to a second fluid.

A thermally convective relationship may include thermal communication by convection (e.g., heat transfer by bulk fluid flow) between a first fluid and a first solid body, between the first solid body and a second fluid, and/or between a second solid body and a second fluid. For example, such convection may provide heat transfer from a first fluid to a first solid body and/or from the first solid body to a second fluid. Additionally, or in the alternative, such convection may provide heat transfer from a second solid body to a second fluid.

It will be appreciated that the terms "clockwise" and "counter-clockwise" are terms of convenience and are not to be limiting. Generally, the terms "clock-wise" and "counterclockwise" have their ordinary meaning, and unless otherwise indicated refer to a direction with reference to a top-down or upright view. Clockwise and counter-clockwise elements may be interchanged without departing from the scope of the present disclosure.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral subcomponents.

Although additive manufacturing technology is described herein as providing fabrication of complex objects by building objects point-by-point, layer-by-layer, typically in a vertical direction, other methods of fabrication are possible and are within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes. As another example, embodiments of the present disclosure may include selectively depositing a binder material to chemically bind portions of the layers of powder together to form a green body article. After curing, the green body article may be pre-sintered to form a brown body article having substantially all of the binder removed, and fully sintered to form a consolidated article.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Laser Sintering (DLS), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Laser Melting (DLM), Direct Selective Laser Melting (DSLM), Selective Laser Melting (SLM), Direct Metal Laser Melting (DMLM), Binder Jetting (BJ), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" or "binding" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process, or additionally with a binder process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, a decreased porosity decreasing and/or an increased density (e.g., via hot isostatic pressing), and other component properties or features.

It should be appreciated that one skilled in the art may add or modify features shown and described herein to facilitate manufacture of the system A10 provided herein without undue experimentation. For example, build features, such as trusses, grids, build surfaces, or other supporting features, or material or fluid ingress or egress ports, may be added or modified from the present geometries to facilitate manufacture of embodiments of the system A10 based at least on a desired manufacturing process or a desired particular additive manufacturing process.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While certain embodiments of the present disclosure may not be limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process, reduce potential leakage, reduce thermodynamic losses, improve thermal energy transfer, or provide higher power densities. For example, the integral formation reduces the number of separate parts that must be assembled, thus reducing associated time, overall assembly costs, reduces potential leakage pathways, or reduces potential thermodynamic losses. Additionally, existing issues with, for example, leakage, may advantageously be reduced. Still further, joint quality between separate parts may be addressed or obviated by the processes described herein, such as to desirably reduce leakage, assembly, and improve overall performance.

Also, the additive manufacturing methods described above provide much more complex and intricate shapes and contours of the components described herein to be formed with a very high level of precision. For example, such components may include thin additively manufactured layers, cross sectional features, and component contours. As another example, additive manufacturing may provide heat exchanger surface areas, volumes, passages, conduits, or other features that may desirably improve heat exchanger efficiency or performance, or overall engine or system performance. In addition, the additive manufacturing process provides the manufacture of a single component having different materials such that different portions of the component may exhibit different performance characteristics. The successive, additive steps of the manufacturing process provide the construction of these novel features. As a result, the components described herein may exhibit improved functionality and reliability.

An exemplary engine c002 is shown in FIG. 4.1.1. The engine c002 may be a closed cycle engine, such as a regenerative heat engine and/or a Stirling engine; however other engines including other closed-cycle engines and/or regenerative heat engines are also contemplated and the scope of the present disclosure embraces any engine. A closed-cycle engine c002 may include a heater body c100 and an engine body c050. In the embodiment shown, a closed-cycle engine c002 may include an engine body c050 and a heater body c100 disposed on opposite sides of the engine body c050. For example, a first heater body c100 may be disposed at a first side of an engine body c050 and a second heater body c100 may be disposed at a second side of an engine body c050. In still other embodiments, a plurality of engine bodies c050 may be provided and/or a single heater body c100 or a multitude of heater bodies c100 may be provided. The closed-cycle engine c002 may include a piston assembly c090 and a load device c092 operably inserted within an engine body c050 and/or a heater body c100.

The closed-cycle engine c002 may be provided in the form of an engine assembly that includes one or more monolithic bodies or monolithic body-segments as described herein. A monolithic body and/or a monolithic body-segment may be fabricated using an additive manufacturing technology and may be void of any seams, joints, or the like characteristic of separately fabricated components. By way of example, an exemplary closed-cycle engine c002 may be assembled from an engine assembly that includes a first heater body c100 and a first engine body c050. The first heater body may define a first portion of a first monolithic body or a first monolithic body-segment, and the first engine body may define a second portion of the first monolithic body or a second monolithic body-segment operably coupled or operably couplable to the first heater body.

Now turning to FIGS. 4.1.2A and 4.1.3B, exemplary heater bodies c100 will be described. The presently disclosed heater bodies c100 may be used to supply heat to a closed-cycle engine c002 such as a regenerative heat engine and/or a Stirling engine. However, it will be appreciated that the presently disclosed heater bodies c100 may be used as a heating source in a number of other settings, all of which are within the scope of the present disclosure. In some embodiments, at least a portion of the heater body c100 may define at least a portion of a closed-cycle engine c002, such as a monolithic body or a monolithic body-segment of such a closed-cycle engine c002. For example, the monolithic body may be an additively manufactured monolithic body, or the monolithic body-segment may be an additively manufactured monolithic body-segment. However, in addition or as an alternative to additive manufacturing technology, it will be appreciated that the monolithic body or various monolithic body-segments of a closed-cycle engine c002 may be formed using any desired technology, all of which are within the scope of the present disclosure.

As shown, an exemplary heater body c100 may include a combustion chamber c102 and a recirculation pathway c104 configured to recirculate combustion gas through the combustion chamber c102. The recirculation pathway c104 may include a hot-side heat exchanger c106 configured to transfer heat from circulating combustion gas to a heat input source, such as a working-fluid body c108 defining a heat transfer region having a thermally conductive relationship with at least a portion of the hot-side heat exchanger c106. For example, heat from the combustion gas may be transferred to the heat transfer region via an engine-working fluid disposed within a working-fluid pathway c110. The working-fluid pathway c110 may be defined at least in part by the hot-side heat exchanger c106 and/or at least in part by the working-fluid body c108. The hot-side heat exchanger c106 may define a portion of the recirculation pathway c104. The heat transfer region may define a region having a have a thermally conductive relationship with the heating fluid pathway.

The heat transfer region defined by the working-fluid body c108 may include a solid body and/or a fluid pathway defined at least in part by the solid body. In an exemplary embodiment, the hot-side heat exchanger c106 may include a plurality of heating fluid pathways that have a heat transfer relationship with a plurality of heat transfer regions. For example, the plurality of heat transfer regions have a thermally conductive relationship with a corresponding portion of the plurality of heating fluid pathways. Additionally, or in the alternative, the heat transfer regions may have a thermally convective relationship with a heating fluid flowing through the heating fluid pathways. The heat transfer regions may be circumferentially spaced about the longitudinal axis of the heater body c100. Respective ones of the plurality of heat transfer regions may include a solid body and/or a fluid pathway defined at least in part by the solid body.

The working-fluid body c108 may include one or more portions of a closed-cycle engine c002, such as a piston chamber c112 (e.g., a hot piston chamber) and/or a regenerator body c114. A fluid pathway defined the working-fluid body c108 may fluidly communicate with the piston chamber and the regenerator body c114. The engine-working fluid disposed within the working-fluid pathway c110 may be an engine-working fluid, such as an inert gas, which may flow in an alternating fashion between the piston chamber c112 and the regenerator body c114. The hot-side heat exchanger c106 may be provided in the form of a heat exchanger body. The heat exchanger body may define a monolithic body portion of the heater body c100 or a monolithic body-segment operably coupled or operably couplable to a monolithic heater body c100 or to one or more other monolithic body-segments that make up the heater body c100.

The recirculation pathway c104 may additionally include a recirculation eductor c116 configured to utilize intake air flowing through an intake air pathway c118 to entrain and/or accelerate combustion gas and thereby provide a mixture of intake air and recirculating combustion gas to the combustion chamber c102. The recirculation eductor c116 may also include an exhaust pathway c120 configured to discharge a portion of the combustion gas as exhaust gas. The recirculation eductor c116 may fluidly communicate with a downstream portion of the hot-side heat exchanger c106. The recirculation eductor c116 may be provided in the form of an eductor body. The eductor body may define a monolithic body portion of the heater body c100 or a monolithic body-segment operably coupled or operably couplable to a monolithic heater body c100 or to one or more other monolithic body-segments that make up the heater body c100.

In some embodiments, the heater body c100 may include a conditioning conduit c122 fluidly communicating with a downstream portion of the recirculation eductor c116 and an upstream portion of the combustion chamber c102. The conditioning conduct c122 may be configured to guide combustion gas (e.g., a mixture of intake air and recirculating combustion gas) to the combustion chamber c102, and may be configured with a size and shape so as to condition one or more fluid dynamic properties of the combustion gas flowing to the combustion chamber c122. Exemplary fluid dynamics properties that may be conditioned by the conditioning conduit c122 include pressure, pressure gradient, flow velocity, velocity gradient, turbulence, vorticity, curl, and so forth. The conditioning conduit c122 may define a conduit volume selected to provide one or more desired fluid dynamics properties of combustion gas flowing therethrough, and/or to allow for mixing of intake air with recirculating combustion gas. In some embodiments, the conditioning conduit c122 may be configured to swirl combustion gas flowing therethrough. For example, the conditioning conduit c122 may establish or sustain a vortex, which may enhance combustion quality in the combustion chamber c102. Additionally, or in the alternative, combustion gas circulating through the conditioning conduit c122 may cool the combustion chamber c102, with heat from the combustion chamber c102 heating the combustion gas prior to entering the combustion chamber c102.

The combustion chamber c102 and the conditioning conduit c104 may be provided in the form of a combustor body. The combustor body may define a monolithic body portion of the heater body c100 or a monolithic body-segment operably coupled or operably couplable to a monolithic heater body c100 or to one or more other monolithic body-segments that make up the heater body c100.

The heater body c100 may additionally include a heat recuperator c124 configured to utilize exhaust gas flowing through the exhaust pathway c120 to preheat intake air flowing through the intake air pathway c118, thereby recuperating heat from the exhaust gas. The terms preheater and recuperator may be used interchangeably; however, in some instances, the term preheater may be used with reference to preheating intake air flowing through the intake air pathway c118, and the term recuperator may be used with reference to recuperating heat from exhaust gas flowing through the exhaust pathway c120. The heat recuperator c124 may be provided in the form of a heat recuperator body. The heat recuperator body may define a monolithic body portion of the heater body c100 or a monolithic body-segment operably coupled or operably couplable to a monolithic heater body c100 or to one or more other monolithic body-segments that make up the heater body c100. As shown in FIG. 4.1.2A, the heat recuperator c124 may be located downstream from the recirculation eductor c116 relative to the exhaust gas pathway c120 and upstream from the recirculation eductor c116 relative to the intake air pathway c118. The heat recuperator located as shown in FIG. 4.1.2A may exchange heat between exhaust gas flowing through the exhaust gas pathway c120 and intake air flowing through the intake air pathway c118.

One or more fuel nozzles c126 may be operably coupled to the heater body c100. Fuel may be supplied to the combustion chamber c102 by one or more fuel lines c103. For example, the one or more fuel nozzles c126 may be operably coupled to the combustion chamber c102. Fuel injected into the combustion chamber c102 may combine with circulating combustion gas to provide a suitable air-to-fuel ratio. The fuel and at least a portion of the circulating combustion gas may be combusted in the combustion chamber so as to generate hot combustion gas. The combustion chamber c102 may fluidly communicate with an upstream portion of the hot-side heat exchanger c106, thereby supplying the hot combustion gas to the hot-side heat exchanger c106 for heating the working-fluid body c108. One or more intake air pathways c118, one or more exhaust gas pathways c120, one or more recirculation pathways c104, and one or more fuel lines c103 may collectively define a primary flowpath c121.

FIG. 4.1.3B schematically depicts a cross-sectional perspective view of an exemplary heater body c100. As shown, an exemplary heater body c100 may have an annular configuration, however, other configurations are also contemplated. The heater body c100 may include a plurality of monolithic body portions that together may define a monolithic heater body c100. Alternatively, or in addition, the heater body c106 may include one or more monolithic body-segments operably coupled or operably couplable to a monolithic heater body c100. Further, a plurality of monolithic body-segments may be operably coupled or operably couplable to one another to define at least a portion of a heater body c100. In an exemplary embodiment, a heater body c100 may define a single monolithic body. In other embodiments, a plurality of monolithic body-segments may be operably coupled to one another, such as via welding, fusing, or the like, so as to provide an integrally formed heater body c100.

A heater body c100 and/or various featured thereof may include a proximal portion c200 and a distal portion c202 oriented relative to a longitudinal axis c204, with a medial portion c206 disposed between the proximal portion c200 and the distal portion c202. The proximal portion c200 of the heater body c100 or a feature thereof refers to a portion, relative to a longitudinal axis c204, adjacent or relatively proximate to a working-fluid body c108 such as one or more pistons of a closed-cycle engine c002. The distal portion c202 of the heater body c100 or a feature thereof refers to a portion, relative to the longitudinal axis c204, opposite from or relatively remote to the working-fluid body c108. A proximal, distal, or medial portion c200, c202, c206 need not refer to a finite point on the heater body c100 or a feature thereof; rather, it will be appreciated that the terms proximal, distal, and medial c200, c202, c206 may be used generally, such as to denote the location of a portion of the heater body c100 or a feature thereof relative to the working-fluid body c108 and/or to denote the location of various features of the heater body c100 relative to one another.

Referring still to FIG. 4.1.3B, a heater body c100 may include a combustion chamber c102 and a hot-side heat exchanger c106 circumferentially surrounding at least a portion of the combustion chamber c102. In some embodiments, a recirculation pathway c104 may circumferentially surround at least a portion of the combustion chamber c102. A heater body c100 may additionally or alternatively include a conditioning conduit c122 circumferentially surrounding at least a portion of the combustion chamber c102. For example, as shown, the hot-side heat exchanger c106 may circumferentially surround a proximal portion c200 of the combustion chamber c102 and the conditioning conduit c122 may circumferentially surround a medial portion c206 and/or a distal portion c202 of the combustion chamber c102. In some embodiments, the hot-side heat exchanger c106 may additionally circumferentially surround at least some of a medial portion c206 of the combustion chamber c102. In some embodiments, it may be advantageous for the combustion chamber c102 to be aligned with the longitudinal axis c204 and/or for a plurality of combustion chambers c102 to be circumferentially spaced (e.g., evenly distributed) about the longitudinal axis c204. For example, such alignment and/or even distribution may encourage relatively even heat distribution within the heater body c100 and/or the hot-side heat exchanger c106. Such relatively even heat distribution may, in turn, encourage relatively even heat transfer from the hot-side heat exchanger c106 (e.g., from a heating fluid flowing therethrough) to the plurality of heat transfer regions.

The heater body c100 may further include a recirculation eductor c116 circumferentially surrounding the combustion chamber c102. When the heater body c100 includes a conditioning conduit c122, the recirculation eductor c116 may be disposed radially or concentrically outward from the conditioning conduit c122, for example, such that the recirculation eductor c116 circumferentially surrounds at least a portion of the conditioning conduit c122. For example, the recirculation eductor c116 may circumferentially surround a distal portion c202 and/or a medial portion (e.g., a distally-medial portion) of the combustion chamber c102. Additionally, when the heater body c100 includes a conditioning conduit c122, the recirculation eductor c116 may circumferentially surround a distal portion c202 and/or a medial portion (e.g., a distally-medial portion) of the conditioning conduit c122. The recirculation eductor c116 may be disposed axially adjacent to the hot-side heat exchanger c106, such as adjacent to a distal portion c202 of the hot-side heat exchanger c106 relative to the longitudinal axis c204.

In some embodiments, a heater body c100 may include a heat recuperator c124 circumferentially surrounding the combustion chamber c102. When the heater body c100 includes a conditioning conduit c122, the heat recuperator c124 may be disposed radially or concentrically outward from the conditioning conduit c122, for example, such that the heat recuperator c124 circumferentially surrounds at least a portion of the conditioning conduit c122. For example, the heat recuperator c124 may circumferentially surround a distal portion c202 and/or a medial portion (e.g., a distally-medial portion) of the combustion chamber c102. Additionally, when the heater body c100 includes a conditioning conduit c122, the heat recuperator c124 may circumferentially surround a distal portion c202 and/or a medial portion (e.g., a distally-medial portion) of the conditioning conduit c122. The heat recuperator c124 may be disposed axially adjacent to the recirculation eductor c116, such as adjacent to a distal portion c202 of the recirculation eductor c116 relative to the longitudinal axis c204.

In some embodiments, as shown for example in FIG. 4.1.3B, a heater body c100 may include a heat shield c127. The heat shield c127 may be configured to insulate and/or shield one or more portions of the heater body c100 from a heat source within the heater body c100. For example, the heat source may include a combustion flame and/or combustion gas circulating through the recirculation pathway c104, and/or portions of the heater body c100 that become heated by the combustion flame and/or combustion gas. Additionally, or in the alternative, the heat shield c127 may provide a heat sink to absorb and/or dissipate heat, such as heat from a combustion flame and/or combustion gas circulating through the recirculation pathway c104. In some embodiments, the heat shield c127 may include a cooling jacket c128 defined by an inner wall c130 and an outer wall c132. The cooling jacket c128 may fluidly communicate with the intake air annulus c216, such that intake air may flow therethrough. Additionally, or in the alternative, the cooling jacket c128 may define a space with a vacuum or near vacuum. The cooling jacket c128 may define one or more pathways, such as an annular pathway or a plurality of semi-annular pathways. The cooling jacket may cool hot portions of the heater body c100, for example to maintain suitable operating temperatures and/or to shield users or surrounding equipment from hot portions of the heater body c100.

A heater body c100 may define a single monolithic body providing a recirculation pathway c104, an intake air pathway c118, and/or an exhaust pathway c120. For example, a plurality of monolithic body portions may together define a single monolithic body. Alternatively, a heater body c100 may include separate monolithic body-segments respectively defining a recirculation pathway c104, an intake air pathway c118, and/or an exhaust pathway c120. In some embodiments, a first monolithic body-segment may define a recirculation pathway c104, a second monolithic body-segment may define an intake air pathway c118, and a third monolithic body-segment may define an exhaust pathway c120. Such monolithic body-segments may be coupled to one another, such as via welding, fusing, or the like, so as to provide an integrally formed heater body c100.

A monolithic body defining a recirculation pathway c104 may include a combustion chamber c102 and a hot-side heat exchanger c106 fluidly communicating with a proximal portion c200 of the combustion chamber c102. Such a monolithic recirculation pathway c104 may additionally include a recirculation eductor c116 fluidly communicating with a radially or concentrically outward portion of the hot-side heat exchanger c106 and a conditioning conduit c122 having a proximal portion c200 fluidly communicating with a radially or concentrically inward portion of the recirculation eductor c116 and a distal portion c202 fluidly communicating with a distal portion c202 of the combustion chamber c102.

In some embodiments, a heater body c100 may include a recirculation annulus c208. The recirculation annulus c208 may be disposed radially or concentrically outward from at least a portion of the hot-side heat exchanger c106 and/or at least a portion of the recirculation eductor c116. Additionally, or in the alternative, the recirculation annulus c208 may circumferentially surround at least a portion of the hot-side heat exchanger c106 and/or at least a portion of the recirculation eductor c116. The recirculation annulus c208 may fluidly communicate with a radially or concentrically outward portion of the hot-side heat exchanger c106 and a radially or concentrically outward portion of the recirculation eductor c116 so as to define a pathway to direct at least a portion of the combustion gas discharging from the hot-side heat exchanger c106 into the recirculation annulus c208.

In some embodiments, a heater body c100 may include fuel injector body c401. The fuel injector body c401 may include a combustor cap c210 providing fluid communication between a distal portion c202 of the conditioning conduit c122 and a distal portion c202 of the combustion chamber c102. The fuel injector body c401 may additionally or alternatively include one or more fuel nozzles c214. The fuel injector body c401 and/or the combustor cap c210 and/or one or more fuel nozzles c214 may be a separate component operably coupled or operably couplable to the heater body c110, such as at a distal portion c202 of the conditioning conduit c122 as shown. Additionally, or in the alternative, the fuel injector body c401 and/or the combustor cap c210 and/or one or more fuel nozzles c214 may be a portion of a monolithic body defining at least a portion of the heater body c100.

In some embodiments, one or more fuel nozzles c214 may be operably coupled to the combustor cap c210. For example, the combustor cap c210 may include one or more nozzle ports c212 respectively configured to receive a fuel nozzle c214. One or more fuel nozzles c214 may be operably coupled to corresponding nozzle ports c212 such as by mating threads or the like. The one or more fuel nozzles c214 may include a glow plug c215 operable to ignite fuel and/or combustion gas in the combustion chamber c102. As shown, the fuel nozzle may be aligned with the longitudinal axis c204 of the heater body c100 and may be concentric with the combustion chamber c102. Additionally, or in the alternative, one or more fuel nozzles c214 may be circumferentially spaced about the distal portion c202 of the combustion chamber. In some embodiments, it may be advantageous for a fuel nozzle c214 to be aligned with the longitudinal axis c204 and/or for a plurality of fuel nozzles c214 to be circumferentially spaced (e.g., evenly distributed) about the longitudinal axis c204. For example, such alignment and/or even distribution may encourage flame stability within the combustion chamber c102 and/or relatively even heat distribution within the combustion chamber c102 and/or the hot-side heat exchanger c106.

A monolithic body defining an intake air pathway c118 may include an intake air body, such as an intake air annulus c216 and/or a monolithic body defining an exhaust pathway c120 may include an exhaust body, such as an exhaust annulus c218. The intake air annulus c216 and the exhaust annulus c218 may define portions of a single monolithic body or may be separate monolithic body-segments operably coupled or operably couplable to one another. The intake air annulus c216 and/or the exhaust annulus c218 may circumferentially surround at least a portion of the combustion chamber c102. As shown, the intake air annulus c216 may include one or more intake ports c220 and the exhaust annulus c218 may include one or more exhaust ports c222. As shown in FIG. 4.1.3B, the intake air annulus c216 and the exhaust annulus c218 may be disposed axially adjacent to one another. For example, the intake air annulus c216 may be adjacent to a distal portion c202 of the exhaust annulus c218 and/or the exhaust annulus c218 may be adjacent to a proximal portion of the intake air annulus c216 relative to the longitudinal axis c204.

The intake air annulus c216 may include a plurality of intake vanes c224 circumferentially spaced about the intake air annulus c216. The intake vanes c224 may define at least a portion of a pathway configured to direct intake air from the intake air annulus c216 to the recirculation pathway c104. The exhaust annulus c218 may include a plurality of exhaust vanes c226 circumferentially spaced about the exhaust annulus c218. The exhaust vanes c226 may define at least a portion of a pathway configured to direct exhaust gas into the exhaust pathway c218.

In some embodiments, the intake air annulus c216 and the exhaust annulus c218 may fluidly communicate with a heat recuperator c124. More particularly, a preheater portion of the heat recuperator c124 may define at least a portion of an intake air pathway c118 and a recuperator portion of the heat recuperator c124 may define at least a portion of an exhaust pathway c120. The heat recuperator c124 may be part of a monolithic body defining the intake air pathway c118 and/or the exhaust pathway c120. The exhaust annulus c218 and/or the intake air annulus c216 may circumferentially surround at least a portion of the heat recuperator c124. As shown in FIG. 4.1.2A, the exhaust annulus c218 may circumferentially surround the heat recuperator c124, and the intake air annulus c216 may be axially adjacent to the exhaust annulus c218, with the intake vanes c224 being axially adjacent to at least a portion of the heat recuperator c124. For example, the intake vanes c224 may be adjacent to a distal portion c202 of the heat recuperator c124.

The heat recuperator c124 may include a preheater portion and a recuperator body portion having a thermally conductive relationship with one another. The preheater portion may fluidly communicate with the intake air annulus c216 and the recirculation eductor c116 so as to define at least a portion of the intake air pathway c118. The recuperator body portion may fluidly communicate with the recirculation eductor c116 and the exhaust annulus c218 so as to define at least a portion of the exhaust pathway c120. In an exemplary embodiment, the exhaust pathway c120 from the recirculation eductor c116 may be upstream from the intake air pathway c118 to the recirculation eductor c116 so as to avoid intake air from the intake air pathway c118 flowing directly into the exhaust pathway c120 before combining with the recirculation pathway c104.

In some embodiments, a heater body c100 may include a motive annulus c228 providing fluid communication from the preheater portion of the recuperator c124 to the recirculation eductor c116. The heat recuperator c124 may circumferentially surround the motive annulus c228, and the motive annulus may circumferentially surround at least a portion of the combustion chamber c102. When the heater body c100 includes a conditioning conduit c122, the motive annulus c228 may be disposed radially or concentrically outward from the conditioning conduit c122, for example, such that the motive annulus c228 circumferentially surrounds at least a portion of the conditioning conduit c122. For example, the motive annulus c228 may circumferentially surround a medial portion of the combustion chamber c102 and/or a medial portion of the conditioning conduit c122. The motive annulus c228 may be disposed axially adjacent to the recirculation eductor c116, such as adjacent to a distal portion of the recirculation eductor c116 relative to the axial axis c204.

In exemplary embodiments, the recirculation pathway c104, the intake air pathway c118 and/or the exhaust pathway c120 may follow a generally spiral orientation. As shown in FIG. 4.1.2A, the recirculation pathway c104 and the intake air pathway c118 may spiral counterclockwise, and the exhaust pathway c120 may spiral clockwise. Alternative, the recirculation pathway c104 and the intake air pathway c118 may spiral clockwise, and the exhaust pathway c120 may spiral counterclockwise. Such flows through the heater body c100 may transition from counterclockwise flow to clockwise flow (or from clockwise flow to counterclockwise flow) at the exhaust pathway c120, where exhaust gas separates from combustion gas at the recirculation eductor c116. In this way, pressure loss from a change in flow direction may be minimized. Additionally, a pressure drop associated with a change in direction at the exhaust pathway c120 may at least partially favor recirculation of combustion gas through the recirculation eductor c116.

During operation, intake air is directed into the intake air annulus c216. In some embodiments, the intake air may be pressurized, such as via a compressor (not shown), to induce a flow of intake air into the intake air pathway c118. The intake air circulates counterclockwise through the intake air annulus c216, where a plurality of intake vanes c224 circumferentially spaced about the intake air annulus c216 direct the intake air in a radially or concentrically inward and axially proximal spiral having a counterclockwise orientation. The intake air flowing through the intake vanes c224 continues a radially or concentrically inward spiral flow through the heat recuperator c124 and into the motive annulus c228. The intake air in the motive annulus c228 enters the recirculation eductor c116 through a plurality of eductor slots configured to accelerate the intake air spirally into the conditioning conduit c122. The intake air passing through the eductor slots accelerates and entrains combustion gas flowing into the recirculation eductor c116 from the recirculation annulus c208. The intake air and the combustion gas mix to provide fresh combustion gas while flowing helically through the conditioning conduit c122 in an axially distal direction. The fresh combustion gas reaches the combustion cap c210, which directs the flow of fresh combustion gas into the combustion chamber while a fuel nozzle c214 introduces a flow of fuel, which may include a liquid, gaseous fuel.

In the combustion chamber c102, fuel combines with the fresh combustion gas and is ignited, for example, by a glow plug or a spark plug. The combustion chamber c102 provides a vortex combustion pattern with a counterclockwise flow. Centripetal force of the vortex combustion pattern draw the combustion flame radially or concentrically inward while propelling unburnt combustion gas radially or concentrically outward. The combustion gas continues with a spiral counterclockwise flow out of the combustion chamber c102 and into the hot-side heat exchanger c106. The combustion gas flows in a radially or concentrically outward counterclockwise spiral through the hot-side heat exchanger c106 and into the recirculation annulus c208.

The recirculation annulus c208 directs the combustion gas in an axially distal and radially or concentrically inward direction into the recirculation eductor c116, where a portion of the combustion gas is accelerated and entrained by intake air flowing through the eductor slots of the recirculation eductor c116. The remainder of the combustion gas flows in an axially distal direction through exhaust slots in the recirculation eductor c116. The exhaust slots in the recirculation eductor c116 reverse the direction of the exhaust gas flow, directing the exhaust gas in an axially distal and clockwise spiral direction into the recuperator body portion of the heat recuperator c124. The exhaust gas flow in a clockwise spiral into the exhaust annulus c218, where the exhaust gas discharges from the heater body c100 through one or more exhaust ports c222.

Referring still to FIG. 4.1.3B, an exemplary heater body c100 may include a combustion chamber c102 and a recirculation pathway c104 configured to recirculate combustion gas through the combustion chamber c102. The heater body c100 includes an intake air pathway c118 and an exhaust pathway c120 may fluidly communicate with the recirculation pathway c104. The recirculation pathway c104 may include a hot-side heat exchanger c106 and a recirculation eductor c116. However, in some embodiments, the recirculation eductor c116 may be omitted and the combustion chamber c102 may fluidly communicate with the intake air pathway c118 and the exhaust pathway c120 with combustion gas discharging from the heater body without recirculating. The exhaust pathway c120 may fluidly communicate with the recirculation pathway c104 upstream from the intake air pathway c118.

As shown in FIGS. 4.1.2A and 4.1.3B, the hot-side heat exchanger c106 may fluidly communicate with a proximal portion of the combustion chamber c102, and the recirculation eductor c116 may fluidly communicate with a downstream portion of the hot-side heat exchanger c106 and a distal portion c202 of the combustion chamber c102. The recirculation eductor c116 may be configured to entrain and/or accelerate combustion gas circulating through the recirculation pathway c104 using intake air, for example, from an intake air pathway c118 may fluidly communicate with the recirculation pathway c104.

In some embodiments, the recirculation eductor c116 may define at least a portion of the exhaust pathway c120. For example, the exhaust pathway c120 may fluidly communicate with the recirculation pathway c104 at the recirculation eductor c116, such that the exhaust pathway c120 discharges a portion of the combustion gas from the recirculation eductor c116 as exhaust gas.

When the heater body c100 includes a recirculation pathway c104, the proportion of combustion gas may be recirculated may vary depending on the operating conditions of the heater body c100. The proportion of combustion gas may be recirculated to the proportion of fresh intake air may be utilized may be described by a recirculation ratio R, according to the following equation (1): R=I/C, where I is the flow rate if intake air flowing into the heater body c100 and T is C the flow rate of combustion gas flowing to the combustion chamber. The recirculation ratio may vary from 0% to 100% depending, for example, on the operating conditions of the heater body c100. For example, a greater proportion of intake air may be utilized during startup, with recirculation ratio increasing as the heater body c100 transitions from startup conditions to steady-state conditions. Additionally, the recirculation ratio may depend on desired combustion conditions, such as equivalence ratio. In some embodiments, the recirculation ratio may be from 0% to 90%, such as from 10% to 90%, such as from 0% to 60%, such as from about 30% to about 70%, such as from 40% to 60%. During startup conditions, the recirculation ratio may be from 0% to 50%, such as from 0% to 30% or from 0% to 10%. During steady-state conditions, the recirculation ratio may be from 10% to 90%, such as from 10% to 60%, or from 30% to 60%. The remainder of combustion gas may be discharged from the recirculation pathway c104 as exhaust gas.

Now referring to FIG. 4.1.5 exemplary methods of heating a heat exchanger body c600 will be described. The exemplary methods of heating a heat exchanger body c600 may include, for example, methods of heating a closed-cycle engine c002. For example, exemplary methods may be performed in connection with operation of a heater body c100 and/or a closed-cycle engine c002 as described herein. As shown in FIG. 4.1.5, an exemplary method c150 may include, at block c152, circulating combustion gas through a combustion chamber c102 and a recirculation pathway c104 configured to recirculate combustion gas through the combustion chamber c102. The recirculation pathway c104 may include a hot-side heat exchanger c106 and a recirculation eductor c116. The hot-side heat exchanger c106 may fluidly communicate with a proximal portion of the combustion chamber c102. The recirculation eductor c116 may fluidly communicate with a downstream portion of the hot-side heat exchanger c106 and a proximal portion of the conditioning conduit c122 and/or and a distal portion of the combustion chamber c102. At block c154, an exemplary method c150 may include transferring heat from the combustion gas in the hot-side heat exchanger c106 to a plurality of heat transfer regions that respectively have a heat transfer relationship with a corresponding semiannular portion of the hot-side heat exchanger c106. The exemplary method c150 may include, at block c156, swirling combustion gas through a conditioning conduit c122 defining at least a portion of the recirculation pathway c104. The conditioning conduit c122 may fluidly communicate with a downstream portion of the recirculation eductor c116 and a distal portion of the combustion chamber c102. The exemplary method c150 may additionally include, at block c158, combusting a fuel and/or at least a portion of the combustion gas. The fuel and/or combustion gas may be combusted in the combustion chamber c102. In some embodiments, at least a portion of the combustion may take place within the hot-side heat exchanger c106.

In some embodiments, an exemplary method c150 may include, at block c160, injecting intake air into the recirculation pathway c104. The intake air may be injected through an intake air pathway c118 fluidly communicating with the recirculation pathway c104. For example, a recirculation eductor c116 may include a motive pathway defining at least a portion of the intake air pathway c118. The exemplary method may additionally include, at block c162, entraining and/or accelerating combustion gas circulating through the recirculation pathway c104 at least in part by injecting the intake air into the recirculation pathway c104, for example, through the motive pathway of the recirculation eductor c116. The exemplary method may further include, at block c164, discharging a portion of the combustion gas from the recirculation pathway c104 as exhaust gas. The exhaust gas may discharge through an exhaust pathway c120, and the exhaust gas pathway c120 may fluidly communicate with the recirculation pathway c104. In some embodiments, the exhaust gas pathway c120 may be defined at least in part by the recirculation eductor c116. The exhaust gas may be preferentially discharged from the recirculation pathway c104 upstream from a location where the intake air pathway c118 fluidly communicates with the recirculation pathway c104.

The exemplary method may additionally include, at block c166, preheating intake air flowing through the intake air pathway c118. The intake air may be preheated at least in part using exhaust gas flowing through an exhaust pathway c120 by the exhaust pathway c120 having a thermally conductive relationship with the intake air pathway c118. For example, in some embodiments, the intake air may be preheated at least in part using a heat recuperator c124. The heat recuperator c124 may define at least a portion of the intake air pathway c118 and at least a portion of the exhaust pathway c120, thereby providing a thermally conductive relationship between the exhaust gas pathway c120 and the intake air pathway c118. Additionally, or in the alternative, the intake air may be preheated at least in part using combustion gas flowing through a recirculation pathway c104 by the recirculation pathway c104 having a thermally conductive relationship with the intake air pathway c118.

With the heat recuperator c124 fluidly communicating with the recirculation eductor c116, the exemplary methodc 150 may include flowing combustion gas from the recirculation pathway c104 into the heat recuperator c124 at the recirculation eductor c116 through the exhaust pathway c120, and flowing intake air from the intake air pathway c118 into the recirculation eductor c116 at the heat recuperator c124. The exhaust pathway c120 may preferably be located upstream from the intake air pathway c118.

In an exemplary embodiment, transferring heat from the combustion gas in the hot-side heat exchanger c106 at block c154 may include transferring heat to a working-fluid body c108. The working-fluid body c108 may include a solid body and/or fluid in a fluid pathway defined at least in part by the solid body. The heat transferring to the working-fluid body c108 may come from combustion gas flowing through a plurality of heating fluid pathways defined at least in part by the hot-side heat exchanger c106. The heat may be transferred to respective ones of a plurality of heat transfer regions that have a thermally conductive relationship with a corresponding portion of the plurality of heating fluid pathways. The working-fluid body c108 may include a plurality of working-fluid pathways, and the exemplary method c150 may include flowing fluid through the working-fluid pathways as heat transfers thereto from the hot-side heat exchanger c106. In some embodiments, the working-fluid pathways may fluidly communicate with a piston chamber and a regenerator of a closed-cycle engine c002, and the exemplary method may include flowing fluid through the working-fluid pathways alternatingly between the regenerator and the piston chamber.

In an exemplary embodiment, combusting a fuel and/or at least a portion of the combustion gas at block c158 may include combusting fuel and at least a portion of the combustion gas in the combustion chamber c102 and/or in the heating fluid pathways of the hot-side heat exchanger c106. The fuel may be supplied by a fuel nozzle fluidly communicating with the combustion chamber c102. The combustion gas circulating through the combustion chamber c102 and/or the recirculation pathway c104 at block c152 may be from 10% to 90% of the total combustion gas flowing into the combustion chamber c102, and the remainder of the combustion gas may be discharged from the recirculation pathway c104 as exhaust gas through the exhaust pathway c120. It will be appreciated that the proportion of combustion gas being recirculated may vary depending on operating conditions and/or configuration of the heater body c100. For example, the proportion of combustion gas being recirculated may vary as between startup and steady-state conditions. Also, in some embodiments, the heater body c100 may not have a recirculation pathway or the recirculation pathway may be closed so as to carry out combustion of the fuel utilizing 100% intake air.

Now referring to FIGS. 4.2.1A, 4.2.2A, and 4.2.2B, exemplary combustor bodies c400 will be described. The presently disclosed combustor bodies c400 may define part of a heater body c100 and/or a closed-cycle engine c002. For example, a combustor body c400 may define at least a portion of a monolithic body or a monolithic body-segment. Such monolithic body or monolithic body-segment may define at least a portion of the heater body c100 and/or the closed-cycle engine c002. Additionally, or in the alternative, the presently disclosed combustor bodies c400 may be provided as a separate component, whether for use in connection with a heater body c100, a closed-cycle engine c002, or any other setting whether related or unrelated to a heater body c100 or a closed-cycle engine c002. At least a portion of the combustor body c400 may define a combustion chamber c102 and/or a conditioning conduit c122. While the heater bodies c100 depicted in the figures may show one combustor body c400 and/or one combustion chamber c102 and/or one conditioning conduit c122, it will be appreciated that a heater body c100 may include a plurality of combustor bodies c400 and/or a plurality of combustion chambers c102 and/or a plurality of conditioning conduits c122. For example, a heater body c100 may include one or more combustor bodies c400, and/or a combustor body c400 may include one or more combustion chambers c102 and/or one or more conditioning conduits c122. Exemplary heater bodies c100 and/or combustor bodies c400 may be configured for single-stage combustion and/or multi-stage combustion. A heater body c100 and/or a combustor body c400 configured for multi-stage combustion may include two, three, four, or more combustion zones.

As shown, an exemplary combustor body c400 may include a combustion chamber c102 and a conditioning conduit c122 circumferentially surrounding at least a portion of the combustion chamber c102. The combustion chamber c102 may be disposed annularly about an axis c204, or the combustion chamber may be off-center from the axis c204. In some embodiments, a plurality of combustion chambers c102 may be circumferentially spaced about the axis c204. The combustion chamber c102 may include an annular combustion chamber wall c406. An inward portion of the annular combustion chamber wall c406 may define at least a portion of the combustion chamber c102. The conditioning conduit c122 may include an outward annular conditioning conduit wall c408 circumferentially surrounding the combustion chamber c122, and an inward annular conditioning conduit wall c410 circumferentially surrounding the outward annular conditioning conduit wall c408. An outward portion of the annular combustion chamber wall c406 may define at least a portion of the inward annular conditioning conduit wall c410. The inward portion of the annular combustion chamber wall c406 and the outward portion of the annular combustion chamber wall c406 may adjoin one another at a distal end c202 of the combustion chamber c102.

The combustion chamber c102 may include a combustion chamber outlet c412 disposed about a proximal portion c202 of the combustion chamber c102. For example, the combustion chamber outlet c412 may be disposed about a proximal portion of an annular combustion chamber wall c406. A combustion chamber c102 may include a single combustion chamber outlet c412 or a plurality of combustion chamber outlets c412, and the combustion chamber outlet or outlets c412 may be oblique to the combustion chamber c102. For example, a plurality of combustion chamber outlets c412 may be circumferentially spaced about a proximal portion c202 of the combustion chamber c102, such as about a proximal portion c202 of the annular combustion chamber wall c406.

The conditioning conduit c122 may fluidly communicate with the combustion chamber c102 at a distal portion of the combustion chamber c102. The conditioning conduit c122 may include a conditioning conduit inlet c414 disposed about a proximal portion c202 of the conditioning conduit c122. For example, the conditioning conduit inlet c414 may be disposed about a proximal portion of the outward annular conditioning conduit wall c408. A conditioning conduit c122 may include a single conditioning conduit inlet c414 or a plurality of conditioning conduit inlets c414, and the conditioning conduit inlet or inlets c414 may be oblique to the conditioning conduit c120. For example, a plurality of conditioning conduit inlets c414 may be circumferentially spaced about a proximal portion c202 of the conditioning conduit c122, such as about a proximal portion c202 of the outward annular conditioning conduit wall c408.

The inward annular conditioning conduit wall c410 may be defined at least in part by the annular combustion chamber wall c406. In some embodiments, a portion of the inward annular conditioning conduit wall c410 may be separated from the annular combustion chamber wall c406, such that the inward annular conditioning conduit wall c410 and the annular combustion chamber wall c406 define an insulating space therebetween (not shown). For example, a medial portion of the inward annular conditioning conduit wall c410 may be separated from the annular combustion chamber wall c406 so as to define such an insulating space.

As shown in FIG. 4.2.1A, the conditioning conduit c122 may define at least a portion of the recirculation pathway c104. The portion of the recirculation pathway c104 defined by the conditioning conduit c122 may sometimes be referred to as a conditioning conduit pathway c416. The conditioning conduit pathway c416 may be defined at least in part by the inward annular conditioning conduit wall c410 and the outward annular conditioning conduit wall c408.

In exemplary embodiments, the one or more conditioning conduit inlets c414 may be disposed about a proximal portion c200 of the conditioning conduit c122 and oriented oblique to the conditioning conduit c122. For example, the one or more conditioning conduit inlets c414 may be oblique to the outward annular conditioning conduit wall c408 and/or the inward annular conditioning conduit wall c410. The one or more conditioning conduit inlets c414 may respectively include a motive pathway c418 and an eduction pathway c420 fluidly communicating with the conditioning conduit c122. As shown in FIG. 4.2.1A, a plurality of conditioning conduit inlets c412 may include a plurality of motive pathways c418 and a plurality of eduction pathways c420 circumferentially spaced about the conditioning conduit c122.

The motive pathway c418 (or plurality of motive pathways c418) and the eduction pathway c420 (or plurality of eduction pathway c420) may be defined at least in part by an eductor body c300. The motive pathway c418 or plurality of motive pathways define a portion of an intake air pathway and the eduction pathway or plurality of eduction pathways define a portion of a recirculation pathway. The eduction pathway c420 and the motive pathway c418 may be adjacent to one another, such that intake air flowing through the motive pathway c418 may accelerate and entrain combustion gas from the eduction pathway c420 so as to move circulating combustion gas into the conditioning conduit c122. The motive pathway c418 and the eduction pathway c420 are preferably oriented oblique to the conditioning conduit c122 (e.g., oblique to the outward annular conditioning conduit wall c408 and/or the inward annular conditioning conduit wall c410), such that intake air and combustion gas flowing into the conditioning conduit may readily establish a helical flow pattern through the conditioning conduit c122.

In exemplary embodiments, the one or more combustion chamber outlets c412 may be disposed about a proximal portion c200 of the combustion chamber c102 and oriented oblique to the combustion chamber c102. For example, the one or more combustion chamber outlets c412 may be oblique to the annular combustion chamber wall c406. The one or more combustion chamber outlets c412 may fluidly communicate with a corresponding plurality of combustion-gas pathways c422 circumferentially spaced about the combustion chamber c102. The plurality of combustion-gas pathways c422 may fluidly communicate with a respective portion of the combustion chamber c102. Respective combustion-gas pathways c422 may extend in a radial, circumferential, and/or tangential direction relative to the combustion chamber c102. For example, the respective combustion-gas pathways c422 may concentrically spiral radially or circumferentially outward from the combustion chamber. The respective combustion-gas pathways c422 may extend annularly or semi-annularly along a spiral or spiral arc relative to the combustion chamber and/or the longitudinal axis c204 thereof. As shown in FIG. 4.2.1A, the plurality of combustion-gas pathways c422 define at least a portion of a hot-side heat exchanger body c600. The oblique orientation of the one or more conditioning conduit inlets c414 and/or of the one or more combustion chamber outlets c412 may cause combustion gas to swirl through the conditioning conduit c122, for example, from a proximal portion of the conditioning conduit c122 to a distal portion of the conditioning conduit c122 and through the combustion chamber c102 from a distal portion of the combustion chamber c102 to a proximal portion of the combustion chamber 102.

The swirling combustion gas may provide a bidirectional coaxial vortex flow field. When the combustor body c400 includes a conditioning conduit c122, the conditioning conduit c122 provides separation between an outward portion of the bidirectional coaxial vortex flow field and an inward portion of the bidirectional coaxial vortex flow field, the conditioning conduit defining a pathway for the outward portion of the bidirectional coaxial vortex flow field and the combustion chamber defining a pathway for the inward portion of the bidirectional coaxial vortex flow field. Such separation of the bidirectional coaxial vortex flow field provided by the conditioning conduit c122 may enhance combustion dynamics, for example, by reducing shear between the outward and inward portions of the bidirectional coaxial vortex flow field.

In some embodiments, the annular combustion chamber wall c406 may have a Coanda surface c424 disposed at a distal end thereof defining a transition between an inner annular portion and an outer annular portion of the annular combustion chamber wall c406. The Coanda surface c424 may be operable at least in part to draw combustion gas from the conditioning conduit c122 into the combustion chamber c102. A "Coanda surface" refers to a curved surface that creates a zone of reduced pressure in the immediate proximity of such curved surface. This pressure drop entrains and accelerates fluid along the contour of the surface, which is sometimes referred to as the "Coanda effect." The Coanda effect is the phenomena in which a flow attaches itself to a nearby surface and remains attached even though the surface curves away from the initial direction of flow. Characteristic of the Coanda effect, fluid tends to flow over the surface closely, seemingly "clinging to" or "hugging" the surface. As such, the Coanda effect can be used to change the direction of the combustion gas swirling through the conditioning conduit c122 and into the combustion chamber c122. In doing so, a combustion flame c426 may be surrounded by a flow of cooler, uncombusted or partially combusted combustion gas c428, thereby form a boundary layer separating the flame c426 from the annular combustion chamber wall c406.

In some embodiments, the combustor body c400 may include a combustor cap c210 disposed axially adjacent to a distal portion of the conditioning conduit c122. The combustor cap c210 may be operably coupled to the combustor body c400, for example, using bolts (not shown) insertable into bolt holes c430. Alternatively, the combustor cap c210 may define a portion of a monolithic body or a monolithic body-segment that includes at least a portion of the combustor body c400. As yet another alternative, the combustor cap c210 may be integrally formed with at least a portion of the combustor body c400. In an exemplary embodiment, the combustor cap c210 may be operably coupled to the conditioning conduit body c404, or the combustor cap c210 may define a portion of the conditioning conduit body c404 or may be integrally formed with the conditioning conduit body c404.

As shown in FIG. 4.2.1A, the combustor cap c210 includes an inward combustor cap wall c432 defining a portion of the recirculation pathway c104. The portion of the recirculating pathway c104 including the inward combustor cap wall c432 may provide fluid communication between the conditioning conduit c122 and the combustion chamber c102 at a distal portion of the combustion chamber c102, and the combustor cap c210 may be operable at least in part to direct combustion gas from the conditioning conduit c122 to the combustion chamber c102. The combustor cap c210 may be disposed axially adjacent to a distal portion c202 of the conditioning conduit c122 and/or the combustion chamber c102.

The combustion chamber c102 and the conditioning conduit c122 may have any desired shape. In various embodiments, the combustion chamber c102 may have a shape including a cylinder and/or a frustum, and the conditioning conduit c122 may have a shape including a cylinder and/or a frustum. As shown in FIG. 4.2.1A, the combustion chamber c102 and the conditioning conduit c122 respectively have a cylindrical shape. In other embodiments, a portion of the combustion chamber c102 having a cylinder shape may be circumferentially surrounded by a portion of the conditioning conduit c122 having a cylinder shape and/or a portion of the conditioning conduit c122 having a frustum shape. Additionally, or in the alternative, a portion of the combustion chamber c102 having a frustum shape may be circumferentially surrounded by a portion of the conditioning conduit c122 having a cylinder shape and/or a portion of the conditioning conduit c122 having a frustum shape. Such a frustum shape of the combustion chamber c102 and/or of the conditioning conduit c122 may converge proximally and/or diverge proximally.

By way of example, a first portion of a combustion chamber c102 may have a first shape that includes a cylinder, and the first portion of the combustion chamber c102 may be circumferentially surrounded by a second portion of the conditioning conduit c122 having a second shape that includes a cylinder and/or a frustum. Additionally, or in the alternative, a third portion of the combustion chamber c102 may have a third shape that includes a cylinder and/or a frustum, and the third portion of the combustion chamber c102 may be circumferentially surrounded by a fourth portion of the conditioning conduit c122 having a fourth shape that includes a cylinder. Further in addition or in the alternative, a fifth portion of the combustion chamber c102 may have a fifth shape that includes a frustum diverging proximally, and the fifth portion of the combustion chamber c102 may be circumferentially surrounded by a sixth portion of the conditioning conduit c122 having a sixth shape that includes a frustum converging proximally and/or a frustum diverging proximally. Still further in addition or in the alternative, a seventh portion of the combustion chamber c102 may have a seventh shape that includes a frustum diverging proximally, and the seventh portion of the combustion chamber c102 may be circumferentially surrounded by an eighth portion of the conditioning conduit having an eighth shape that includes a frustum converging proximally and/or a frustum diverging proximally.

Still referring to FIG. 4.2.1A, the combustor body c400 and/or the combustion chamber c102 may have an axial length selected based at least in part on a desired flame length and/or a corresponding combustion time. In some embodiments, the combustion time may be from 1 to 10 milliseconds, such as from 2 to 4 milliseconds. The combustion time may be at least 1 millisecond, at least 2 milliseconds, or at least 5 milliseconds. The combustion time may be less than 10 milliseconds, less than 7 milliseconds, or less than 3 milliseconds.

The flame c426 may have an axial length extending all or a portion of the combustion chamber c102. In some embodiments, the flame c426 may extend though one or more combustion chamber outlets c412 and into the hot-side heat exchanger c106. The hot-side heat exchanger c106 may include working-fluid pathways c110; however, in some embodiments, the working-fluid pathways c110 may be omitted from a radially or concentrically inward portion of the hot-side heat exchanger c106 so as to facilitate the flame c426 flowing into the hot-side heat exchanger c106. Such a radially-inward portion of the hot-side heat exchanger c106 may define a combustion zone where combustion may occur in the hot-side heat exchanger c106. The combustion that occurs in the hot-side heat exchanger may represent an extension of combustion that occurs in the combustion chamber c102, such as in the case of a flame that extends from the combustion chamber into the hot-side heat exchanger c106. The radially-inward portion of the hot-side heat exchanger c106 may additionally/or alternatively support stable combustion separate and distinct from the combustion that occurs in the combustion chamber c10. For example, a first flame c426 in the combustion chamber may quench upstream from the hot-side heat exchanger c106, and a second flame c426 may be established and stabilize in the radially-inward portion of the hot-side heat exchanger c106.

The radially-inward portion of the hot-side heat exchanger c106 may sometimes be referred to as a second combustion chamber c448, in which case, the combustion chamber c102 may be referred to as a first combustion chamber c102. In some embodiments, the flame c426 may extend into the combustion chamber c448. Additionally, or alternatively, a second flame c426 may exist in the second combustion chamber c448, defining a combustion zone that is separate from a combustion zone in the second combustion chamber c448 may include a plurality of combustion fins c450 circumferentially spaced about the combustion chamber c102. The combustion fins c450 may occupy a region of the hot-side heat exchanger c106 configured for stable combustion to occur. Combustion may occur in the region of the hot-side heat exchanger c106 where the combustion fins c450 are located at least in part by the combustion fins c450 being heated to a sufficiently high temperature during operation to prevent flame quenching and/or promote an extended flame length.

The plurality of combustion fins c450 may spiral concentrically relative to the combustion chamber c102 and/or the longitudinal axis c204 thereof. The plurality of combustion fins c450 may be configured and arranged as spirals or spiral arcs, disposed annularly or semi-annularly, relative to the combustion chamber c102 and/or the longitudinal axis c204 thereof. The combustion fins c450 may be concentrically nested with one another. Concentrically nested combustion fins c450 may be configured as an array of substantially concentric spirals and/or an array of substantially concentric spiral arcs. By way of example, a spiral or spiral arc, such as in an array of substantially concentric spirals or spiral arcs, may correspond to at least a portion of an Archimedean spiral, a Cornu spiral, a Fermat's spiral, a hyperbolic spiral, a logarithmic spiral, a Fibonacchi spiral, an involute, or a squircular spiral, as well as combinations of these.

Upstream portions of the respective combustion-gas pathways c422 may fluidly communicate with the combustion chamber c102 at respective circumferential locations about the perimeter of the combustion chamber c102. Downstream portion of the respective combustion-gas pathways c422 may fluidly communicating with corresponding heating fluid pathways c602 of the hot-side heat exchanger c106 (e.g. FIGS. 4.4.2A, 4.4.2B, 4.4.3A, and 4.4.3B). Such combustion fins c450 may concurrently define at least a portion of the second combustion chamber c448 and at least a portion of the hot-side heat exchanger c106. The combustion fins c450 may become red-hot, encouraging a sustained combustion flame within the second combustion chamber c448. The second combustion chamber c448 may allow combustion to take place at an air-to-fuel ratio closer to the stoichiometric air-to-fuel ratio.

The combustor body c400 may include one or more features of the combustion chamber c102 and/or one or more features of the conditioning conduit c122 configured to burn fuel in a lean combustion environment. For example, the conditioning conduit c122 may include one or more conditioning conduit inlets c414 dimensionally configured to provide sufficient combustion gas flow for a lean combustion environment. Additionally, or in the alternative, the one or more features of the combustion chamber c102 may include one or more combustion chamber outlets dimensionally configured to provide sufficient combustion gas flow for a lean combustion environment. The combustor body c400 may include one or more fuel nozzles, and the one or more fuel nozzles may be configured to provide a fuel flow sufficient for a lean combustion environment.

With respect to the one or more conditioning conduit inlets c414, the lean combustion environment may be provided by one or more motive pathways c418 and/or one or more eduction pathways c420. The one or more motive pathways c418 may be dimensionally configured to supply the conditioning conduit c122 and/or the combustion chamber c102 with sufficient intake air to from the intake air pathway c118 to provide a lean combustion environment. Additionally, or in the alternative, the one or more motive pathways c418 may be dimensionally configured to accelerate and entrain sufficient combustion gas from the recirculation pathway c104 to provide a lean combustion environment. The one or more eduction pathways c420 may be dimensionally configured to recirculate sufficient combustion gas from the recirculation pathway c104 to provide a lean combustion environment.

A lean combustion environment may be characterized by an equivalence ratio, which is the ratio of the actual fuel-to-air ratio to the stoichiometric fuel-to-air ratio. An exemplary lean combustion environment may include an equivalence ratio of 0.6 to 1.0, such as an equivalence ratio of 0.7 to 0.8. The equivalence ratio may be at least 0.6, such as at least 0.8. The equivalence ratio may be less than 1.0, such as less than 0.7. An exemplary lean combustion environment may include an air-to-fuel ratio of from 40:1 to 90:1 by mass, or from 55:1 to 75:1 by mass. The air-to-fuel ratio may be at least 40:1 by mass, such as at least 55:1 by mass. The air-to-fuel ratio may be less than 90:1 by mass, such as less than 75:1 by mass.

The combustor body c400 may include one or more features of the combustion chamber c102 and/or one or more features of the conditioning conduit c122 configured to circulate at least a portion of the combustion gas by volume and to introduce a balance of the combustion gas as intake air. For example, the conditioning conduit c122 may include one or more conditioning conduit inlets c414 dimensionally configured to circulate at least a portion of the combustion gas by volume and to introduce a balance of the combustion gas as intake air. Additionally, or in the alternative, the one or more features of the combustion chamber c102 may include one or more combustion chamber outlets dimensionally configured to circulate from at least a portion the combustion gas by volume and to introduce a balance of the combustion gas as intake air.

The volume of circulating combustion gas may be from about 10% to about 90% of the combustion gas, such as from about 30% to about 70% of the combustion gas, such as from about 40% to about 60% of the combustion, with the balance of the combustion gas as being intake air. The volume of intake air included in the combustion gas may be from about 10% to about 90% of the combustion gas, such as from about 30% to about 70% of the combustion gas, such as from about 40% to about 60% of the combustion, with the balance being circulated combustion gas. However, in some embodiments the combustor body c400 may utilize 100% intake air and/or 100% circulating combustion gas.

In some embodiments, a cooling jacket c442 disposed within the at least a portion of the combustor body c400. The cooling jacket may define a pathway for a cooling fluid to flow within the combustor body c400. The flow of fluid cooling fluid may provide cooling to the combustor body c400. The cooling jacket c442 may fluidly communicate with the intake air pathway c118, the recirculation pathway c104, and/or the working-fluid pathway c110. By way of example, as shown in FIG. 4.1.1A, a cooling jacket c442 may be disposed between at least a portion of the inward portion of the annular combustion chamber wall c406 and the outward portion of the annular combustion chamber wall c406, with the cooling jacket c442 fluidly communicating with at least one of the one or more motive pathways c418. Additionally, or in the alternative, the cooling jacket c442 shown in FIG. 4.1.1A may fluidly communicate with at least one of the one or more eduction pathways c420. When the cooling fluid for the cooling jacket includes intake air and/or combustion gas, the combustor body c400 may include one or more cooling-jacket outlets c444, allowing the cooling fluid to flow into the conditioning conduct c122 and/or the combustion chamber c102.

Referring again to FIG. 4.1.1B, in some embodiments, a combustor body c400 may include a plurality of conditioning pathways c446 traversing the annular combustion chamber wall c406. The conditioning pathways may be disposed about a proximal, medial, and/or axial portion of the combustion chamber c102, for example, traversing a proximal, medial, and/or axial portion of the annular combustion chamber wall c406 and providing fluid communication between the combustion chamber c102 and the conditioning conduit c122.

Now referring to FIGS. 4.2.2A and 4.2.2B, an exemplary heater body c100 and/or combustor body c400 configured for multi-stage combustion will be described. A combustor body c400 configured for multi-stage combustion may sometimes be referred to as a multi-stage combustor c403. As used herein, the term "multi-stage combustion" refers to a combustion regime that includes at least two combustion zones oriented in serial flow relationship. As used herein, the term "combustion zone" refers to a portion of a combustion gas and/or fuel flowpath configured to support a stable flame c426 under one or more operating conditions. In some embodiments, a combustion zone may include a fuel injection point. For example, a multi-stage combustor may include a plurality of fuel injection points in serial flow relationship that are respectively configured to support a stable flame c426. Additionally, or in the alternative, a multi-stage combustor may include a combustion zone that is configured to support a stable flame c426 by combusting a fuel and/or combustion gas c428 introduced into the flowpath at an upstream combustion zone. For example, a fuel-rich environment may allow for a reburn combustion regime in which fuel injected at a first combustion zone is partially combusted at the first combustion zone and then further combusted at a second combustion zone.

An exemplary multi-stage combustor c403 may include a primary combustion zone and a secondary combustion zone. In some embodiments, a multi-stage combustor may include a tertiary combustion zone. The primary combustion zone may be situated upstream and/or downstream from a secondary combustion zone. A tertiary combustion zone may be located upstream or downstream from a primary combustion zone, and/or upstream or downstream from a secondary combustion zone. As used herein, the term "primary combustion zone" refers to a combustion zone that generates a larger proportion of heat during steady-state operation relative to one or more other combustion zones, such as relative to a secondary combustion zone and/or relative to a secondary and tertiary combustion zone. As used herein, the term "secondary combustion zone" refers to a combustion zone that generates a lesser proportion of heat during steady-state operation relative to another combustion zone, such as relative to a primary combustion zone. The term "tertiary combustion zone" refers to a combustion zone that generates a lesser proportion of heat during steady-state operation relative to a plurality of other combustion zones, such as relative to a primary combustion zone and a secondary combustion zone.

In an exemplary embodiment, a heater body c100 that includes a multi-stage combustor c403 may include a first combustion zone c405 and a second combustion zone c407. The first combustion zone c405 may occupy a distal or medial position relative to the longitudinal axis c204 of the combustion chamber c102. The second combustion zone c407 may occupy a proximal position relative to the longitudinal axis c204 of the combustion chamber c102. The first combustion zone c405 may occupy a radially or concentrically inward position relative to the longitudinal axis c204 of the combustion chamber c102. The second combustion zone c407 may occupy a radially or concentrically outward position relative to the longitudinal axis c204 of the combustion chamber c102 and/or relative to the radially or concentrically inward position of the first combustion zone c405. In some embodiments, the first combustion zone c405 may occupy at least a portion of a vortex flow field, such as a bidirectional vortex flow field. For example, the first combustion zone c405 may occupy at least part of an inward portion of a bidirectional coaxial vortex flow field. The second combustion zone c407 may occupy at least part of a proximal region of the combustion chamber c102. Additionally, or in the alternative, the second combustion zone c407 may occupy at least part of a radially-inward portion of the hot-side heat exchanger c106. For example, the hot-side heat exchanger c106 may define a second combustion chamber c448, and the second combustion zone c407 may occupy at least a portion of the second combustion chamber c448.

The first combustion zone c405 may be located upstream from a heat sink c409 a sufficient distance to allow combustion in the first combustion zone c405 to start, warm up, and stabilize. For example, the heat sink c409 may include at least a portion of the working-fluid bodies c108 and/or at least a portion of the hot-side heat exchanger c106. The working-fluid bodies c108 may have a heat transfer relationship with the hot-side heat exchanger c106. The heat sink c409 may include a plurality of working-fluid pathways c110 that have a heat transfer relationship with the hot-side heat exchanger c108 and/or the plurality of combustion-gas pathways c422. The plurality of heating walls c616 may define at least a portion of the hot-side heat exchanger c106. The hot-side heat exchanger c106 may include a plurality of working-fluid pathways monolithically formed within the plurality of heating walls c616.

Combustion in the second combustion zone c407 may be initiated concurrently with and/or subsequently to initiation of combustion the first combustion zone c405. In some embodiments, combustion in the second combustion zone c407 may be initiated after combustion in the first combustion zone c405 has started, and/or after combustion in the first combustion zone c405 at least partially heated at least a portion of the combustor body c400 proximate to the second combustion zone c407. Additionally, or in the alternative, combustion in the second combustion zone c407 may be initiated after combustion in the first combustion zone c405 has stabilized.

Combustion in the first combustion zone c405 may be operated or sustained as a primary combustion zone. Additionally, or in the alternative, combustion in the first combustion zone c405 may be operated or sustained as a secondary combustion zone, or even as a tertiary combustion zone. In some embodiments, combustion in the first combustion zone c405 may be initially operated or sustained as a primary combustion zone, such as during a warm-up period. After an initial operating period, such as the warm-up period, combustion in the first combustion zone may transition to operation as a secondary combustion zone or a tertiary combustion zone. Combustion in the second combustion zone c407 may be operated or sustained as a primary combustion zone and/or a secondary combustion zone. For example, combustion in the second combustion zone c407 may be operated or sustained as a primary combustion zone after combustion in the first combustion zone c405 has sufficiently heated at least a portion of the combustor body c400 proximate to the second combustion zone c407. As combustion in the first combustion zone c405 transitions to operation as a secondary combustion zone, combustion in the second combustion zone c407 may transition to operation as a primary combustion zone. In some embodiments, combustion in the first combustion zone may be throttled back to a nominal proportion of combustion. For example, combustion in the first combustion zone c405 may operate at a nominal level sufficient to sustain steady combustion at the secondary combustion zone c407.

During operation, such as during steady state operation, combustion in the first combustion zone c405 may support combustion in the second combustion zone c407 by maintaining a supply of heat sufficient to sustain at least a portion of the combustor body c400 proximate to the second combustion zone c407 at a temperature that exceeds a threshold suitable for good combustion and flame characteristics at the second combustion zone c407. Such support from the first combustion zone c405 may advantageously allow the second combustion zone c407 to operate as a primary combustion zone, thereby introducing heat closer to a heat sink such as a working-fluid body c108 and/or a hot-side heat exchanger c106. In some embodiments, a hot-side heat exchanger c106 and/or a working-fluid body c108 may provide an improve heating efficiency with the second combustion zone c407 operating as the primary combustion zone.

As mentioned, in some embodiments, a combustor body c400 may include a plurality of combustion fins c450 circumferentially spaced about the perimeter of the combustion chamber c102 and/or the longitudinal axis c204. The plurality of combustion fins c450 may define a radially or concentrically inward portion of the plurality of combustion-gas pathways c422. The term "combustion-gas pathway" may refer to the portion of a heating fluid pathway c 602 defined by the combustion fins c450. The combustion-gas pathways c422 may be configured and arranged as spirals or spiral arcs, and may be oriented concentrically about the combustion chamber c102 and/or the longitudinal axis c204. The combustion-gas pathways c422 may fluidly communicating with a corresponding plurality of spiral pathways of the hot-side heat exchanger c106. The plurality of combustion fins c450 may respectively define a portion of a corresponding plurality of heating walls c616. Such combustion fins c450 may concurrently define at least a portion of the second combustion chamber c448 and at least a portion of the hot-side heat exchanger c106. The second combustion zone c407 may occupy at least part of the radially or concentrically inward portion of the plurality of combustion-gas pathways c422 defined by the plurality of combustion fins c450.

Regardless of whether the secondary combustion zone c407 includes combustion fins c450, at least a portion of the combustor body c400 proximate to the secondary combustion zone c407 may become red-hot, encouraging a sustained combustion flame within the secondary combustion zone c407. Combustion in the secondary combustion zone c407 may take place at an air-to-fuel ratio closer to the stoichiometric air-to-fuel ratio, with or without secondary combustion support from the first combustion zone c405.

A heater body c100 that includes a multi-stage combustor c403 may include a cool-zone fuel injector c411 and a hot-zone fuel injector c413. However, in some embodiments, a multi-stage combustor c403 may be configured to sustain combustion in a plurality of combustion zones with only a single fuel injector, such as a cool-zone fuel injector c411 or a hot-zone fuel injector c413. The cool-zone fuel injector c411 may occupy a distal position relative to the longitudinal axis c204 of the combustion chamber c102. The cool-zone fuel injector c411 may occupy a radially or concentrically inward position relative to the longitudinal axis c204 of the combustion chamber c102. In some embodiments, a hot-zone fuel injector c413 may occupy a proximal position relative to the longitudinal axis c204 of the combustion chamber c102. The hot-zone fuel injector c413 may occupy a radially or concentrically outward position relative to the longitudinal axis c204 of the combustion chamber c102 and/or relative to the radially or concentrically inward position of the cool-zone fuel injector c411. The cool-zone fuel injector c411 may coincide with the first combustion zone c405. Additionally, or in the alternative, the first fuel injector may be located upstream from the first combustion zone c405. For example, the cool-zone fuel injector c411 may be operably coupled to a combustor cap c210, such as at a nozzle port c212. The hot-zone fuel injector c413 may coincide with the second combustion zone c407. Additionally, or in the alternative, the hot-zone fuel injector c413 may be located upstream from the second combustion zone c407.

In some embodiments, a heater body c100 and/or a combustor body c400 may include one or more fuel injectors monolithically integrated with a distal portion of the combustor body c400 and/or a radially or concentrically inward portion of the combustor body c400. The one or more fuel injectors may be monolithically integrated with a radially or concentrically inward portion of the hot-side heat exchanger c106. For example, a plurality of a hot-zone fuel injectors c413 may be monolithically integrated with a distal portion of the combustor body c400 and/or a radially or concentrically inward portion of the plurality of combustion-gas pathways c616 of the hot-side heat exchanger c106. The one or more fuel injectors may be monolithically integrated with the plurality of heating walls c616 and/or the plurality of combustion fins c450. Such plurality of hot-zone fuel injectors c413 may operate as a collective unit and may be referred to collectively as a hot-zone fuel injector c413. Additionally, or in the alternative, such plurality of hot-zone fuel injectors c413 may operate independently from one another and may be referred to individually as a hot-zone fuel injector c413.

One or more hot-zone fuel pathways c415 may be monolithically integrated with at least part of a distal portion of the combustor body c400 and/or a radially or concentrically inward portion of the hot-side heat exchanger c106. The one or more hot-zone fuel pathways c415 may be configured to supply fuel for combustion at the second combustion zone c407. For example, as shown in FIGS. 4.2.2A and 4.2.2.B, a plurality of hot-zone fuel pathways c415 may be defined within respective ones of a plurality of heating walls c616 of a hot-side heat exchanger c106. Additionally, or in the alternative, one or more hot-zone fuel pathways c415 may be defined within a distal portion of the combustor body c400.

As shown, a plurality of heating walls c616 may include a heat sink c409, such as a hot-side heat exchanger c106 and/or a working-fluid body c108. The plurality of heating walls c616 may occupy a radially concentrically outward position relative to the combustion chamber c102. The plurality of heating walls c616 may define a corresponding plurality of combustion-gas pathways c422, such as spiral pathway or a spiral arc pathway, fluidly communicating with the combustion chamber c402 at circumferentially spaced locations about the combustion chamber c402. The combustion-gas pathways c422 may fluidly communicate with a proximal portion c200 of the combustion chamber c102. The plurality of combustion-gas pathways c422 may follow an annular or semiannular spiral trajectory relative to the combustion chamber c102 and/or the longitudinal axis c204 thereof.

The hot-zone fuel pathways c415 may fluidly communicate with respective ones of a plurality of combustion-gas pathways c422 of the hot-side heat exchanger c106, such as at respective ones of a plurality of heating walls c616 and/or combustion fins c450. The plurality of heating walls c616 and/or combustion fins c450 may have a plurality of openings c451 (e.g., pore-like openings) that fluidly communicate with the plurality of combustion-gas pathways c422 of the hot-side heat exchanger c106 and define the hot-zone fuel injectors c413.

In some embodiments, at least a portion of the hot-zone fuel pathways c415 may define a vaporization heat exchanger c417 that provides a heat transfer relationship between a combustion flame c426 and fuel within the hot-zone fuel pathways c415, and or between hot combustion gas c426 fuel within the hot-zone fuel pathways c415. The vaporization heat exchanger c417 may be effective to vaporize fuel (e.g., liquid fuel), such as when the fuel is within the hot-zone fuel pathways c415 and/or the hot-zone fuel injectors c413, or as the fuel is discharged from the openings (e.g., the pore-like openings) of the hot-zone fuel injectors c413.

During operation, heat from the first combustion zone c405 may heat the hot-zone fuel injectors c413 and/or at least a portion of the second combustion zone c407 to a sufficiently high temperature to allow fuel flowing out of the hot-zone fuel injectors c413 to auto-ignite. For example, a distal portion of the combustion chamber c102, and/or a radially or concentrically inward portion of the hot-side heat exchanger c106 (e.g., the combustion fins c450 and/or a radially or concentrically inward portion of the heating walls c616) may operate at a sufficiently high temperature to allow fuel flowing out of the hot-zone fuel injectors c413 to auto-ignite. The flame c426 and/or hot combustion gas c428 may have a temperature of from about 300 C to about 900 C, such as from about 350 C to about 800 C, such as from about 425 C to about 750 C, such as from about 500 C to 600 C. Once the fuel flowing out of the hot-zone fuel injectors c413 auto-ignites, the flame provided by cool-zone fuel injector c411 may be reduced to a minimal length sufficient to support combustion at the second combustion zone c407. In this way, the flame from the cool-zone fuel injector c411 may operate as a pilot burner configured to provide a pilot flame, or ignition source, for combustion in the second combustion zone c407. The pilot flame, or ignition source, provided by the cool-zone fuel injector c411 may support auto-ignition and good combustion of combustion gas c428 and/or fuel c426 flowing from the first combustion zone c405 to the second combustion zone c407, for example, providing a reburn combustion regime. Additionally, or in the alternative, such pilot flame, or ignition source may support auto-ignition and good combustion of fuel supplied by the hot-zone fuel injectors c413.

In some embodiments, the first combustion zone c405 may exhibit a rich combustion environment attributable at least in part to the fuel-to-air ratio resulting from fuel from the cool-zone fuel injector c411. The second combustion zone c407 may exhibit a lean combustion environment attributable at least in part to the fuel-to-air ratio resulting from the rich combustion environment of the first combustion zone c405 and/or fuel from the hot-zone fuel injectors c413. In some embodiments, the first combustion zone c405 may exhibit a lean combustion environment prior to auto-ignition at the second combustion zone c407. Upon auto-ignition at the second combustion zone c407, the first combustion zone c405 may transition to a rich combustion environment. The second combustion zone c407 may thereafter exhibit a lean combustion environment while the first combustion zone c405 may exhibit a rich combustion environment.

As mentioned, a lean combustion environment may be characterized by an equivalence ratio, which is the ratio of the actual fuel-to-air ratio to the stoichiometric fuel-to-air ratio. A rich combustion environment may similarly be characterized by an equivalence ratio. An exemplary lean combustion environment may include an equivalence ratio of from about 0.5 to about 1.0, such as from about 0.6 to about 0.9, or from about 0.7 to about 0.8 An exemplary rich combustion environment may include an equivalence ratio of from less than about 0.1 to about 0.5, such as from less than about 0.1 to about 0.2. By way of example, the first combustion zone c405 may exhibit an aforementioned "lean" equivalence ratio prior to auto-ignition at the second combustion zone c407, such as from about 0.5 to about 1.0, or any other suitable lean equivalence ratio. Upon auto-ignition at the second combustion zone c407, the first combustion zone c405 may transition to a "rich" equivalence ratio, such as from less than about 0.1 to about 0.5, or any other suitable rich equivalence ratio. The second combustion zone, meanwhile, may exhibit a "lean" equivalence ratio, such as from about 0.5 to 1.0, or any other suitable lean equivalence ratio. In exemplary embodiments, fuel may be supplied to the cool-zone fuel injector without pre-mix air, for example, to provide a rich combustion environment.

As shown in FIG. 4.2.2B, in some embodiments, the second combustion zone c407 may occupy one or more regions of the plurality of combustion-gas pathways c422 of the hot-side heat exchanger c106. For example, respective combustion-gas pathways c422 may include a respective second combustion zone-segment c407A.

In some embodiments, the combustion-gas pathways c422 may include a burner zone c419 configured to support combustion and/or flame stabilization within the second combustion zone c407 and/or within the respective combustion zone-segments c407A. The burner zone c419 may be defined by a plurality of burner gap, GB, c421 defined in the respective heating walls c616 and oriented along the flow-path of the respective combustion-gas pathways c422. The burner gaps c421 may be located downstream from the hot-zone fuel injectors c413, such as between respective combustion fins c450 and corresponding downstream portions of the heating walls c616. A burner gap c421 may define a gap between a combustion fin c450 and a corresponding heating wall c616. The burner gaps c421 may include an open space, a mesh, a three-dimensional lattice, a porous medium, or the like. The burner zone c419 may coincide with at least a portion of the second combustion zone c407. Additionally, or in the alternative, the second combustion zone c407 may at least partially coincide with the plurality of burner gaps c421.

In some embodiments, a combustion chamber c104 may include a vortex conditioner c137, as shown, for example, in FIGS. 4.2.2A., 4.5.5A, 4.5.5C, and 4.5.5D. The vortex conditioner c137 may be monolithically integrated with a proximal portion of the combustion chamber c102. The vortex conditioner c137 may be configured at least in part to establish and/or sustain a vortex flow field that includes the combustion gas c428 and/or the flame c426. For example, the vortex conditioner c137 may be configured at least in part to establish and/or sustain a bidirectional coaxial vortex flow field, which may enhance heat transfer of the flame c426 to the hot-side heater body c106 and/or may protect the combustion chamber wall c406 from receiving excessive heat from the flame c426. The second combustion zone c407 may occupy a radially or concentrically outward position relative to the vortex conditioner c137. As shown, the vortex conditioner c137 may have a conical or frustoconical shape projecting into the combustion chamber c102, such as along the longitudinal axis c204; however, other shapes are also envisioned. In some embodiments, a conical or frustoconical shape of the vortex conditioner c137, and/or the location and/or dimensions thereof, may at least partially contribute to the vortex flow field (e.g., the bidirectional coaxial vortex flow field) of the combustion gas c428 and/or the flame c426. A vortex conditioner c137 may be included with a heater body c100 and/or a combustor body c400 configured for single-stage and/or multi-stage combustion.

Now turning to FIGS. 4.2.5A and 4.2.5B, exemplary methods of combusting a fuel will be described. Exemplary methods may be performed in connection with operation of a combustor body c400, a heater body c100, and/or a closed-cycle engine c002 as described herein. As shown in FIG. 4.2.5A, an exemplary method c470 may include, at block c472, swirling combustion gas through a conditioning conduit c122, with the combustion gas flowing from a proximal portion of the conditioning conduit c122 to a distal portion of the conditioning conduit c122 while swirling. At block c474, the exemplary method c470 may include swirling the combustion gas through a combustion chamber c102. In the exemplary method c470, the conditioning conduit c122 may circumferentially surround the combustion chamber c102 with the conditioning conduit c122 providing fluid communication with the combustion chamber c102 at a distal portion of the combustion chamber c102. The combustion gas may flow from the distal portion of the conditioning conduit c122 to the distal portion of the combustion chamber c102 and from the distal portion of the combustion chamber c102 to a proximal portion of the combustion chamber c102. At block c476, the exemplary method c470 may include combusting a fuel c426 in the combustion chamber c102. The fuel may be supplied at least in part from the combustion gas flowing from the conditioning conduit c122 to the combustion chamber c102.

The exemplary method c470 may additionally or alternatively include, at block 478, supplying at least a portion of the fuel to the combustion chamber c102 through a fuel nozzle c214 fluidly communicating with a distal portion of the combustion chamber c102. Additionally, or in the alternative, the exemplary method c470 may include supplying at least a portion of the fuel to the combustion chamber through the conditioning conduit. For example, the exemplary method c470 may include, circulating at least a portion of the combustion gas through one or more conditioning conduit inlets c414 disposed about a proximal portion of the conditioning conduit.

At block c480, the exemplary method c470 may include circulating at least a portion of the combustion gas through a recirculation pathway c104, with the recirculation pathway c104 providing fluid communication from a proximal portion of the combustion chamber c102 to a proximal portion of the conditioning conduit c122. The recirculation pathway c104 may include a hot-side heat exchanger c106 and a recirculation eductor c116. The hot-side heat exchanger c106 may fluidly communicate with a proximal portion of the combustion chamber c102 and the recirculation eductor c116 may fluidly communicate with a downstream portion of the hot-side heat exchanger c106 and a proximal portion of the conditioning conduit c122 and/or and a distal portion of the combustion chamber c102. The exemplary method may include combusting at least a portion of the combustion gas circulating through the recirculation pathway c104.

At least a portion of the fuel may be supplied to the combustion chamber c102 through one or more conditioning conduit inlets c414 disposed about a proximal portion of the conditioning conduit c122. Supplying fuel through the one or more conditioning conduit inlets c414 may include supplying fuel through one or more motive pathways c418 and/or one or more eduction pathways c420. The one or more conditioning conduit inlets c414 may be oblique to the conditioning conduit c122, for example, to facilitate swirling of the combustion gas and/or fuel.

Now referring to FIG. 4.2.5B, another exemplary method c471 of combusting a fuel will be described. As shown, an exemplary method c471 may include, at block c473, combusting a fuel at a first combustion zone c405; at a block c475, heating a second combustion zone c407; and, at block c477, combusting a fuel at the second combustion zone c407. In some embodiments, an exemplary method c471 may include, at block c479, auto-igniting fuel at the second combustion zone c407. Combusting the fuel at a first combustion zone c405 may include, at block c481, combusting fuel from a cool-zone fuel injector c411 at the first combustion zone c405. Auto-igniting fuel at the second combustion zone c407 may include, at block c483, auto-igniting fuel from the cool-zone fuel injector c411 from a hot-zone fuel injector c413 at the second combustion zone c407. Combusting the fuel at the second combustion zone c407 may include, at block c485, combusting fuel from the cool-zone fuel injector c411 and/or from the hot-zone fuel injector c413 at the second combustion zone c407. Heating the second combustion zone c407 may include, at block c487 vaporizing fuel in a vaporization heat exchanger c417.

In some embodiments, combusting fuel at the first combustion zone c405 may include, at block c489, combusting fuel at the first combustion zone c405 in a lean combustion environment and/or a rich combustion environment. At block c491, combusting fuel at the second combustion zone c407 may include combusting fuel at the second combustion zone c407 in a rich combustion environment. In some embodiments, an exemplary method c471 may include, at bock c493A, combusting fuel at the first combustion zone in a lean combustion environment, and, at block c493B, combusting fuel at the first combustion zone in a rich combustion environment upon having auto-ignited fuel at the second combustion zone. At block c491C, an exemplary method c471 may include combusting fuel at the second combustion zone in a lean combustion environment while combusting fuel at the first combustion zone in a rich combustion environment.

Any one or more parameters may be utilized to control one or more operations of a combustor body c400, a heater body c100, and/or a closed-cycle engine c002 as described herein, including one or more operations in connection with methods of combustion a fuel such as the exemplary methods described herein with reference to FIGS. 4.2.5A and 4.2.5B. By way of example, an exemplary method of combustion a fuel c470, c471 may include controlling one or more of: a fuel flow (e.g., a fuel flow to a cool-zone fuel injector c411 and/or a hot-zone fuel injector c413), an air flow (e.g., an intake airflow, an exhaust flow, and/or a combustion gas flow).

Now referring to FIGS. 4.4.1A and 4.4.1B, 4.4.2A and 4.4.2B, and 4.4.3A and 4.4.3B, exemplary heat exchanger bodies c600 (e.g., hot-side heat exchanger bodies c600) will be described. The presently disclosed hot-side heat exchanger bodies c600 may define part of a heater body c100 and/or a closed-cycle engine c002. For example, a hot-side heat exchanger body c600 may define at least a portion of a monolithic body or a monolithic body-segment. Such monolithic body or monolithic body-segment may define at least a portion of the heater body c100 and/or the closed-cycle engine c002. Additionally, or in the alternative, the presently disclosed hot-side heat exchanger bodies c600 may be provided as a separate component, whether for use in connection with a heater body c100, a closed-cycle engine c002, or any other setting whether related or unrelated to a heater body c100 or a closed-cycle engine c002. At least a portion of the hot-side heat exchanger body c600 may define a hot-side heat exchanger c106. While the heater bodies c100 depicted in the figures may show one hot-side heat exchanger body c600 and/or one hot-side heat exchanger c106, it will be appreciated that a heater body c100 may include a plurality of hot-side heat exchanger bodies c600 and/or a plurality of hot-side heat exchangers c106. For example, a heater body c100 may include one or more hot-side heat exchanger bodies c600, and/or a hot-side heat exchanger body c600 may include one or more hot-side heat exchangers c106.

As shown, a hot-side heat exchanger body c600 and/or a hot-side heat exchanger c106 may include a plurality of heating walls c616. The plurality of heating wall c616 may be configured and arranged as an array of heating walls c616. The heating walls c616 may be radially or concentrically adjacent to one another. The heating walls c616 may be configured and arranged as a spiral or a spiral arc, and may be disposed annularly or semi-annularly relative to the combustion chamber c102 and/or the longitudinal axis c204 thereof. The heating wall c616 may be concentrically nested with one another. The heating wall c616 may be configured and arranged as an array of substantially concentric spirals and/or an array of substantially concentric spiral arcs. By way of example, a spiral or spiral arc, such as in an array of substantially concentric spirals or spiral arcs, may correspond to at least a portion of an Archimedean spiral, a Cornu spiral, a Fermat's spiral, a hyperbolic spiral, a logarithmic spiral, a Fibonacchi spiral, an involute, or a squircular spiral, as well as combinations of these.

The heating walls c616 define a plurality of heating fluid pathways c602. The heating fluid pathways c602 may make up a portion of the hot-side heat exchanger body c600 and/or a hot-side heat exchanger c106, defining a pathway through which a heating fluid such as circulating combustion gas may flow. The heating fluid pathways c602 may fluidly communicate with an inlet plenum c604. The inlet plenum may include a combustion chamber c602. The heating fluid pathways c602 may be configured and arranged as an array of heating fluid pathways c602. The heating fluid pathways c602 may be radially or concentrically adjacent to one another with a heating wall c616 disposed between respective adjacent heating fluid pathways c602. The heating walls c616 may be radially or concentrically adjacent to one another with a heating fluid pathway c602 disposed between respective adjacent heating walls c616. The heating walls c616 may be configured and arranged as a spiral or a spiral arc, and may be disposed annularly or semi-annularly relative to the combustion chamber c102 and/or the longitudinal axis c204 thereof. The heating fluid pathways c602 may be concentrically nested with one another. The heating fluid pathways c602 may be configured and arranged as an array of substantially concentric spirals and/or an array of substantially concentric spiral arcs. The hot-side heat exchanger body c600 may include an array of alternating heating walls c616 and heating fluid pathways c602.

Upstream ends of the heating walls c616 may be circumferentially spaced about an inlet plenum c604, such as a combustion chamber. Upstream ends of the heating fluid pathways c602 may respectively define an inlet c606, which may be circumferentially spaced about the inlet plenum c604, such as the combustion chamber c102. At least some of the inlets c606 may be oriented oblique to the inlet plenum c604. At least some of the plurality of heating fluid pathways c602 may define a spiral pathway.

The inlet plenum c604, such as the combustion chamber c102, may fluidly communicate with the plurality of heating fluid pathways c602. The plurality of heating fluid pathways c604 may respectively define an inlet c606 circumferentially spaced about the inlet plenum c604 (and/or disposed radially about the inlet plenum c604). Respective ones of the plurality of heating fluid pathways c604 may define respective ones of a plurality of inlets c606. The plurality of inlets c604 may be circumferentially spaced about the inlet plenum c604 (and/or disposed radially about the inlet plenum c604).

For example, the plurality of inlets c604 may be circumferentially spaced about the combustion chamber c102 (and/or disposed radially about the combustion chamber c102). In some embodiments, respective ones of the plurality of inlets may define respective ones of a plurality of combustion chamber outlets c412. Additionally, or in the alternative, the inlet plenum c604 may define a plurality of inlets c606 fluidly communicating with respective ones of the plurality of heating fluid pathways c602. For example, the combustion chamber c102 may define a plurality of combustion chamber outlets c412 and/or a plurality of inlets c606 fluidly communicating with respective ones of the plurality of heating fluid pathways c602.

The plurality of heating fluid pathways c602 may additionally or alternatively fluidly communicate with one or more outlet plenum c608, such as a recirculation annulus c208. The fluid communication between the plurality of heating fluid pathways c602 and the one or more outlet plenum c608, such as a recirculation annulus c208 may be at a downstream portion of respective ones of the plurality of heating fluid pathways c602. The outlet plenum c608 or recirculation annulus c208 may circumferentially surround at least a portion of the hot-side heat exchanger body c600 and/or the hot-side heat exchanger c106. For example, the outlet plenum c608 or recirculation annulus c208 may circumferentially surround at least a portion of the plurality of heating fluid pathways c602.

As shown, for example, in FIGS. 4.4.1B and 4.4.2B, the hot-side heat exchanger body c600 and/or a working-fluid body c108 may define a plurality of heat transfer regions c612. The plurality of heat transfer regions c612 may correspond to respective portions of a working-fluid body c108. A respective heat transfer region c612 may encompass a portion of the hot-side heat exchanger body c600 and/or a portion of the working-fluid body c108. Respective ones of the plurality of heat transfer regions c612 have a thermally conductive relationship with a corresponding portion c614 of the plurality of heating fluid pathways c602, such as a semiannular portion c614 of the plurality of heating fluid pathways c602. Respective ones of the plurality of heat transfer regions c612 may include a heat input region, at least one heat extraction region, and a plurality of working-fluid pathways c110. The heat input region may include a piston body c700 and the heat extraction region may include a regenerator body c800.

In some embodiments, a heat transfer region c612 may include at last a portion of a working-fluid body c108. For example, a heat transfer region c612 may include at least a portion of a piston body c700 and/or at least a portion of a regenerator body c800. Additionally, or in the alternative, a heat transfer region c612 include one or more working-fluid pathways c110 that have a thermally conductive relationship with a corresponding portion c614 (e.g., a semiannular portion) of at least some of the plurality of heating fluid pathways c602. For example, the heat transfer region c612 may include one or more working-fluid pathways c110 defined at least in part within a corresponding one or more heating wall c616 of a hot-side heat exchanger c106. Such working-fluid pathways c110 may define a pathway for an engine-working fluid to flow through the hot-side heat exchanger c106, such as through the one or more heating walls c616 thereof. Where a working-fluid pathway c110 flows through a hot-side heat exchanger c106, the heat transfer region c612 may include a portion of the working-fluid pathway within or defined by the hot-side heat exchanger c106, such as within a region of one or more heating wall c616 of the hot-side heat exchanger c106 corresponding to the heat transfer region c612.

The hot-side heat exchanger body c600 may include a plurality of working-fluid pathways c110 monolithically formed within the plurality of heating walls c616. The plurality of working-fluid pathways may be grouped into an array of working-fluid pathways c110 and/or a plurality of arrays of working fluid-pathways c110. An array of working-fluid pathways c110 may define a heat transfer region c612. A plurality of arrays of working-fluid pathways c110 may define a corresponding plurality of heat transfer regions c612. Respective ones of the plurality of arrays of working-fluid pathways c110 may be circumferentially spaced about the hot-side heat exchanger body c600. Respective ones of the plurality of heat transfer regions c600 may be circumferentially spaced about the hot-side heat exchanger body c600.

As shown, for example, in FIGS. 4.4.2A and 4.4.2B, at least some of the working-fluid pathways c110 may be radially or concentrically adjacent to one another. Additionally, or in the alternative, as also shown, at least some of the working-fluid pathways c110 may be semiannular to one another. The working-fluid pathways c110 may fluidly communicate between the heat input region and the at least one heat extraction region. The plurality of heating fluid pathways c602 may be disposed radially or concentrically adjacent to corresponding respective ones of the plurality of working-fluid pathways c110, such as radially or concentrically adjacent to respective ones of a plurality of semiannular working-fluid pathways c110. Respective ones of the plurality of heating fluid pathways c602 may have a thermally conductive relationship with corresponding respective ones of the plurality of working-fluid pathways c110.

The plurality of heat transfer regions c612 may be circumferentially spaced about the hot-side heat exchanger body c600. The semiannular portion c614 of the plurality of heating fluid pathways c602 corresponding to a respective heat transfer region c612 may correspond to a radial position of the respective heat transfer region c612. For example, the plurality of heating fluid pathways c602 may define a spiral pathway, spiraling annularly or semi-annularly around a longitudinal axis, A, c214. The portion c614 of the plurality of heading fluid pathways c602 passing the radial position of a respective heat transfer region c612 may define the semiannular portion c614 of the plurality of heating fluid pathways c602 corresponding to the respective heat transfer region c612.

In some embodiments, the plurality of heating fluid pathways c602 may pass adjacent to at least some of the plurality of heat transfer regions c612 in circumferential series. For example, the plurality of heating fluid pathways c602 may have a thermally conductive relationship with the at least some of the plurality of heat transfer regions c612, and the particular heat transfer region c612 with which a respective portion c614 of the plurality of heating fluid pathways c604 has a thermally conductive relationship may transition radially from one heat transfer region c612 to and adjacent heat transfer region c612. The circumferential series of a respective one of the plurality of heating fluid pathways c602 may have a sequence depending at least in part on a circumferential location of an inlet c606 to the respective one of the plurality of heating fluid pathways c602.

By way of example, a first heating fluid pathway c618 may pass adjacent to at least some of the plurality of heat transfer regions c612 in a first circumferential series that includes a first heat transfer region c620 followed by a second heat transfer region c622. The first circumferential series may additionally or alternatively include the second heat transfer region c622 followed by a third heat transfer region c624 and/or a fourth heat transfer region c626. For example, the fourth heat transfer region c626 may be preceded by the third heat transfer region c624. A second heating fluid pathway c628 may pass adjacent to at least some of the plurality of heat transfer regions c612 in a second circumferential series. The second circumferential series may include the second heat transfer region c622 followed by the third heat transfer region c624. The second circumferential series may additionally or alternatively include the third heat transfer region c624 followed by the fourth heat transfer region c626 and/or the first heat transfer region c620. For example, the first heat transfer region c620 may be preceded by the fourth heat transfer region c626. A third heating fluid pathway c630 may pass adjacent to at least some of the plurality of heat transfer regions c612 in a third circumferential series. The third circumferential series may include the third heat transfer region c624 followed by the fourth heat transfer region c626. The third circumferential series may additionally or alternatively include the fourth heat transfer region c626 followed by the first heat transfer region c620 and/or the second heat transfer region c622. For example, the second heat transfer region c622 may be preceded by the first heat transfer region c620. A fourth heating fluid pathway c632 may pass adjacent to at least some of the plurality of heat transfer regions c612 in a fourth circumferential series. The fourth circumferential series may include the fourth heat transfer region c626 followed by the first heat transfer region c620. The fourth circumferential series may additionally or alternatively include the first heat transfer region c620 followed by the second heat transfer region c622 and/or the third heat transfer region c624. For example, the third heat transfer region c624 may be preceded by the second heat transfer region c622.

During operation, heating fluid such as combustion gas flowing through the plurality of heating fluid pathways c602 may transfer heat to any one or more of the plurality of heat transfer regions c612. The rate or quantity of heat transferring from the heating fluid to a heat transfer region c612 may vary as between respective ones of the heat transfer pathways c602 and/or as between respective ones of the heat transfer regions c612. For example, the rate or quantity of heat transferring from the heating fluid to a heat transfer region c612 may depend at least in part on a temperature gradient between the heating fluid and the heat transfer region, such as a temperature gradient between the heating fluid and the engine-working fluid. In some embodiments, however, the heating fluid within the plurality of heating fluid pathways c602 may exhibit a temperature that differs as between at least two portion c614 (e.g., at least two semiannular portion) corresponding to respective heat transfer regions c612 and/or as between at least two heating fluid pathways c602 within a given portion c614 (e.g., within a semiannular portion) corresponding to a given heat transfer regions c612. Additionally, or in the alternative, the plurality of heat transfer regions c612 may exhibit a temperature that differs as between at least two heat transfer regions c612. For example, the engine-working fluid within the plurality of working-fluid pathways c110 corresponding to respective ones of the heat transfer regions c612 may exhibit a temperature that differ as between at least two heat transfer regions c612 and/or as between at least two working-fluid pathways c110 within a given heat transfer region c612.

In some embodiments, the temperature of a heating fluid such as a combustion gas may decrease as the heating fluid flows through the plurality of heating fluid pathways c602 and heat transfers from the heating fluid to the heat transfer regions c612 of the working-fluid body c108, such as from the heating fluid to engine-working fluid in the working-fluid pathways c110. However, with the plurality of heating fluid pathways c602 defining a spiral pathway, as shown for example in FIGS. 4.4.1A through 4.4.2B, respective ones of the plurality of heating fluid pathways c602 may encounter the respective ones of the plurality of heat transfer regions c612 in a differing sequence, which may depend at least in part on a circumferential location of an inlet c606 to the respective one of the plurality of heating fluid pathways c602.

For example, a first heating fluid pathway c618 may initially encounter the first heat transfer region c620, such as according to a first circumferential series, while a second heating fluid pathway c628 may encounter the first heat transfer region c620 last, such as according to a second circumferential series. Additionally, or in the alternative, a third heating fluid pathway c630 may encounter the first heat transfer region c620 third in series, such as according to a third circumferential series, and/or a fourth heating fluid pathway c632 may encounter the first heat transfer region c620 second in series, such as according to a fourth circumferential series.

As another example, the second heat transfer region c622 may have a thermally conductive relationship with the first heating fluid pathway c618 occurring second, such as according to the first circumferential series. The second heat transfer region c622 may have a thermally conductive relationship with the second heating fluid pathway c628 occurring first, such as according to the second circumferential series. The second heat transfer region c622 may have a thermally conductive relationship with the third heating fluid pathway c630 occurring last, such as according to the third circumferential series. The second heat transfer region c622 may have a thermally conductive relationship with the fourth heating fluid pathway c632 occurring third, such as according to the third circumferential series.

In some embodiments, a heat transfer region c622 may include a piston body c700 and/or a regenerator body c800, and/or a plurality of working-fluid pathways c110 fluidly communicating between the piston body c700 and/or the regenerator body c800. When a closed-cycle engine c002 includes a plurality of piston bodies, the piston assemblies may have a staggered or offset stroke cycle, such that a first piston and a second piston may be located at different points in respective stroke cycles upon least one point of the stroke cycle. For example, the first piston may be at a top point of the stroke cycle and the second piston may be at a bottom point of the stroke cycle. As another example, the first piston may be at a midpoint of the stroke cycle and the second piston may be at the top point or the bottom point of the stroke cycle. In some embodiments, engine-working fluid flowing from a piston body c700 (e.g., from a piston chamber c112) to a regenerator body c800 may exhibit a temperature that differs from engine-working fluid flowing in the opposite direction, from the regenerator body c800 to the piston body c700 (e.g., to the piston chamber c112).

The engine-working fluid flowing through the working-fluid pathways c110 may exhibit a temperature that depends at least in part on whether the engine-working fluid is flowing towards the regenerator body c800 (e.g., from the piston body c700) or towards the piston body c700 (e.g., from the regenerator body c800). For example, the temperature of the engine-working fluid may exhibit a first temperature when flowing towards the regenerator body c800 (e.g., from the piston body c700) and a second temperature when flowing towards the piston body c700 (e.g., from the regenerator body c800). In some embodiments the first temperature may be greater than the second temperature.

In some embodiments, the heating fluid such as combustion gas and the engine-working fluid may exhibit a temperature gradient that depends at least in part on whether the engine-working fluid is flowing towards the regenerator body c800 (e.g., from the piston body c700) or towards the piston body c700 (e.g., from the regenerator body c800). For example, a first temperature gradient may correspond to engine-working fluid flowing towards the regenerator body c800 (e.g., from the piston body c700) and a second temperature gradient may correspond to engine-working fluid flowing towards the piston body c700 (e.g., from the regenerator body c800). In some embodiments the first temperature gradient may be smaller than the second temperature gradient. In some embodiments the second temperature gradient may be greater than the first temperature gradient. For example, the first temperature gradient may be smaller than the second temperature gradient at least in part because of the temperature of the engine-working fluid flowing towards the regenerator body c800 (e.g., from the piston body c700) being greater than the temperature of engine-working fluid flowing towards the piston body c700 (e.g., from the regenerator body c800).

In some embodiments, the rate and/or quantity of heat transfer from the heating fluid to the engine-working fluid may depend on whether the engine-working fluid is flowing towards the regenerator body c800 (e.g., from the piston body c700) or towards the piston body c700 (e.g., from the regenerator body c800). For example, a first rate and/or quantity of heat transfer from the heating fluid to the engine-working fluid may correspond to engine-working fluid flowing towards the regenerator body c800 (e.g., from the piston body c700) and a second rate and/or quantity of heat transfer from the heating fluid to the engine-working fluid may correspond to engine-working fluid flowing towards the piston body c700 (e.g., from the regenerator body c800). In some embodiments the first rate and/or quantity of heat transfer may be smaller than the second rate and/or quantity of heat transfer. In other words, the second rate and/or quantity of heat transfer may be greater than the first rate and/or quantity of heat transfer. For example, the first rate and/or quantity of heat transfer may be smaller than the second rate and/or quantity of heat transfer at least in part because of the first temperature gradient corresponding to engine-working fluid flowing towards the regenerator body c800 (e.g., from the piston body c700) being smaller than the second temperature gradient corresponding to engine-working fluid flowing towards the piston body c700 (e.g., from the regenerator body c800).

In some embodiments, the heating efficiency of the heater body c100 may be enhanced at least in part by the second rate and/or quantity of heat transfer corresponding to engine-working fluid flowing towards the piston body c700 (e.g., from the regenerator body c800) being greater than the first rate and/or quantity of heat transfer corresponding to engine-working fluid flowing towards the regenerator body c800 (e.g., from the piston body c700). For example, in this way, a relatively larger proportion of the heat input by the heater body c100 may be applied to the engine-working fluid as the engine-working fluid flows towards the piston body c700 and thereby drives the piston downward, performing the downstroke portion of a stroke cycle. The heat input to the engine-working fluid during the downstroke may contribute to the downstroke (e.g., directly) by further heating and thereby further expanding the engine-working fluid. During the upstroke portion of the stroke cycle, a relatively smaller proportion of the heat input by the heater body c100 may be applied to the engine-working fluid, which may reduce or mitigate a potential for heat input to the engine-working fluid to counteract the upstroke by further heating and thereby expanding the engine-working fluid, providing an additional or alternative efficiency enhancement. With a relatively smaller proportion of the heat input by the heater body c100 applied to the engine-working fluid during the upstroke, a smaller portion of the heat input may be transferred to the regenerator body c800. While the regenerator body c800 may be configured to retain heat, at least some heat transferring to the regenerator body c800 may be lost. By transferring a larger proportion of the heat input of the heater body c100 to the engine-working fluid when flowing towards the piston body c700 (e.g., from the regenerator body c800), less heat energy may be lost to the regenerator body c800, thereby providing yet another additional or alternative efficiency enhancement.

In some embodiments, at least a portion of the heater body c100 (e.g., the hot-side heat exchanger body c600 and/or the working-fluid body c108) may be configured such that the temperature gradient between the temperature gradient between the heating fluid and the engine-working fluid is relatively small when the engine-working fluid is flowing towards the regenerator body c800. For example, the temperature gradient between the heating fluid and the engine-working fluid may be minimal when the engine-working fluid is flowing towards the regenerator body c800. With a relatively small and/or minimal temperature gradient, the rate and/or quantity of heat transfer to the engine-working fluid when flowing towards the regenerator body c800 may be minimal or nominal. Additionally, or in the alternative, at least a portion of the heater body c100 (e.g., the hot-side heat exchanger body c600 and/or the working-fluid body c108) may be configured such that the temperature gradient between the temperature gradient between the heating fluid and the engine-working fluid is relatively large when the engine-working fluid is flowing towards the piston body c700. For example, the temperature gradient between the heating fluid and the engine-working fluid may be maximal when the engine-working fluid is flowing towards the piston body c700. With a relatively large and/or maximal temperature gradient, the rate and/or quantity of heat transfer to the engine-working fluid when flowing towards the regenerator body c800 may be maximized.

In some embodiments, the rate and/or quantity of heat transferred from the heating fluid to the engine-working fluid may exhibit a ratio of heat transfer when flowing towards the piston body c700 to heat transfer when flowing towards the regenerator body c800 of from about 1:1 to about 100:1, such as from about 2:1 to about 100:1, such as from about 2:1 to about 10:1, such as from about 10:1 to about 20:1, such as from about 20:1 to about 50:1, or such as from about 50:1 to about 100:1. The ratio may be at least 1:1, such as at least 2:1, such as at least 10:1, such as at least 20:1, such as at least 50:1, or such as at least 90:1. The ratio may be less than 100:1, such as less than 90:1, such as less than 50:1, such as less than 20:1, such as less than 10:1, or such as less than 2:1.

As the heating fluid flows through the plurality of heating fluid pathways c602, heat may preferentially transfer to heat transfer regions c612 where the temperature gradient is larger or largest, thereby preferentially providing heat to the heat transfer regions where heat is needed more or most, for example, in favor of other heat transfer regions c612 with a lower or lowest temperature gradient. In some embodiments, heat may preferentially transfer to heat transfer regions (e.g., to engine-working fluid flowing through working-fluid pathways c110 therein) corresponding to a piston during a downstroke portion of the stroke cycle relative to heat transfer regions corresponding to a piston during an upstroke portion of the stoke cycle. Such preferential heat transfer may be accomplished at least in part by providing a relatively greater temperature gradient during the downstroke portion of the stroke cycle as described. With the plurality of heating fluid pathways c602 defining a spiral pathway, as shown for example in FIGS. 4.4.1A through 4.4.2B, the plurality of heating fluid pathways c602 may encounter all or a portion of the heat transfer regions c612, thereby allowing for preferential heat transfer to the heat transfer regions c612 where the temperature gradient is larger or largest.

In some embodiments, a hot-side heat exchanger body c600 may include a combustion chamber c102 disposed annularly about an axis c204. A hot-side heat exchanger body c600 may additionally include a conditioning conduit c122 circumferentially surrounding the combustion chamber c102. The conditioning conduit c122 may fluidly communicate with the combustion chamber c102 at a distal portion c202 of the combustion chamber c102.

In some embodiments, as shown for example in FIGS. 4.4.2A and 4.4.2B, and 4.4.3A and 4.4.3B, a hot-side heat exchanger body c600 may include a plurality of combustion fins c450 circumferentially spaced about the perimeter of the combustion chamber c102 (and/or disposed radially about the perimeter of the combustion chamber c102). The plurality of combustion fins c450 may occupy a radially or concentrically inward portion of the hot-side heat exchanger body c600. In some embodiments, a portion of the hot-side heat exchanger body c600 may define a second combustion chamber c448. The second combustion chamber c448 may include a plurality of combustion fins c450 circumferentially spaced about the perimeter of the combustion chamber c102 (and/or disposed radially about the perimeter of the combustion chamber c102). The plurality of combustion fins c450 may define at least a portion of the plurality of heating fluid pathways c602. Additionally, or in the alternative, the plurality of combustion fins c450 may define a plurality of combustion-gas pathways c422 fluidly communicating upstream with the combustion chamber c102 and downstream with a corresponding plurality of heating fluid pathways c602. Such combustion-gas pathways c422 may concurrently define at least a portion of the second combustion chamber c448 and at least a portion of the plurality of heating fluid pathways c602. The second combustion chamber c448 may allow combustion to take place at an air-to-fuel ratio closer to the stoichiometric air-to-fuel ratio.

The plurality of combustion fins c450 may be monolithically integrated with corresponding ones of a plurality of heating walls c616 that respectively define the plurality of heating fluid pathways c602. Additionally, or in the alternative, the combustion fins c450 and the heating walls c616 may be spaced apart from one another, such as with a gap or pathway between an upstream end of the heating walls c602 and a downstream end of the combustion fins c450. The portion of a heating fluid pathways c602 defined by the combustion fins c450 may be referred to as combustion-gas pathways c422. The combustion-gas pathways c422 may at least partially occupy the region of the hot-side heat exchanger c106 where combustion is configured to occur. Combustion may occur in the combustion-gas pathways c42 at least in part by the combustion fins c450 being heated to a sufficiently high temperature during operation to prevent flame quenching.

The plurality of heating fluid pathways c602 may fluidly communicate with the outlet plenum c608 at a corresponding plurality of circumferential locations about the hot-side heat exchanger body c600. By way of example, a first heating fluid pathway c618 may fluidly communicate with an outlet plenum c608 at a first circumferential location c634 about a circumferential axis of the hot-side heat exchanger c106. The first circumferential location c634 may be from about 0 to 30 degrees about the circumferential axis, such as from about 0 to 15 degrees on the circumferential axis. A second heating fluid pathway c628 may fluidly communicate with an outlet plenum c608 at a second circumferential location c636 about the circumferential axis. The second circumferential location c636 may be from about 90 to 120 degrees about the circumferential axis, such as from about 90 to 105 degrees about the circumferential axis. A third heating fluid pathway c630 may fluidly communicate with an outlet plenum c608 at a third circumferential location c638 about the circumferential axis. The third circumferential location c638 may be from about 180 to 210 degrees about the circumferential axis, such as from about 180 to 195 degrees about the circumferential axis c205. A fourth heating fluid pathway c632 may fluidly communicate with an outlet plenum c608 at a fourth circumferential location c640 about the circumferential axis c205. The fourth circumferential location c640 may be from about 270 to 300 degrees about the circumferential axis c205, such as from about 270 to 285 degrees about the circumferential axis c205.

A hot-side heat exchanger body c600 and/or a working-fluid body c108 may define any number of heat transfer regions c612. For example, heat exchanger body c600 and/or a working-fluid body c108 may define from 1 to 10 heat transfer regions c612, such as from 2 to 8 heat transfer regions c612, such as from 3 to 5 heat transfer regions. A plurality of heat transfer regions c612 may be circumferentially spaced about the hot-side heat exchanger body, such as at respective circumferential regions about the circumferential axis c205. As shown, four heat transfer regions c612 may be circumferentially spaced about the hot-side heat exchanger body c600. By way of example, a first heat transfer region c620 may be disposed about a first circumferential segment or sector about the circumferential axis c205 of the hot-side heat exchanger c106. The first circumferential segment or sector may be from about 270 to about 360 degrees about the circumferential axis c205. A second heat transfer region c622 may be disposed about a second circumferential segment or sector about the circumferential axis c205. The second circumferential segment or sector may be from about 180 to about 270 degrees about the circumferential axis c205. A third heat transfer region c624 may be disposed about a third circumferential segment or sector about the circumferential axis c205. The third heat transfer region c624 may be from about 90 to about 180 degrees about the circumferential axis c205. A fourth heat transfer region c626 may be disposed about a fourth circumferential segment or sector about the circumferential axis c205. The fourth circumferential segment or sector may be from about 0 to about 90 degrees about the circumferential axis c205.

A hot-side heat exchanger body c600 and/or a hot-side heat exchanger c106 may include any number of heating fluid pathways c602. For example, a hot-side heat exchanger body c600 and/or a hot-side heat exchanger c106 may include from 1 to 96 heating fluid pathways c602, such as from 1 to 48 heating fluid pathways c602, such as from 4 to 32 heating fluid pathways c602, such as from 8 to 24 heating fluid pathways c602, such as from 12 to 20 heating fluid pathways c602, such as from 4 to 16 heating fluid pathways c602, such as from 4 to 8 heating fluid pathways c602, such as at least 4, at least 8, at least 16, or at least 32 heating fluid pathways c602.

In some embodiments, at least some of the plurality of heating fluid pathways c602 may have a substantially uniform cross-sectional width and/or a substantially uniform cross-sectional area. The substantially uniform cross-sectional width and/or a substantially uniform cross-sectional area of a heating fluid pathway c602 may be present along at least a portion of a length of the heating fluid pathway c602.

At least some of the heating fluid pathways c602 may define a spiral pathway spiraling annularly or semi-annularly around a longitudinal axis A 214. A spiral pathway may follow a spiral arc having any desired curvature. The spiral arc may continue along all or a portion of the spiral pathway defined by the heating fluid pathway c602. By way of example, a spiral and/or a spiral arc, such as in a spiral pathway, may correspond to at least a portion of an Archimedean spiral, a Cornu spiral, a Fermat's spiral, a hyperbolic spiral, a logarithmic spiral, a Fibonacchi spiral, an involute, or a squircular spiral, as well as combinations of these. As shown, in some embodiments the plurality of heating fluid pathways c602 may define a squircular spiral. At least a portion of a squircular spiral may include an arc corresponding to a squircle. The plurality of heating fluid pathways c602 may have an arc length of from 180 degrees to 1260 degrees, such as from 180 degrees to 450 degrees, such as from 315 degrees to 765 degrees, such as from 675 degrees to 1260 degrees.

In some embodiments, the plurality of heating fluid pathways c602 may include radially or concentrically adjacent pathways. Additionally, or in the alternative, the plurality of heating fluid pathways c602 may include one or more inverse pairs. For example, an inverse pair may include a pair of heating fluid pathways c602 fluidly communicating with the inlet plenum c604 (e.g., the combustion chamber c102) at opposite sides thereof. Additionally, or in the alternative, an inverse pair may include a pair of heating fluid pathways c602 fluidly communicating with the outlet plenum c608 (e.g., the recirculation annulus c208) at opposite sides thereof. By way of example, a first heating fluid pathway c618 and a third heating fluid pathway c630 may define an inverse pair. As another example, a second heating fluid pathway c628 and a fourth heating fluid pathway c632 may define an inverse pair. The inverse pair may follow a spiral arc having any desired curvature, such as a spiral arc inverse pair. For example, the heating fluid pathways c602 may define a plurality of spiral arc inverse pairs. In some embodiments, an inverse pair may include a parabolic spiral.

Now referring to FIGS. 4.4.3A and 4.4.3B, further exemplary embodiments of a hot-side heat exchanger body c600 will be described. As shown, in some embodiments, a hot-side heat exchanger body c600 may have a plurality of heating walls c616 and/or combustion fins c450 that respectively include a plurality of conduction breaks c605. The conduction breaks c605 may be disposed radially or concentrically outward relative to the plurality of combustion fins c450, and/or radially or concentrically inward relative to the plurality of heating walls c616. The conduction breaks c605 may at least partially inhibit heat conduction from the plurality of combustion fins c450 to the plurality of heating walls c616. The conduction breaks c605 may impart a decrease in thermal conductivity relative to the thermal conductivity of the plurality of heating walls c616 and/or the plurality of combustion fins c450. The plurality of heating walls c616 may be configured an arranged in a spiral array or spiral arc, such as an annular or semiannular spiral array or spiral arc. Additionally, or in the alternative, the plurality of combustion fins c450 may be configured an arranged in a spiral array or spiral arc, such as an annular or semiannular spiral array or spiral arc. A combustion fins c450 and a corresponding heating wall c616 may follow a common trajectory. Additionally, or in the alternative, one or more combustion fins c450 may be staggered or offset from one or more heating walls c616. The condition breaks c605 may be configured to reduce heat conduction along the plurality of heating walls c616, such as along a radial axis or a circumferential axis. For example, the conduction breaks c450 may reduce heat conduction from a downstream portion of the combustion fins c450 to an upstream portion of the heating walls c616, and/or from an upstream portion of the plurality of heating walls c616 to a downstream portion of the plurality of heating walls c616. During operation, the combustion fins c450 may operate at a relatively higher temperature at least in part because of the reduced heat conduction attributable to the conduction breaks.

In some embodiments, a portion of the heating wall c616 upstream from a conduction break c605 may define a combustion fin c450. Additionally, or in the alternative, at least a portion of the heating wall c616 downstream from a conduction break c605 may define a heat transfer fin c607. The plurality of heating walls c616 may be formed of one or more materials, and/or may exhibit one or more material properties and/or structures. For example, the heat transfer fins c607 and the combustion fins c450 may differ from one another in respect of material composition, material properties, and/or material structure. In some embodiments, the heat transfer fins c607 may exhibit a greater thermal conductivity relative to the combustion fins c450. Additionally, or in the alternative, the combustion fins c450 may exhibit a greater heat capacity relative to the heat transfer fins c607. A desired thermal conductivity and/or heat capacity may be imparted to the combustion fins c450 and/or the heat transfer fins c607 at least in part by augmenting the material properties and/or structure during additive manufacturing. For example, the density and/or porosity may be augmented by modifying additive manufacturing parameters to impart desired thermodynamic properties, such as heat capacity properties and/or thermal conductivity properties. Density and/or porosity may be augmented by modifying the degree of consolidation of powder material, and/or by providing regions of unsintered or partially sintered regions of powder material. Additionally, or in the alternative, material structure may be augmented to impart desired thermodynamic properties. For example, a lattice structure, a porous medium, a cellular structure, or the like may be provided to impart desired heat capacity properties and/or thermal conductivity properties to the combustion fins c450 and/or the heat transfer fins c607.

The plurality of condition breaks c605 may be disposed circumferentially adjacent to one another at the respective ones of the plurality of heating walls c616. The location of the conduction breaks c605 at the respective heating walls c616 may define a circumferential array of conduction breaks c605. A plurality of combustion fins c450 may occupy a radially or concentrically inward position of the hot-side heat exchanger body c600 relative to the circumferential array of conduction breaks c605. At least a portion of the plurality of heating walls c616 may define a corresponding plurality of heat transfer fins c607. The heat transfer fins c616 may occupy a radially or concentrically outward position of the hot-side heat exchanger body c600 relative to the circumferential array of conduction breaks c605. For example, the radially or concentrically outward portion of the heating walls c616 may define the heat transfer fins c607.

The plurality of combustion fins c450 may define a corresponding plurality of combustion-gas pathways c422. The plurality of combustion fins c450 and/or the plurality of combustion-gas pathways c422 may be configured an arranged in a spiral array, such as a semiannular spiral array. The plurality of combustion fins c450 may spiral concentrically outward from a combustion chamber outlet c412 towards the corresponding conduction break c605. The plurality of combustion fins c450 may be arranged in an array of annular or semiannular substantially concentric spirals and/or substantially concentric spiral arcs relative to the longitudinal axis c204. The circumferential array of conduction breaks c605 may define a radially or concentrically outward perimeter of the plurality of combustion fins c450.

The plurality of heat transfer fins c607 may define a corresponding plurality of heating fluid pathways c602. The plurality of heat transfer fins c607 and/or the plurality of heating fluid pathways c602 may be configured an arranged in a spiral array, such as an annular or semiannular spiral array. The plurality of heat transfer fins c607 may spiral concentrically outward from the corresponding conduction breaks, transecting respective ones of the plurality of heat transfer regions c612. The circumferential array of conduction breaks c605 may define a radially or concentrically inward perimeter of the plurality of heating walls c616. Additionally, or alternatively, the circumferential array of conduction breaks c605 may define a radially or concentrically inward perimeter of the plurality of heat transfer regions c612. For example, the plurality of working-fluid bodies c108 and/or the plurality of working-fluid pathways c110 may occupy a region of the hot-side heat exchanger body c600 disposed radially or concentrically outward from the circumferential array of conduction breaks c605. Additionally, or in the alternative, the portion of the heat transfer fins c607 and/or the heating walls c616 that include working-fluid pathways c110 monolithically defined therein may occupy a region of the hot-side heat exchanger body c600 disposed radially or concentrically outward from the circumferential array of conduction breaks c605.

The plurality of heat transfer regions c612 may respectively include an array of working-fluid pathways c110, such as a plurality of arrays of working fluid pathways c110. The array of working fluid pathways c110 may be monolithically defined within respective ones of the plurality of heating walls c616 (e.g., within respective ones of the plurality of heat transfer fins c607). The circumferential array of conduction breaks c605 may define a radially or concentrically inward perimeter of the plurality of working-fluid pathways c110. Respective ones of the plurality of arrays of working-fluid pathways c110 may be disposed circumferentially adjacent to one another about the hot-side heat exchanger body c600. Respective ones of the plurality of arrays of working-fluid pathways c110 may define at least a portion of a working-fluid body c108. A plurality of working-fluid bodies c108 may be disposed circumferentially adjacent to one another about the hot-side heat exchanger body c600. The circumferential array of conduction breaks c605 may define a radially or concentrically inward perimeter of the plurality of working-fluid bodies c108.

In some embodiments, at least a portion of fuel combustion may take place within the plurality of combustion-gas pathways c422. Combustion that takes place within the combustion-gas pathways c422 may be attributable at least in part to the reduced heat conduction along the heating walls c616 provided by the conduction breaks c605. In some embodiments, the conduction breaks c605 may prevent or reduce a possibility that combustion may quenching prematurely. During operation, the combustion fins c450 may reach a sufficiently high temperature for stable combustion to take place within the plurality of combustion-gas pathways c422 without being prematurely quenched, such as by conductive heat transfer along the heating walls c616 and into the working-fluid bodies c108. The reduction in heat conduction provided by the conduction breaks c605 may reduce the potential that heat transfer to the working fluid-pathways c610 may decrease the temperature of the heating walls c616 to a level that prematurely quenches combustion.

The conduction breaks c605 may allow the combustion fins to remain at a sufficiently high temperature to allow fuel combustion to approach complete combustion within the plurality of combustion-gas pathways c422. The circumferential array of conduction breaks c605 may be located at a distance along the combustion-gas pathways c422 selected to allow sufficient time for complete combustion upon the combustion gas having encountered the conduction breaks c605. In this way, the conduction breaks may provide for reduced emissions attributable to complete combustion and a corresponding reduction of unburnt combustion products in exhaust gas. The plurality of heat transfer regions c612 and/or the arrays of working-fluid pathways c110 may be located substantially immediately downstream from the circumferential array of conduction breaks c605, thereby allowing the hot combustion gas to begin heating the working fluid in the working-fluid pathways substantially immediately upon complete combustion.

As used herein, the term "complete combustion" refers to a state of fuel combustion that yields carbon dioxide and water as the combustion products with an absence of hydrocarbons. Complete combustion may yield carbon monoxide as a combustion product on the order of parts-per-million, such as single-digit parts-per-million (ppm). For example, with complete combustion, carbon monoxide may be present as a combustion product in an amount of less than 10 ppm, such as less than 5 ppm, or such as less than 1 ppm. In some embodiments, complete combustion may be qualitatively characterized by a blue flame, whereas incomplete combustion may be qualitatively characterized by an orange flame.

In some embodiments, a heater body c100 may be configured to burn fuel in a lean combustion environment. As mentioned, a lean combustion environment may be characterized by an equivalence ratio (i.e., the ratio of the actual fuel-to-air ratio to the stoichiometric fuel-to-air ratio), such as an equivalence ratio of from about 0.5 to about 1.0, such as from about 0.6 to about 0.9, or from about 0.7 to about 0.8. A lean combustion environment may generate a relatively longer flame length, which may otherwise point to a relatively larger combustion zone as an approach for reducing the potential for premature quenching and/or to allow for complete combustion.

In some embodiments, a heater body c100 configured to allow combustion to take place within the combustion-gas pathways c422 not only allows for complete combustion; but additionally, or in the alternative, a heater body c100 configured to allow fuel combustion within the plurality of combustion-gas pathways c422 may allow a heater body c100 to be operated at a higher equivalence ratio, thereby improving fuel efficiency and/or heating efficiency, while reducing emissions. Additionally, or in the alternative, the heater body c100 may be configured with a relatively smaller combustion chamber c102, thereby reducing material costs and weight.

In some embodiments, a combustion zone may occupy a position that includes the combustion-gas pathways c422. For example, the combustion-gas pathways c422 may define at least a portion of a second combustion zone c407 as described herein. The circumferential array of conduction breaks c605 may define a radially or concentrically outward perimeter of the second combustion zone c407. In some embodiments, the array of conduction breaks c605 may define an array of burner gaps c421. Such burner gaps may be configured as described herein. Additionally, or in the alternative, a hot-side heat exchanger body c600 may include both an array of conduction breaks c605 and an array of burner gaps c421.

The combustion fins c450 may be spatially separated from the heating walls c616 (e.g., the heat transfer fins c607), such that a conduction break c605 may include a physical gap or space defined by the spatial separation between a combustion fin c450 and heating wall c616 (e.g., a heat transfer fin c607). Additionally, or in the alternative, a conduction break c605 may include a change in a material property, a change in material composition, and/or a change in structure relative to the combustion fin c450 and/or the heat transfer fin c607 that provides a reduction in heat conduction relative to the combustion fin c450 and/or the heat transfer fin c607. For example, a conduction break c605 may include a structure such as a mesh, a three-dimensional lattice, a porous medium, or unsintered or partially sintered powder material, as well as combinations of these.

As shown in FIG. 4.4.3B, The plurality of heating walls c616 and/or combustion fins c450 may have a plurality of openings c451 (e.g., pore-like openings) that fluidly communicate with the plurality of combustion-gas pathways c422 of the hot-side heat exchanger c106 and define the hot-zone fuel injectors c413. In some embodiments, at least a portion of the hot-zone fuel pathways c415 may define a vaporization heat exchanger c417 that provides a heat transfer relationship between a combustion flame c426 and fuel within the hot-zone fuel pathways c415, and or between hot combustion gas c426 fuel within the hot-zone fuel pathways c415. The vaporization heat exchanger c417 may be effective to vaporize fuel (e.g., liquid fuel), such as when the fuel is within the hot-zone fuel pathways c415 and/or the hot-zone fuel injectors c413, or as the fuel is discharged from the openings (e.g., the pore-like openings) of the hot-zone fuel injectors c413.

Now referring to FIG. 4.4.4, exemplary methods of heating a plurality of heat transfer regions will be described. The exemplary methods of heating a plurality of heat transfer regions may include, for example, methods of heating one or more working-fluid bodies c108. For example, exemplary methods may be performed in connection with operation of a hot-side heat exchanger body c600, a working-fluid body c108, a heater body c100, and/or a closed-cycle engine c002 as described herein. As shown in FIG. 4.4.4, an exemplary method c650 may include, at block c652, flowing a first heat transfer fluid through a plurality of heating fluid pathways c602 fluidly communicating with an inlet plenum c604. Respective ones of the plurality of heating fluid pathways c602 may define a spiral pathway. The exemplary method c650 may include, at block c654, transferring heat from the first heat transfer fluid to a plurality of heat transfer regions c612. Respective ones of the plurality of heat transfer regions c612 may have a heat transfer relationship with a corresponding semiannular portion of the plurality of heating fluid pathways c602.

In some embodiments, transferring heat from the first heat transfer fluid to the plurality of heat transfer regions, at block 654, may include transferring heat from the plurality of heating fluid pathways c602 to at least some of the plurality of heat transfer regions c612 in circumferential series. The circumferential series of a respective one of the plurality of heating fluid pathways c612 may have a sequence depending at least in part on a circumferential location of an inlet c606 to the respective one of the plurality of heating fluid pathways c602.

Now referring to FIGS. 4.5.2 and 4.5.3, exemplary working-fluid bodies c108 will be described. The presently disclosed working-fluid bodies c108 may define part of a heater body c100 and/or a closed-cycle engine c002. For example, a working-fluid body c108 may define at least a portion of a monolithic body or a monolithic body-segment. Such monolithic body or monolithic body-segment may define at least a portion of the heater body c100 and/or the closed-cycle engine c002. Additionally, or in the alternative, the presently disclosed working-fluid bodies c108 may be provided as a separate component, whether for use in connection with a heater body c100, a closed-cycle engine c002, or any other setting whether related or unrelated to a heater body c100 or a closed-cycle engine c002. At least a portion of the working-fluid bodies c108 may define a one or more piston bodies c700, one or more regenerator bodies c800, and/or one or more working-fluid pathway c110. It will be appreciated that a heater body c100 may include any desired number of working-fluid bodies c108, including any desired number of piston bodies c700, regenerator bodies c800, and/or working-fluid pathways c110. For example, a heater body c100 may include one or more working-fluid bodies c108, and/or a working-fluid body c108 may include one or more piston bodies c700, regenerator bodies c800, and/or working-fluid pathways c110.

A working-fluid body c108 may define a first portion of a monolithic body and the piston body c700 may defines a second portion of the monolithic body. Alternatively, the piston body c700 may define a monolithic body-segment operably coupled or operably couplable to the working-fluid body c108. Additionally, or in the alternative, a regenerator body c800 may a second portion of the monolithic body, or the regenerator body c800 may define a second monolithic body-segment operably coupled or operably couplable to the piston body 700 and/or the working-fluid body c108.

As shown, the working-fluid body c108 may include a plurality of piston bodies c700, a plurality of regenerator bodies c800, and/or a plurality of working-fluid pathways c110. The working-fluid body c108 shown depicts only a portion of the piston bodies c700 and only a portion of the regenerator bodies c800. The remaining portions of the piston bodies c700 and/or the remaining portions of the regenerator bodies c800 may be provided in other monolithic bodies and/or monolithic body-segments, which may be operably couplable to one another and/or to the working-fluid body c108 as shown. In some embodiments a hot-side heat exchanger body c600 may surround or overlap with the working-fluid body c108. For example, as shown in FIG. 4.5.2, the hot-side heat exchanger body c600 may include a plurality of heating fluid pathways c602 and the working-fluid body c108 may include a plurality of working-fluid pathways c110, and the plurality of heating fluid pathways c602 and working-fluid pathways c110 may be interleaved with one another, such as to provide a thermally conductive relationship therebetween.

As shown, an exemplary working-fluid body c108 may include a plurality of heat transfer regions c612. Respective ones of the plurality of heat transfer regions may include a plurality of working-fluid pathways c110 fluidly communicating between a heat input region and a heat extraction region. The heat input region may include a piston body c700 and the heat extraction region may include a regenerator body c800.

At least some of the plurality of working-fluid pathways c110 may be radially or concentrically adjacent and/or axially adjacent to one another. In some embodiments, a heating fluid pathway c602 may be disposed between radially or concentrically adjacent and/or axially adjacent working-fluid pathways c110. Additionally, or in the alternative, at least some of the working-fluid pathways c110 may be semiannular to one another. For example, a working-fluid body c108 may include a plurality of radially or concentrically adjacent semiannular spiral pathways and/or a plurality of axially adjacent semiannular spiral pathways.

The plurality of working-fluid pathways c110 may be disposed axially adjacent to corresponding respective ones of the plurality of heating fluid pathways c602, such as radially or concentrically adjacent spiral heating fluid pathways c602. Respective ones of the plurality of working-fluid pathways c110 may have a thermally conductive relationship with corresponding respective ones of the plurality of heating fluid pathways c602.

An exemplary working-fluid body c108 may include a first heat transfer region c620, a second heat transfer region c622, a third heat transfer region c624, and/or a fourth heat transfer region c626. The first heat transfer region c620 may include a first plurality of working-fluid pathways c701. The first plurality of working-fluid pathways c701 may include semiannular radially or concentrically adjacent and/or axially adjacent spiral pathways. The second heat transfer region c622 may include a second plurality of working-fluid pathways c702. The second plurality of working-fluid pathways c702 may include semiannular radially or concentrically adjacent and/or axially adjacent spiral pathways. The third heat transfer region c624 may include a third plurality of working-fluid pathways c703. The third plurality of working-fluid pathways c703 may include semiannular radially or concentrically adjacent and/or axially adjacent spiral pathways. The fourth heat transfer region c626 may include a fourth plurality of working-fluid pathways c704. The fourth plurality of working-fluid pathways c704 may include semiannular radially or concentrically adjacent and/or axially adjacent spiral pathways.

The first heat transfer region c620 may be circumferentially adjacent to the second heat transfer region c622. The second heat transfer region c622 may be circumferentially adjacent to the third heat transfer region c624. The third heat transfer region c624 may be circumferentially adjacent to the fourth heat transfer region c626. The fourth heat transfer region c626 may be circumferentially adjacent to the first heat transfer region c620.

The first plurality of working-fluid pathways c701 may be circumferentially adjacent to the second plurality of working-fluid pathways c702. The second plurality of working-fluid pathways c702 may be circumferentially adjacent to the third plurality of working-fluid pathways c703. The third plurality of working-fluid pathways c703 may be circumferentially adjacent to the fourth plurality of working-fluid pathways c704. The fourth plurality of working-fluid pathways c704 may be circumferentially adjacent to the first plurality of working-fluid pathways c701.

In some embodiments, respective ones of the plurality of working-fluid pathways c110 may include circumferentially adjacent working-fluid pathways c110. The circumferentially adjacent working-fluid pathways may circumferentially initiate and/or circumferentially terminate a spiral array c706 of working-fluid pathways c110. The spiral array c706 may diverge radially or concentrically outward. The spiral array c706 may transition from radially or concentrically inward to radially or concentrically midward and/or from radially or concentrically midward to radially or concentrically outward, as the spiral array c706 passes from one heat transfer region to the next.

For example, respective ones of the first plurality of working-fluid pathways c701 may be circumferentially adjacent to respective ones of the second plurality of working-fluid pathways c702. The first plurality of working-fluid pathways c701 may include a radially or concentrically inward working-fluid pathway c708 circumferentially adjacent to a radially midward working-fluid pathway c710 of the second plurality of working-fluid pathways c704. The radially or concentrically inward working-fluid pathway c708 may circumferentially initiate a spiral array c706 of working-fluid pathways. The first plurality of working-fluid pathways c701 may additionally or alternatively include a radially midward working-fluid pathway c712 circumferentially adjacent to a radially or concentrically outward working-fluid pathway c714 of the second plurality of working-fluid pathways c702. The first plurality of working-fluid pathways c701 may additionally or alternatively include a radially or concentrically outward working-fluid pathway c716. The radially or concentrically outward working-fluid pathway c716 may circumferentially terminate a spiral array c706 of working-fluid pathways c110 defined by at least some of the plurality of working-fluid pathways.

In some embodiments, the plurality of working-fluid pathways c110 may include circumferentially adjacent working-fluid pathways with circumferentially adjacent counter-current pathways and/or circumferentially adjacent co-current pathways. For example, as shown, working-fluid flowing from the piston body c700 to the regenerator body c800 may flow clockwise through a first portion of the working-fluid pathways c110 and counter-clockwise through a second portion of the working-fluid pathways c110. Conversely, working-fluid flowing from the regenerator body c800 to the piston body c700 may flow counter-clockwise through the first portion of the working-fluid pathways c110 and clockwise through the second portion of the working-fluid pathways c110. As engine-working fluid alternatingly flows between the respective piston bodies c700 and regenerator bodies c800, the circumferentially adjacent working-fluid pathways may provide an array of alternating counter-current pathways and co-current pathways relative to the plurality of heating fluid pathways c602. The flow of engine-working fluid through the first plurality of working-fluid pathways c701 may define a plurality of counter-current working-fluid pathways and a plurality of co-current working-fluid pathways. Respective ones of the first plurality of counter-current working-fluid pathways may be circumferentially adjacent to respective ones of the first plurality of co-current working-fluid pathways. The co-current and counter-current flow of the engine-working fluid relative to the heating fluid pathway c602 may alternate as engine-working fluid alternatingly flows between the respective piston bodies c700 and the respective regenerator bodies c800.

A heat transfer region c612 may include one or more heat extraction regions, which may fluidly communicate with one or more corresponding regenerator bodies c800. A heat transfer region c612 may additionally or alternatively include one or more heat input regions, which may fluidly communicate with one or more corresponding piston bodies c700.

At least some of the working-fluid pathways c110 may define a spiral pathway spiraling annularly or semi-annularly around a longitudinal axis A 214. A spiral pathway may follow a spiral arc having any desired curvature. The spiral arc may continue along all or a portion of the spiral pathway defined by the working-fluid pathways c110. By way of example, the spiral or spiral arc may correspond to at least a portion of an Archimedean spiral, a Cornu spiral, a Fermat's spiral, a hyperbolic spiral, a logarithmic spiral, a Fibonacchi spiral, an involute, or a squircular spiral, as well as combinations of these. As shown, in some embodiments the plurality of working-fluid pathways c110 may define a squircular spiral. At least a portion of a squircular spiral may include an arc corresponding to a squircle. The plurality of working-fluid pathways c110 may have an arc length of from 180 degrees to 1260 degrees, such as from 180 degrees to 450 degrees, such as from 315 degrees to 765 degrees, such as from 675 degrees to 1260 degrees.

In some embodiments, the plurality of working-fluid pathways c110 may include radially or concentrically adjacent pathways. Additionally, or in the alternative, the plurality of working-fluid pathways c110 may include one or more inverse pairs. For example, an inverse pair may include a pair of working-fluid pathways c110 respectively fluidly communicating with a corresponding heat extraction region (e.g., a regenerator body c800) at opposite sides of the working-fluid body c108. Additionally, or in the alternative, an inverse pair may include a pair of working-fluid pathways c110 respectively fluidly communicating with a corresponding heat input region (e.g., a piston body c700) at opposite sides of the working-fluid body c108. The inverse pair may follow a spiral arc having any desired curvature, such as a spiral arc inverse pair. For example, the heating fluid pathways c602 may define a plurality of spiral arc inverse pairs. In some embodiments, an inverse pair may include a parabolic spiral.

Referring again to FIG. 4.5.2, a working-fluid body c108 may include a plurality of working-fluid pathways c110 interleaved with a plurality of heating fluid pathways c602 of a hot-side heat exchanger body c600, such as to provide a thermally conductive relationship therebetween. Respective ones of the plurality of working-fluid pathways c110 may be disposed alternatingly adjacent to respective ones of the plurality of heating fluid pathways c602. In some embodiments, a portion of the working-fluid body c108 defining at least some of the working-fluid pathways c110 may protrude into adjacent respective ones of the plurality of heating fluid pathways c602. Additionally, or in the alternative, at least a portion of the hot-side heat exchanger body c600 defining at least some of the heating fluid pathways c602 may protrude into adjacent respective ones of the plurality of working-fluid pathways c110. For example, a portion of the working-fluid body c108 and/or a portion of the hot-side heat exchanger body c600 defining alternatingly adjacent working-fluid pathways c110 and heating fluid pathways c602 may protrude into such working-fluid pathways c110 and/or heating fluid pathways c602. The protruding portion of the working-fluid body c108 and/or hot-side heat exchanger body c600 may protrude in any direction towards an adjacent working-fluid pathways c110 and/or heating fluid pathways c602. For example, the working-fluid body c108 and/or hot-side heat exchanger body c600 may protrude radially or concentrically inward and/or radially or concentrically outward.

The protruding portions of the working-fluid body c108 and/or a portion of the hot-side heat exchanger body c600 may define conduction-enhancing protuberances c728. The conduction-enhancing protuberances c728 may enhance conduction between the heating fluid and the engine-working fluid, for example, by disrupting a boundary layer between the heating fluid and the heating fluid pathways c602 and/or by a disrupting boundary layer between the engine-working fluid and the working-fluid pathways c110. Respective ones of the plurality of conduction-enhancing protuberances c728 may be defined at least in part by a portion of the working-fluid body c108 corresponding to respective ones of a plurality of working-fluid pathways c110 protruding into adjacent respective ones of a plurality of heating fluid pathways c602. Additionally, or in the alternative, respective ones of the plurality of conduction-enhancing protuberances c728 may be defined at least in part by a portion of the hot-side heat exchanger body c600 corresponding to respective ones of a plurality of heating fluid pathways c602 protruding into adjacent respective ones of the plurality of working-fluid pathways c110.

Exemplary conduction-enhancing protuberances may include any one or more of a combination of protuberant features having a variety of shapes and configurations, including nodules, loops, hooks, bumps, burls, clots, lumps, knobs, projections, protrusions, swells, enlargements, outgrowths, accretions, blisters, juts, and the like. These conduction-attenuating protuberances c728 occur in an ordered, semi-ordered, random, or semi-random fashion. However, the particular configuration, arrangement, or orientation of the conduction-enhancing protuberances c728 may be selectively controlled or modified by adjusting the configuration or arrangement of at least a portion of the working-fluid body c108 and/or hot-side heat exchanger body c600, such as the configuration or arrangement of at least a portion of the working-fluid pathways c110 and/or heating fluid pathways c602.

Now referring to FIG. 4.5.3, another exemplary cross-sectional view of a working-fluid body c108 will be described. In some embodiments, the cross-sectional view shown in FIG. 4.5.3 may correspond to an axially proximal position of a heater body c100 and/or closed-cycle engine c002 relative to the cross-sectional view shown in FIG. 4.5.1B. For example, FIG. 4.5.1B may represent a top cross-sectional view of an exemplary working-fluid body c108 and/or FIG. 4.5.3 may represent a bottom cross-sectional view of an exemplary working-fluid body c108. As shown in FIG. 4.5.3, a plurality of piston bodies c700 and a plurality of regenerator bodies c800 may be circumferentially spaced about a longitudinal axis c204 of the working-fluid body c108. The plurality of piston bodies c700 and regenerator bodies c800 may be paired with one another, for example, with a plurality of working-fluid pathways c110 fluidly communication between respective piston body c700 and regenerator body c800 pairs. For example, a first plurality of working-fluid pathways c701 may fluidly communicate between a first piston chamber c112 defined by a first piston body c700 and a first regenerator chamber c802 defined by a first regenerator body c800. A second plurality of working-fluid pathways c702 may fluidly communicate between a second piston chamber c112 defined by a second piston body c700 and a second regenerator chamber c802 defined by a second regenerator body c800. A third plurality of working-fluid pathways c703 may fluidly communicate between a third piston chamber c112 defined by a third piston body c700 and a third regenerator chamber c802 defined by a third regenerator body c800. A fourth plurality of working-fluid pathways c704 may fluidly communicate between a fourth piston chamber c112 defined by a fourth piston body c700 and a fourth regenerator chamber c802 defined by a fourth regenerator body c800.

A flow direction of engine-working fluid flowing through a plurality of working-fluid pathways c110 may be counter-current or co-current relative to a flow direction c732 of heating fluid flowing through the heating fluid pathways c602 adjacent to such working-fluid pathways c110. For example, as shown, engine-working fluid flowing from a piston chamber c112 towards a regenerator chamber c802 may be counter-current to the flow direction c732 of the heating fluid flowing through adjacent heating fluid pathways c602. Engine-working fluid flowing from a regenerator chamber c802 towards a piston chamber c112 may be co-current to the flow direction c732 of the heating fluid flowing through adjacent heating fluid pathways c602. Alternatively, in other embodiments, engine-working fluid may be counter-current to the flow direction c732 of the heating fluid when flowing from a piston chamber c112 towards a regenerator chamber c802 and co-current when flowing from a regenerator chamber c802 towards a piston chamber c112.

In a general sense, heat transfer from a hot fluid to a cold fluid may be greater during counter-current flow relative to co-current flow. For example, with co-current flow, the temperature of the cold fluid may be always less than the temperature of the hot fluid, and as such, heat transfer may be restricted by the discharge temperature of the cold fluid. Conversely, with counter-currently flow, heat transfer is not restricted by the discharge temperature of the cold fluid, which may allow for a greater quantity of heat transfer. On the other hand, with co-current flow, the temperature gradient between a hot fluid and a cold fluid may be greater at an initial zone of heat transfer prior to achieving thermal equilibrium, relative to the temperature gradient at an initial zone of heat transfer with counter-current flow. As such, faster heat transfer may be achieved during non-equilibrium conditions during co-current flow.

In some embodiments, it may be advantageous for heating fluid to flow co-currently relative to engine-working fluid when the engine-working fluid flows from the regenerator body c800 to the piston body c700. For example, the temperature gradient between the engine-working fluid and the heating fluid may be greater when the engine-working fluid flows from the regenerator body c800 towards the piston body c700 relative to engine-working fluid flowing in the opposite direction. Such temperature gradient may be greater, for example, because of heat losses as heat transfers from the engine-working fluid to the regenerator body c800 and back to the engine-working fluid. With a greater temperature gradient existing when engine-working fluid flows from the regenerator body c800 towards the piston body c700, such temperature gradient may facilitate a more rapid heat transfer from the heating fluid to the engine-working fluid. In particular, such temperature gradient may facilitate a more rapid heat transfer to the engine-working fluid as the engine-working fluid flows into the piston body c800, thereby further expanding the engine-working fluid and contributing to the downstroke (e.g., directly) of the piston within the piston chamber. Additionally, or in the alternative, with heating fluid flowing counter-current relative to engine-working fluid flowing from the piston body c700 to the regenerator body c800, the rate of heat transfer from the heating fluid to the engine-working fluid may be less than when the engine-working fluid flows in the opposite direction. As such, relatively less heat transfer may be imparted to the engine-working fluid when flowing into the regenerator body c800 the engine-working fluid flows from the regenerator body c800, further contributing to efficiency of the heater body c100, such as when inputting heat to the closed-cycle engine c002.

Any suitable engine-working fluid may be utilized in accordance with the present disclosure. In exemplary embodiments, the engine-working fluid may include a gas, such as an inert gas. For example, a noble gas, such as helium may be utilized as an engine-working fluid. Exemplary engine-working fluids preferably are inert, such that they generally do not participate in chemical reactions such as oxidation within the environment of the working-fluid body c108. Exemplary noble gasses include monoatomic gases such as helium, neon, argon, krypton, or xenon, as well as combinations of these. In some embodiments, an engine-working fluid may include air, oxygen, nitrogen, or carbon dioxide, as well as combinations of these.

Now turning to FIGS. 4.5.5A-4.5.5D, exemplary thermal expansion joints c135 of a heater body c100 will be described. A heater body c100 may include one or more thermal expansion joints c135 at any one or more desired locations of the heater body c100. A thermal expansion joint c135 may include an expansion gap c149 configured to allow for thermal expansion, and/or a difference in thermal expansion, as between respective sides of the thermal expansion joint c135. In some embodiments, a thermal expansion joint c135 may include an expansion gap c149 that provides for a hairpin configuration, as shown, for example, in FIG. 4.5.5B. Such hairpin configuration may provide an extended thermal conduction pathway as between respective sides of the thermal expansion joint c135. In some embodiments, the expansion gap c147 may include an insulating material c129, such as a radiative-heat shield radiative-heat shield c129A, to provide an improved view factor and corresponding reduction in radiative heat transfer as between respective sides of the thermal expansion joint c135.

As shown, in some embodiments, a heater body c100 may include one or more combustor-thermal expansion joints c135A. A combustor-thermal expansion joint c135A may allow for thermal expansion, and/or a difference in thermal expansion, as between at least a portion of a combustor body c400 and one or more adjacent regions of the heater body c100. For example, a combustor-thermal expansion joint c135A may allow for thermal expansion, and/or a difference in thermal expansion, as between a combustor body c400 and a hot-side heat exchanger body c600 (such as between a combustion chamber c102 and a hot-side heat exchanger c106). Additionally, or in the alternative, a combustor-thermal expansion joint c135A may allow for thermal expansion, and/or a difference in thermal expansion, as between a combustor body c400 and a working-fluid body c108 (such as between a combustion chamber c102 and an array of working-fluid pathways c110).

A combustor-thermal expansion joint c135A may be oriented concentric with a combustion chamber c102 and/or a longitudinal axis c204 of the heater body c100, as shown, for example in FIGS. 4.5.5A, 4.5.5C and 4.5.5D. The combustor-thermal expansion joint c135A may circumferentially surround at least a portion of the combustor body c400. For example, as shown in FIGS. 4.5.5A and 4.5.5B, an expansion gap c149 may be disposed within at least a portion of a hot-side heater body c600. Additionally, or in the alternative, the combustor-thermal expansion joint c135A may be at least partially axially offset from the combustion chamber c102, as shown. Such axial offset may be configured to provide an extended thermal conductive pathway as between the combustor body c400 and the hot-side heat exchanger body c600.

In some embodiments, a heater body c100 may include one or more heat transfer region-thermal expansion joints c135B. A heat transfer region-thermal expansion joint c135B may allow for thermal expansion, and/or a difference in thermal expansion, as between respective heat transfer regions c612 of a heater body c100. For example, a heat transfer region-thermal expansion joint c135B may allow for thermal expansion, and/or a difference in thermal expansion, as between a working-fluid body c108 and a regenerator body c800, and/or as between a piston body c700 and a regenerator body c800. As shown in FIGS. 4.5.5C and 4.5.5D, a heat transfer region-thermal expansion joint c135B may be disposed between a regenerator body c800 of a first heat transfer region c620 and a working-fluid body c108 of a second heat transfer region c622 (and/or between a regenerator body c800 of a first heat transfer region c620 and a piston body c700 of a second heat transfer region c622).

Additionally, or in the alternative, a heat transfer region-thermal expansion joint c135B may be disposed between a heat input region c601 of a working-fluid body c108 and a heat extraction region c603 of a working fluid body c108, such as between a heat input region c601 of a first heat transfer region c620, and a heat extraction region c603 of a second heat transfer region c622. Such as heat input region c601 includes working-fluid pathways c110 on a side of the working-fluid body c108 proximal to the piston body c700, such as including a portion of the working-fluid pathways c110 proximal to corresponding piston chamber apertures c111. Such a heat extraction region c603 includes working-fluid pathways c110 on a side of the working-fluid body c108 proximal to the regenerator body c800, such as including a portion of the working-fluid pathways c110 proximal to corresponding regenerator apertures c113.

Now referring to FIG. 4.5.6 exemplary methods of heating an engine-working fluid will be described. The exemplary methods of heating an engine-working fluid may include, for example, methods of heating one or more working-fluid bodies c108. For example, exemplary methods may be performed in connection with operation of a hot-side heat exchanger body c600, a working-fluid body c108, a heater body c100, and/or a closed-cycle engine c002 as described herein. As shown, an exemplary method c750 may include, at block c752 flowing an engine-working fluid across respective ones of a plurality of heat transfer regions c612. The plurality of heat transfer regions c612 may include a plurality of working-fluid pathways c110 fluidly communicating between a heat input region such as a piston body c700 and a heat extraction region such as a regenerator c800. The engine-working fluid may flow through the plurality of working-fluid pathways c110, such as alternatingly between the heat input region such as the piston body c700 and the heat extraction region such as the regenerator c800. At block c754, the exemplary method may include transferring heat from a heating source to the engine-working fluid. The plurality of working-fluid pathways c110 may have a heat transfer relationship with the heating source. The heating source may be a heating fluid, such as combustion gas, which may be heated using a heater body c100.

An exemplary method c750 may include alternatingly flowing the engine-working fluid from the heat input region to the heat extraction region, and from the heat extraction region to the heat input region. For example, the method c750 may include alternatingly flowing through a first plurality of working-fluid pathways c701, a first portion of the engine-working fluid from the heat input region to the heat extraction region and from the heat extraction region to the heat input region. In some embodiments, the first portion of the engine-working fluid may alternatingly flow from the heat input region to a first heat extraction region and from the first heat extraction region to the heat input region. Additionally, or in the alternative, the method c750 may include alternatingly flowing through a second plurality of working-fluid pathways c702, a second portion of the engine-working fluid from the heat input region to the heat extraction region and from the heat extraction region to the heat input region. In some embodiments, the second portion of the engine-working fluid may alternatingly flow from the heat input region to a second heat extraction region and from the second heat extraction region to the heat input region. In another embodiment, the first portion of the engine-working fluid may alternatingly flow between a first heat input region and a first heat extraction region and the second portion of the engine-working fluid may alternatingly flow between a second heat input region to a second heat extraction region.

Control systems and methods of controlling various systems disclosed herein will now be provided. A control system generates control commands that are provided to one or more controllable devices of the system. The controllable devices execute control actions in accordance with the control commands. Accordingly, the desired output of the system can be achieved.

FIG. 5.1.28 provides an example computing system in accordance with an example embodiment of the present disclosure. The one or more controllers, computing devices, or other control devices described herein can include various components and perform various functions of the one or more computing devices of the computing system b2000 described below.

As shown in FIG. 5.1.28, the computing system b2000 can include one or more computing device(s) b2002. The computing device(s) b2002 can include one or more processor(s) b2004 and one or more memory device(s) b2006. The one or more processor(s) b2004 can include any suitable processing device, such as a microprocessor, microcontroller, integrated circuit, logic device, and/or other suitable processing device. The one or more memory device(s) b2006 can include one or more computer-readable media, including, but not limited to, non-transitory computer-readable media, RAM, ROM, hard drives, flash drives, and/or other memory devices.

The one or more memory device(s) b2006 can store information accessible by the one or more processor(s) b2004, including computer-readable instructions b2008 that can be executed by the one or more processor(s) b2004. The instructions b2008 can be any set of instructions that when executed by the one or more processor(s) b2004, cause the one or more processor(s) b2004 to perform operations. In some embodiments, the instructions b2008 can be executed by the one or more processor(s) b2004 to cause the one or more processor(s) b2004 to perform operations, such as any of the operations and functions for which the computing system b2000 and/or the computing device(s) b2002 are configured, such as e.g., operations for controlling certain aspects of power generation systems and/or controlling one or more closed cycle engines as described herein. For instance, the methods described herein can be implemented in whole or in part by the computing system b2000. Accordingly, the method can be at least partially a computer-implemented method such that at least some of the steps of the method are performed by one or more computing devices, such as the exemplary computing device(s) b2002 of the computing system b2000. The instructions b2008 can be software written in any suitable programming language or can be implemented in hardware. Additionally, and/or alternatively, the instructions b2008 can be executed in logically and/or virtually separate threads on processor(s) b2004. The memory device(s) b2006 can further store data b2010 that can be accessed by the processor(s) b2004. For example, the data b2010 can include models, databases, etc.

The computing device(s) b2002 can also include a network interface b2012 used to communicate, for example, with the other components of system (e.g., via a network). The network interface b2012 can include any suitable components for interfacing with one or more network(s), including for example, transmitters, receivers, ports, controllers b1510, antennas, and/or other suitable components. One or more controllable devices b1534 and other controllers b1510 can be configured to receive one or more commands or data from the computing device(s) b2002 or provide one or more commands or data to the computing device(s) b2002.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to describe the presently disclosed subject matter, including the best mode, and also to provide any person skilled in the art to practice the subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A monolithic heat exchanger body, comprising:
a plurality of heating walls configured and arranged in an array of spirals or spiral arcs relative to a longitudinal axis, wherein adjacent portions of the plurality of heating walls respectively define a corresponding plurality of heating fluid pathways therebetween; and
a plurality of combustion fins circumferentially spaced about a perimeter of an inlet plenum, wherein the inlet plenum comprises or fluidly communicates with a combustion chamber and the plurality of heating fluid pathways fluidly communicate with the inlet plenum;

wherein the plurality of combustion fins occupy a radially or concentrically inward portion of the monolithic heat exchanger body, and wherein the plurality of heating fluid pathways have a heat transfer relationship with a heat sink disposed about a radially or concentrically outward portion of the monolithic heat exchanger body; and wherein a plurality of conduction breaks disposed radially or concentrically outward relative to the plurality of combustion fins at least partially inhibit heat conduction from the plurality of combustion fins to the plurality of heating walls.

2. The monolithic heat exchanger body of claim 1, wherein at least a portion of the plurality of conduction breaks are defined by respective downstream portions of the plurality of combustion fins being configured and arranged in spatial separation from corresponding upstream portions of the plurality of heating walls.

3. The monolithic heat exchanger body of claim 1, wherein the plurality of conduction breaks respectively comprise a gap or space between a combustion fin and corresponding heating wall.

4. The monolithic heat exchanger body of claim 1, wherein the plurality of conduction breaks respectively comprise a difference in a material property, a material composition, and/or a material structure, relative to the plurality of combustion fins and/or the plurality of heating walls.

5. The monolithic heat exchanger body of claim 1, wherein the plurality of conduction breaks comprise one or more of: a mesh structure, a three-dimensional lattice structure, or a porous medium structure.

6. The monolithic heat exchanger body of claim 1, wherein the plurality of conduction breaks comprise respective regions of the heating walls having unsintered or partially sintered powder material resulting from an additive manufacturing process used to form the monolithic heat exchanger body.

7. The monolithic heat exchanger body of claim 1, wherein the plurality of combustion fins are configured and arranged in an array of spirals or spiral arcs relative to the longitudinal axis.

8. The monolithic heat exchanger body of claim 1, wherein the plurality of combustion fins are monolithically integrated with corresponding ones of the plurality of heating walls.

9. The monolithic heat exchanger body of claim 1, wherein the heat sink comprises a plurality of working-fluid bodies, the plurality of working-fluid bodies comprising a plurality of working-fluid pathways that have a heat transfer relationship with the plurality of heating fluid pathways.

10. The monolithic heat exchanger body of claim 1, wherein the heat sink comprises a plurality of heat transfer regions circumferentially spaced about the monolithic heat exchanger body.

11. The monolithic heat exchanger body of claim 10, comprising from 2 to 8 heat transfer regions circumferentially spaced about the monolithic heat exchanger body.

12. The monolithic heat exchanger body of claim 11, wherein the plurality of heating fluid pathways are configured and arranged to pass adjacent to at least some of the plurality of heat transfer regions in a circumferential series, the circumferential series of a respective one of the plurality of heating fluid pathways having a sequence depending at least in part on a circumferential location at which the respective one of the plurality of heating fluid pathways fluidly communicated with the inlet plenum.

13. The monolithic heat exchanger body of claim 12, comprising:

a first heating fluid pathway passing adjacent to at least some of the plurality of heat transfer regions in a first circumferential series, the first circumferential series beginning with a first heat transfer region, and followed by a second heat transfer region, and followed by a third heat transfer region; and a second heating fluid pathway passing adjacent to at least some of the plurality of heat transfer regions in a second circumferential series, the second circumferential series beginning with the second heat transfer region, and followed by the third heat transfer region, and followed by a fourth heat transfer region.

14. The monolithic heat exchanger body of claim 10, wherein the plurality of heat transfer regions occupy a region of the monolithic heat exchanger body disposed radially or concentrically outward from the plurality of conduction breaks.

15. The monolithic heat exchanger body of claim 14, wherein the plurality of heat transfer regions respectively comprise an array of working-fluid pathways that have a heat transfer relationship with the plurality of heating fluid pathways.

16. The monolithic heat exchanger body of claim 15, wherein at least a portion of the working-fluid pathways are monolithically defined within respective ones of the plurality of heating walls.

17. The monolithic heat exchanger body of claim 1, wherein:

the combustion fins are configured and arranged to operate at a sufficiently high temperature for stable combustion within the portion of the heating fluid pathways disposed upstream from the conduction breaks.

18. The monolithic heat exchanger body of claim 1, wherein the conduction breaks are configured and arranged to reduce heat conduction from the combustion fins by an amount sufficient for the conduction fins to remain at a sufficiently high temperature to for fuel combustion to approach complete combustion within the portion of the heating fluid pathways disposed upstream from the conduction breaks.

19. The monolithic heat exchanger body of claim 1, wherein the conduction breaks are located at a distance along the heating fluid pathways to allow for fuel combustion to approach complete combustion within the portion of the heating fluid pathways disposed upstream from the conduction breaks.

20. The monolithic heat exchanger body of claim 1, wherein the plurality of heating walls, and/or the plurality of combustion fins, have a configuration and arrangement corresponding to at least a portion of one or more of the following: an Archimedean spiral, a Cornu spiral, a Fermat's spiral, a hyperbolic spiral, a logarithmic spiral, a Fibonacchi spiral, an involute, or a squircular spiral.

* * * * *